(12) United States Patent
Jetton et al.

(10) Patent No.: US 11,618,597 B2
(45) Date of Patent: Apr. 4, 2023

(54) FLUID MIXING AND HEAT EXCHANGE DEVICE

(71) Applicant: JEVO IP, LLC, Los Angeles, CA (US)

(72) Inventors: Jeffrey R. Jetton, Portland, OR (US); Tyler L. Williams, Portland, OR (US); Stan A. Levitsky, Portland, OR (US)

(73) Assignee: JEVO IP, LLC, Los Angeles, CA (US)

( * ) Notice: Subject to any disclaimer, the term of this patent is extended or adjusted under 35 U.S.C. 154(b) by 0 days.

(21) Appl. No.: 17/147,369

(22) Filed: Jan. 12, 2021

(65) Prior Publication Data

US 2021/0130015 A1    May 6, 2021

Related U.S. Application Data

(63) Continuation of application No. 16/121,553, filed on Sep. 4, 2018, now Pat. No. 10,919,653, which is a continuation-in-part of application No. PCT/US2017/020812, filed on Mar. 3, 2017, which is
(Continued)

(51) Int. Cl.
| | |
|---|---|
| *B67D 1/00* | (2006.01) |
| *B65B 3/30* | (2006.01) |
| *C12G 3/04* | (2019.01) |
| *B67D 1/08* | (2006.01) |
| *B01F 33/40* | (2022.01) |

(Continued)

(52) U.S. Cl.
CPC .............. *B65B 3/30* (2013.01); *B01F 33/403* (2022.01); *B01F 2035/98* (2022.01); *B01F 2101/14* (2022.01); *B67D 1/0041* (2013.01); *B67D 1/0869* (2013.01); *B67D 2210/0016* (2013.01); *C12G 3/04* (2013.01); *F25D 2331/806* (2013.01)

(58) Field of Classification Search
CPC ..... B65B 3/30; A23L 29/284; F25D 2331/806
See application file for complete search history.

(56) References Cited

U.S. PATENT DOCUMENTS

| | | |
|---|---|---|
| 1,522,428 A | 1/1925 | Ferguson |
| 3,037,674 A | 6/1962 | Brady et al. |
| 3,371,626 A | 3/1968 | Hachtman |
| (Continued) | | |

FOREIGN PATENT DOCUMENTS

| | | |
|---|---|---|
| WO | 2011096979 A2 | 8/2011 |
| WO | 2015100386 A1 | 7/2015 |

OTHER PUBLICATIONS

United States Patent and Trademark Office, Precedential Opinion Issued in U.S. Appl. No. 10/132,492, filed Oct. 1, 2009, 47 pages.
(Continued)

*Primary Examiner* — David J Teitelbaum
(74) *Attorney, Agent, or Firm* — McCoy Russell LLP

(57) ABSTRACT

Methods and systems are provided for mixing and heat exchange of fluids. In one example, a fluid mixing and heat exchange device includes a hot water tank, a mixing chamber spaced away from the hot water tank and fluidly coupled to a first liquid reservoir, a first chilling module fluidly coupled to the mixing chamber, a coolant tank fluidly coupled to the first chilling module, a radiator fluidly coupled to the coolant tank, and a dispensing manifold fluidly coupled to the mixing chamber and adapted to dispense a mixed and chilled fluid mixture to a plurality of fluid vessels.

8 Claims, 25 Drawing Sheets

Related U.S. Application Data a continuation of application No. 15/061,744, filed on Mar. 4, 2016, now abandoned.

(51) Int. Cl.
*B01F 35/90* (2022.01)
*B01F 101/14* (2022.01)

(56) References Cited

U.S. PATENT DOCUMENTS

| | | | |
|---|---|---|---|
| 3,452,689 A | | 7/1969 | Kinney et al. |
| 4,055,892 A | | 11/1977 | Del Vecchio |
| 4,617,908 A | | 10/1986 | Miller et al. |
| 5,404,922 A | * | 4/1995 | Sliter ............... B65B 39/00 |
| | | | 141/237 |
| 6,303,175 B1 | | 10/2001 | Küzinger et al. |
| 6,490,870 B1 | | 12/2002 | Efremkine |
| 6,596,334 B1 | | 7/2003 | Flickinger et al. |
| 6,663,907 B1 | | 12/2003 | Pratolongo |
| 9,695,030 B2 | * | 7/2017 | Walker ............... B67D 1/0047 |
| 2002/0031591 A1 | | 3/2002 | Kerrigan et al. |
| 2002/0039616 A1 | | 4/2002 | Lanter et al. |
| 2002/0043071 A1 | | 4/2002 | Frank et al. |
| 2004/0013783 A1 | | 1/2004 | Miller |
| 2005/0145372 A1 | | 7/2005 | Noel |
| 2006/0016347 A1 | | 1/2006 | Girard et al. |
| 2006/0099316 A1 | | 5/2006 | Nuckles et al. |
| 2007/0215239 A1 | | 9/2007 | Dorney |
| 2009/0148582 A1 | | 6/2009 | Leibovich et al. |
| 2010/0140302 A1 | | 6/2010 | Knobel |
| 2011/0033599 A1 | | 2/2011 | Uttinger |
| 2011/0129588 A1 | | 6/2011 | Marini |
| 2011/0223308 A1 | | 9/2011 | Motzaeli et al. |
| 2012/0006204 A1 | | 1/2012 | Eidenschink et al. |
| 2012/0314059 A1 | | 12/2012 | Hoffmann et al. |
| 2013/0287914 A1 | * | 10/2013 | Fragniere ............... A47J 31/60 |
| | | | 99/295 |
| 2013/0340629 A1 | | 12/2013 | Jetton et al. |
| 2014/0345652 A1 | * | 11/2014 | Meng ............... A47J 31/60 |
| | | | 99/290 |
| 2016/0309763 A1 | | 10/2016 | Jetton et al. |
| 2017/0225828 A1 | * | 8/2017 | Carson ............... B65B 7/2871 |

OTHER PUBLICATIONS

ISA Korean Intellectual Property Office, International Search Report and Written Opinion Issued in Application No. PCT/US2014/072286, dated Apr. 27, 2015, WIPO, 13 pages.

ISA Korean Intellectual Property Office, International Search Report and Written Opinion Issued in Application No. PCT/US2017/020812, dated Jun. 19, 2017, WIPO, 17 pages.

* cited by examiner

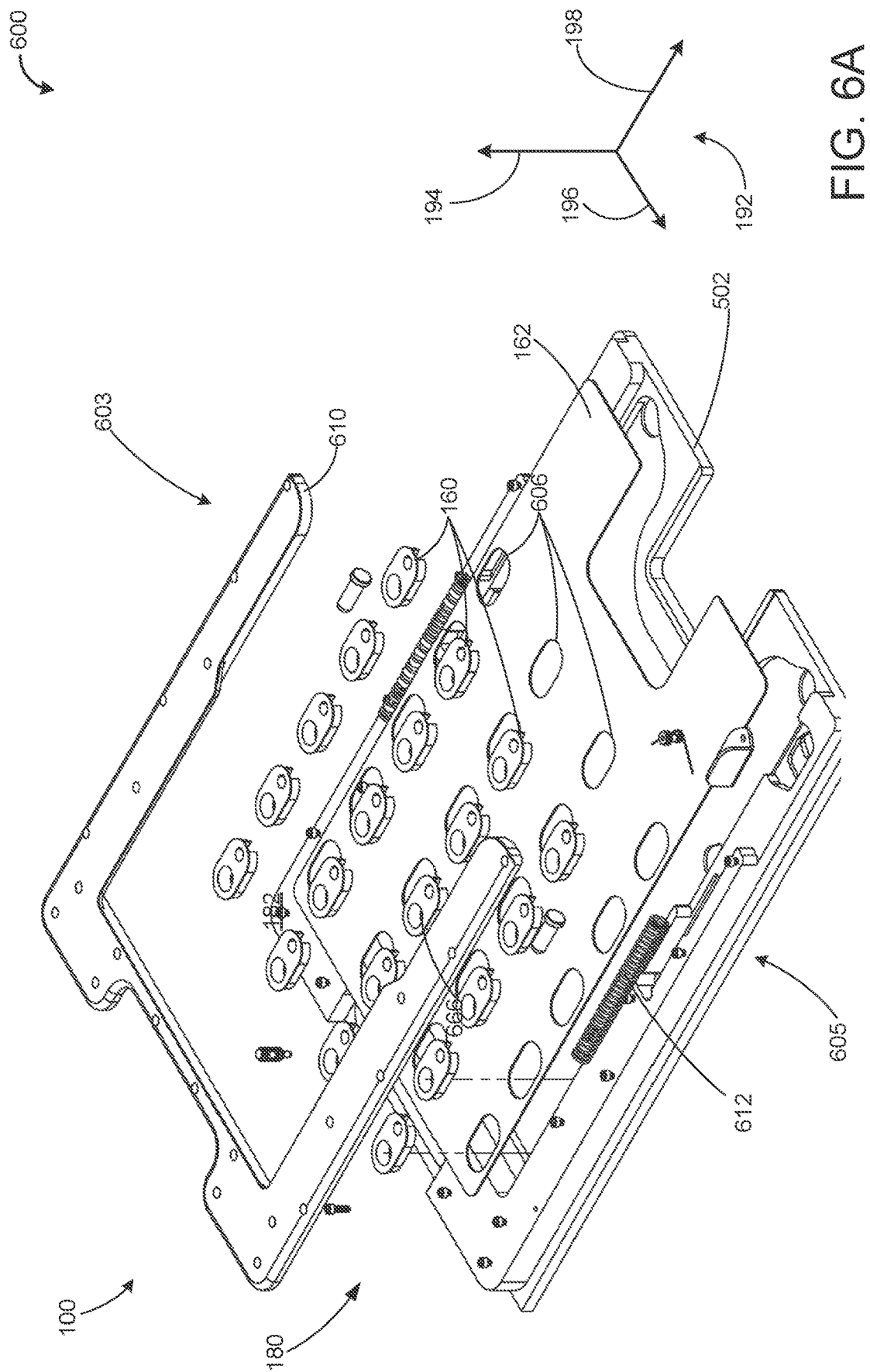

FLUID MIXING AND HEAT EXCHANGE DEVICE

CROSS REFERENCE TO RELATED APPLICATIONS

The present application is a continuation of continuation-in-part application Ser. No. 16/121,553, entitled "A FLUID MIXING AND HEAT EXCHANGE DEVICE", and filed on Sep. 4, 2018. Applications Ser. No. 16/121,553 is a continuation-in-part of International Patent Application No. PCT/US2017/020812, entitled "DEVICE FOR PREPARATION OF GELATIN-BASED PRODUCTS", and filed on Mar. 3, 2017. International Patent Application No. PCT/US2017/020812 claims priority to U.S. Non-Provisional application Ser. No. 15/061,744, entitled "DEVICE FOR PREPARATION OF GELATIN-BASED PRODUCTS", and filed on Mar. 4, 2016. The entire contents of the above-listed applications are hereby incorporated by reference for all purposes.

BACKGROUND/SUMMARY

Fluid systems may be employed in various environments, including various vehicles, manufacturing facilities, and the like, which mix and exchange heat with a variety of different fluids. In some examples, solids may be mixed with one or more fluids to create a fluid (e.g., liquid) mixture which may then be mixed with additional fluids and/or cooled via a heat exchange system with additional fluids or alternate cooling devices. However, fluid cooling in such systems may take a long time and/or involve many pieces of equipment, thereby increasing system costs and a time to prepare a desired fluid mixture at a target temperature. Further, temperature control in such heat exchange systems may be challenging and involve complicated control systems.

In one example, the issues described above may be addressed by a device comprising a hot water tank, a mixing chamber spaced away from the hot water tank and fluidly coupled to a first liquid reservoir, a first chilling module fluidly coupled to the mixing chamber, a coolant tank fluidly coupled to the first chilling module, a radiator fluidly coupled to the coolant tank, and a dispensing manifold fluidly coupled to the mixing chamber and adapted to dispense a mixed and chilled fluid mixture to a plurality of fluid vessels The system may be used for heating and/or cooling various slurries or gelatins, including non-edible and non-food mediums.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6A shows an exploded view of the dispensing manifold shown in FIG. 5, in accordance with one or more embodiments of the present disclosure.

FIGS. 2-17 are drawn to scale.

DETAILED DESCRIPTION

Figure 1A:
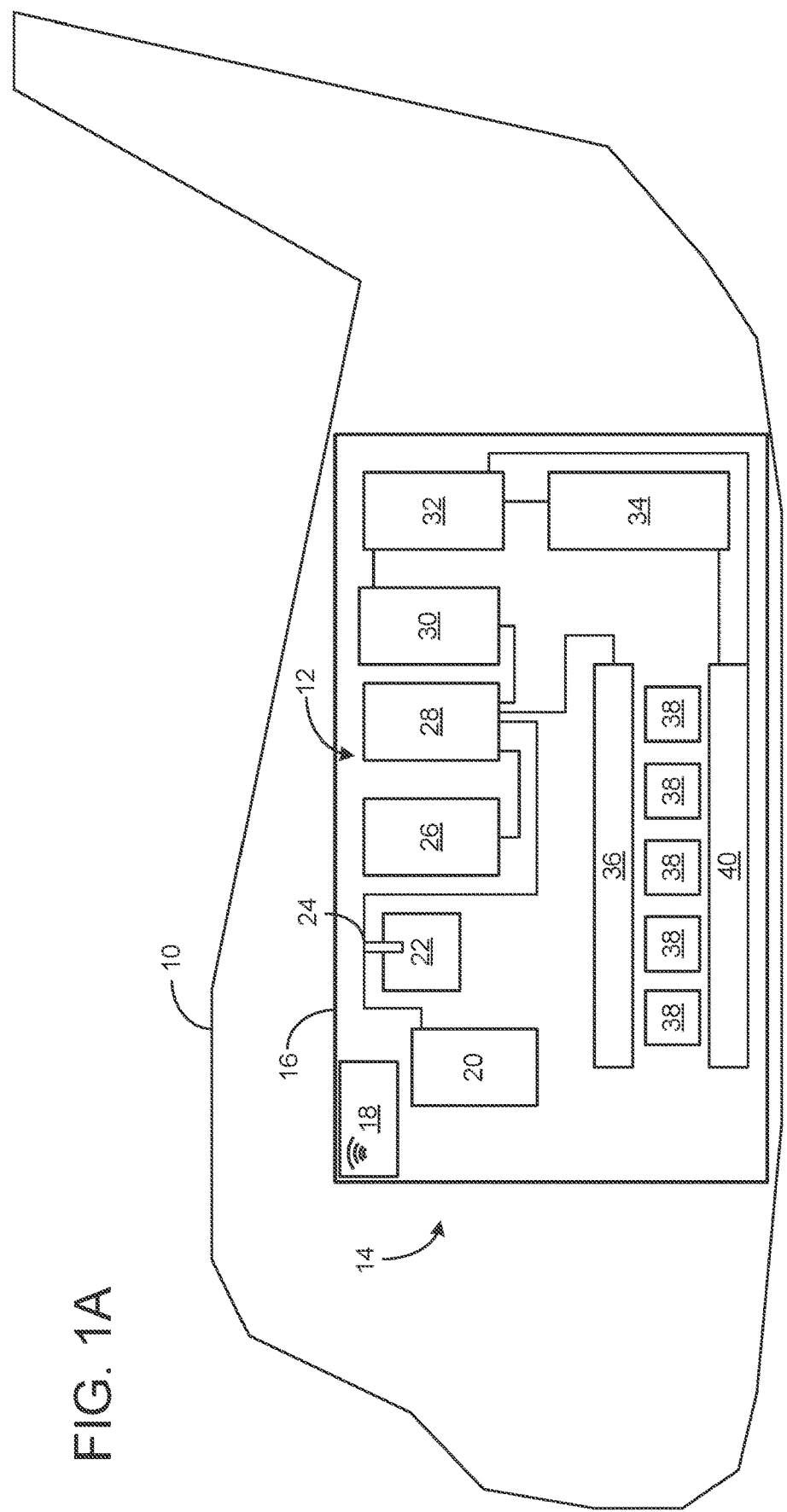
FIG. 1A shows a schematic diagram of a vehicle including a fluid mixing and heat exchange system, which may be included in a device, in accordance with one or more embodiments of the present disclosure.

The following description relates to systems and methods for mixing and exchanging heat with various fluids of a fluid system for the preparation of a slurry. Specifically, a single and contained fluid mixing and heat exchange device, such as the device shown in FIGS. 1B-17 may be used to mix and exchange heat with various fluids and/or solids in order to create a liquid mixture and slurry. In one example, the fluid mixing and heat exchange device may be included in a vehicle, such as an airplane, as shown in FIG. 1A. In another example, the fluid mixing and heat exchange device may be used to prepare gelatin-based products which may include gelatin mixed with other ingredients. For example, a gelatin powder may be mixed with water and, optionally, alcohol to form a liquid gelatin mixture. The device shown in FIGS. 1A-17 may be an automatic fluid mixing and heat exchange, and in some examples, an automatic gelatin shot making machine. Thus, the device may be configured to automatically make a consumable product containing gelatin. The device may include one or more water reservoirs and alcohol reservoirs, as well as a space (e.g., slot) for receiving a consumable cartridge. The consumable cartridge may contain dry ingredients including gelatin power and possibly additional dry additives (such as vitamins or additional flavoring). A specific amount of water may be added to the dry ingredients in the consumable cartridge to dissolve the dry ingredients. The resulting mixture may then be pumped out of the cartridge and combined with additional water and/or alcohol in a mixing chamber. From the mixing chamber, the mixture may be directed through a chilling block of a chilling module where the mixture is cooled via one or more chilling devices. After being cooled, the liquid gelatin mixture is routed to a plurality of dispensing heads, where the mixture is dispensed into individual serving cups. The gelatin mixture may be further chilled in the cups to form a gelatinous and solid gelatin-based product. The gelatin-based product within individual serving cups may be referred to herein as shots and thus the device may be referred to herein as a shot-making device. Processes for making the gelatin-based shots using the device and also for operating the device in different operational states are shown in FIGS. 18A-20. After chilling the filled cups for a period of time, the shots may be complete and ready for consumption. A user may then remove the completed shots from the device.

Once all the necessary ingredients are loaded into the device, all the steps for making a batch of gelatin-based shots are performed within the device. Thus, the mixing and chilling may be fully-contained within one device. In another example, the mixing may be fully-contained within one device, while the chilling may be done external to the device. Further, the chilling may be performed more quickly with a chiller module of the device than conventional chilling methods for making gelatin-based shots. By automating the shot-making process, shots may be made more efficiently, thereby saving a user's time and money. Additionally, the mixing and chilling process of the device ensures the consistency of the shots. In one example, businesses such as bars, night clubs, restaurants, hospitals, and/or resorts may utilize the device to more efficiently prepare gelatin-based shots for their customers.

FIG. 1A shows a vehicle including a device including a fluid mixing and heat exchange system. As shown in FIG. 1A, the vehicle is an vehicle, such as airplane 10 including a fluid mixing and heat exchange system 12 which may be contained within a device 14 having a housing 16 (although other vehicles may be used, such as a cruise ship and/or a limousine). The housing 16 encloses all the components of device 14. The fluid mixing and heat exchange system 12 of device 14 includes a controller 18 which controls, via electrical signals, one or more actuators of the device 14 which may include the various pumps, valves, flow meters, motors, fans, heat exchangers, cooling system components, dispensing components, etc. that are discussed herein with reference to FIG. 1A and the additional figures. Controller 18, as well as additional components of device 14 described with reference to FIG. 1A may be similar to the similarly labeled and described components of FIG. 1B, as described further below. Thus, for brevity, full descriptions of the components of device 14 may be found below with reference to the subsequent figures.

Returning to FIG. 1A, device 14 includes a hot water tank 20 which may include a heater for heating water within the hot water tank 20 to a predetermined, upper threshold temperature. The hot water tank is fluidly coupled to a needle (as shown in subsequent FIG. 24 positioned vertically above a pod receptacle 22, where the pod receptacle is adapted to receive a removable pod and rotate and mix contents within the removable pod. Specifically, the pod receptacle 22 may include a motor that rotates, agitates, and/or moves the pod receptacle to mix hot water from the hot water tank with one or more ingredients of the removable pod. The needle is also fluidly coupled to a mixing chamber 28. A fluid (e.g., alcohol) reservoir 108 is additionally fluidly coupled to the mixing chamber 28. As described further below with reference to FIG. 1B, the mixing chamber is adapted to mix the mixture from needle (from the pod) with one or more liquids, including liquid from the fluid reservoir 108. The mixing chamber 28 is fluidly coupled to a first chilling module 30 (which may be similar to chilling module 147, described below with reference to FIG. 1B). The device 14 further includes a coolant tank 32 fluidly coupled to the first chilling module 30 and a radiator 34. The mixing chamber is further fluidly coupled to a dispensing manifold 36 (which may be similar to dispensing manifold 180 described below with reference to FIG. 1B) containing one or more dispensing heads adapted to dispensing a liquid mixture into one or more fluid vessels 38 positioned below the dispensing manifold 36. The device 14 further includes a second chilling module 40 positioned below the dispensing manifold and fluidly coupled to the radiator 34 and the coolant tank 32. In this way, device 14 may be adapted to create a gelatin slurry. Additional description of components of device 14 may be found below for similar components of device 100 of FIG. 1B. Further, the components and fluid lines of device 14 may include additional valves, pumps, heat exchangers, and cooling elements, as described further below with reference to FIG. 1B.

Figure 1B:
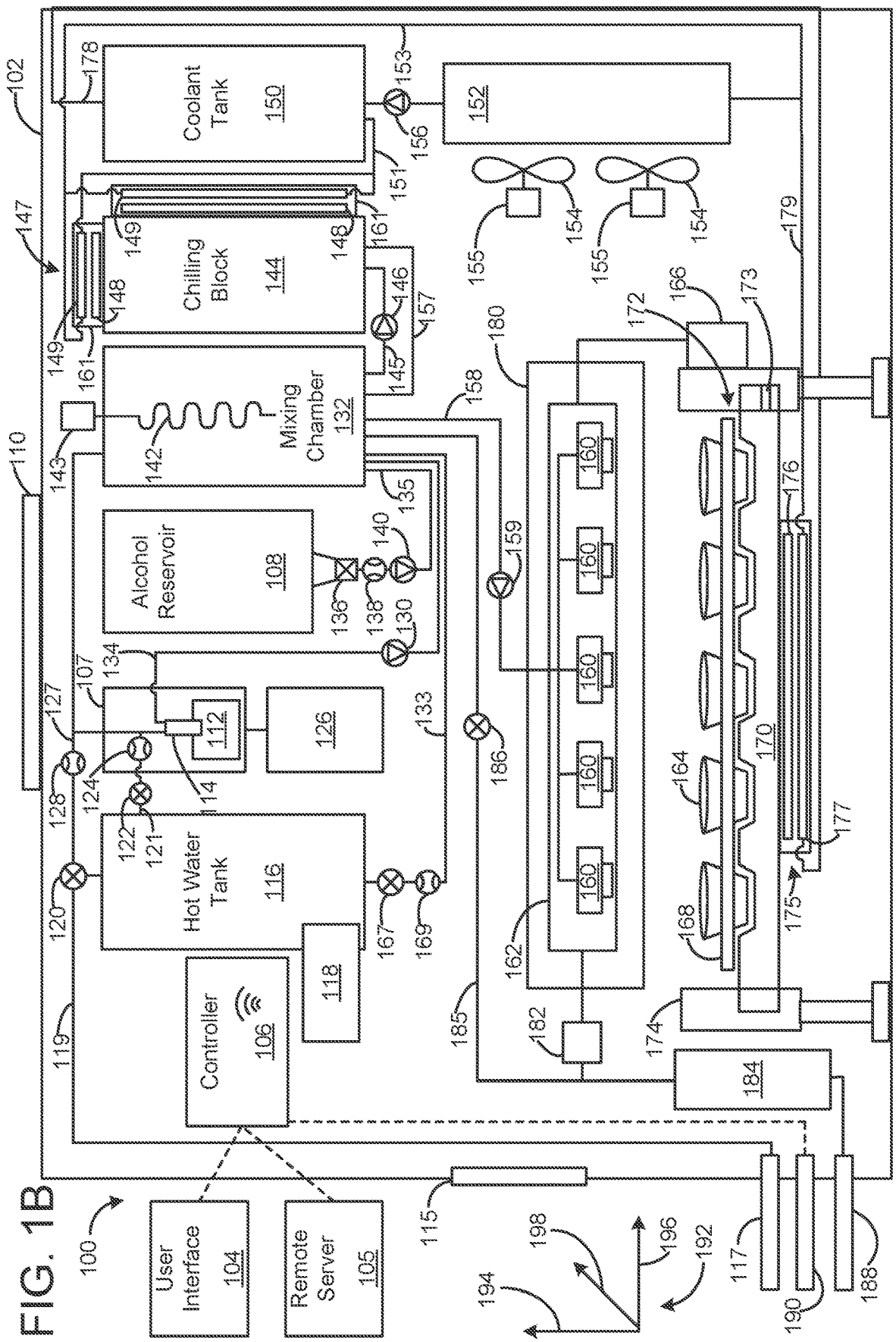
FIG. 1B shows a schematic diagram of a device including a fluid mixing and heat exchange system used to prepare a gelatin-based product, in accordance with one or more embodiments of the present disclosure.

FIG. 1B shows a schematic of an embodiment of a machine or device 100 including a fluid mixing and heat exchange system used for mixing and exchanging heat with various fluids. The device may be similar to the device 14 shown in FIG. 1A. In the example shown in FIG. 1B, device 100 is used for the preparation of gelatin-based food products. Components described below with reference to FIG. 1B may also be included in, or be similar to the components of the device of FIG. 1A. In particular, FIG. 1B is a two-dimensional schematic diagram showing components of the device 100 and how they are fluidly coupled to one another. As such, the actual sizes and relative positions of the components of the device 100 may be different than shown in FIG. 1B. FIGS. 2-17, described further below, are three-dimensional schematics of the device 100 showing the relative sizes and positions of the components within the device. As such, the function of each component may be described with reference to FIG. 1B while the positioning of each component within the device may be described with reference to FIGS. 2-17. FIGS. 2-17 are drawn to approximately to scale. As such FIGS. 2-17 show the relative sizes and positioning of the components of the device 100.

Further, FIGS. 1B-17 show an axis system 192 including a vertical axis 194, a horizontal axis 196, and a lateral axis 198. The axis system 192 may be used to reference the relative positioning of components of the device 100. For example, components may be referred to as "above" or "below" one another with respect to the vertical axis 194. Movement of components in the vertical direction refers to movement along the vertical axis 194, and movement of components in the horizontal direction refers to movement along the horizontal axis 196, and movement of components in the lateral direction refers to movements along the lateral axis 198.

In one example, the device 100 may be referred to as a shot-making device. Generally, the device 100 is configured to prepare multiple single servings of a gelatin-based product. In one embodiment, the device 100 may be configured to prepare gelatin-based shots containing alcohol. In other embodiments, the device 100 may be configured to prepare gelatin-based shots containing non-alcoholic beverages such as fruit juice, energy drinks, and soft drinks. In further embodiments, the device 100 may be configured to prepare gelatin-based shots containing various consumable products such as fruit, vitamins, supplements, etc.

Turning to FIG. 1B, a first embodiment of the shot-making device 100 is shown. The device 100 includes a device housing 102 and a user interface 104. A controller 106 within the housing 102 communicates with the user interface 104. In one example, the user interface 104 may be a touchscreen display coupled to an exterior of the housing 102. Specifically, the user interface 104 may be a graphical user interface used for the configuration, maintenance, and operation of the device 100. In one example, the user interface 104 may be coupled to a side of the exterior of the housing 102. Specifically, the user interface 104 may be positioned on a front face of the housing 102, above a slideable drawer (e.g., drawer 172) of the device 100. In another example, the user interface 104 may be a touchscreen display on a remotely located computer, tablet, or mobile device that communicates wirelessly with the controller 106. In yet another example, the user interface 104 may include a series of buttons positioned on the exterior of the housing 102. In this way, the user interface 104 may be electrically coupled and/or wirelessly coupled to the controller 106.

The device 100 may be wirelessly connected to a remote server 105 via a wireless network. Although a single remote server is shown in the example of FIG. 1B, it should be appreciated that the device 100 may be wirelessly connected to two or more remote servers of a wireless network such as a cloud computing arrangement. Specifically, the controller 106 may include a communication module that may enable wireless communication between the controller 106 and the remote server 105. Wireless connectivity with the remote server 105 may be used to track usage of the device 100, device operating conditions, user preferences, shot consumption rates, alcohol consumption, etc. The remote server 105 may analyze the information received from the controller 106, and generate activity reports, usage reports, etc., that may then be sent to the device 100 and/or displayed to a user.

Further the remote server 105 may utilize the received information to discern trends and/or patterns to formulate user preferences, predict future orders, and send alerts and/or notifications to the user. Additionally, the server 105 may analyze the information received from the controller 106 to diagnose and/or detect component failure and/or degradation. The remote server 105 may send an alert to the user to clean a component of the device 100, when a failure of that component is detected. In other examples, the remote server 105 may send a notification to a user to place an order for additional cartridges and/or alcohol, based on a most recent order, user preferences, and based on the usage rates of the alcohol and/or gelatin powder containing cartridges.

Additionally, the remote server 105 may send updates to the controller 106. For example, the remote server 105 may send the controller updated alcohol and gelatin cartridge information, advertisements which may be tailored to the user based on the user preferences, updated control routines that may be executed by the controller 106, cleaning schedules, etc. In this way, operation of the device may be remotely tracked and monitored by the remote server 105.

The device 100 may further include a power adapter 190 and/or connector for connecting the device 100 to a power source (e.g., a wall outlet). In other embodiments, the device 100 may include a battery and be battery operating. Controller 106 may receive electrical power from the power adapter 190. The controller 106 may distribute electrical power to various components of the device 100 such as pumps, motors, valves, sensors, and other electrically powered components of the device 100. Thus, the controller 106 may adjust operation of the various components of the device 100 by manipulating a voltage and/or current supplied to said components. For example, and as explained in greater detail below, the controller 106 may adjust operation of device components based on a type of gelatin mixture and/or alcohol admitted into the device 100.

The device 100 may operate in a plurality of modes such as one or more of a ready-to-eat mode, a quick-prep mode, and a cleaning mode, where the ready-to-eat and the quick-prep mode may both be shot-making modes. In some examples, the user may select a desired mode via the user interface 104. Additionally or alternatively, the controller 106 may switch between modes based on current operating conditions. For example, the device 100 may run in the cleaning mode once the shots have been made and a shot-making mode has been terminated. In the ready-to-eat shot-making mode, the device 100 may prepare a plurality of consumable, gelatin-based shots, which may include one or more of alcohol, vitamins, fruit, juices, etc. that are set. The quick-prep shot-making mode may include steps similar to the ready-to-eat shot-making mode to produce gelatin-based shots; however, these gelatin-based shots produced during the quick-prep shot-making mode may not be set. Put another way, the gelatin-based shots produced during the quick-prep shot-making mode may not be gelled into a solid state and may instead be in a liquid state upon completion of a cycle in the quick-prep mode, for example with a shortened cooling time as compared to the full-prep ready-to-eat mode. The gelatin-based shots produced during the quick-prep shot-making mode that may be in a liquid state at a completion of a quick-prep shot-making mode cycle may be chilled in an external cooling chamber following completion of the quick-prep shot-making mode cycle. As the quick-prep shot-making mode does not involve fully setting the gelatin-based shots, the quick-prep shot-making mode may have a cycle time that is less than the ready-to-eat shot-making mode, which does include setting the gelatin-based shots. Thus, the quick-prep shot-making mode may be particularly advantageous for use examples where a large quantity of gelatin-based products are desired to be produced in a short amount of time. For example, in cases where a commercial establishment, such as a bar or restaurant, may wish to prepare a large quantity of gelatin-based shots, the quick-prep shot-making mode may be useful for quickly producing the gelatin-based shots in a liquid form, and then these gelatin-based shots in the liquid form may be set in an external cooling chamber, such as an external refrigerator. As each cycle time to produce the gelatin-based shots in the quick-prep shot-making mode does not require that the gelatin-based shot be solidified, the overall cycle time for each quick-prep shot-making cycle may be faster than the cycle time for each ready-to-eat shot-making cycle. The cleaning mode may comprise flowing water or another cleaning fluid through the fluid lines and reservoirs of the device to clear residual gelatin mixture therefrom. Further, a user may remove various components of the device such as drawers and containers for cleaning thereof.

FIG. 1B shows how components of the device 100 are fluidically coupled to one another. First, a description of fluid flow through the device 100 in a shot-making mode is provided, followed by a description of fluid flow through the device 100 in the cleaning mode.

Inside the housing 102, the device 100 includes a consumable cartridge receptacle (also referred to herein as pod receptacle) 107, and one or more liquid reservoirs, such as alcohol reservoir 108. It should be appreciated that although in the example of FIG. 1B only one alcohol reservoir is shown, more than one alcohol reservoir may be included in the device 100. In some examples, the alcohol reservoir 108 and/or the pod receptacle may be permanently secured to the housing 102. However, in other examples, the alcohol reservoir 108 and/or the pod receptacle 107 may be removably coupled to the housing 102. A user may remove and/or access the alcohol reservoir 108 and pod receptacle 107 via a door 110 positioned on a wall (e.g., top wall) of the housing 102 directly above the alcohol reservoir 108 and pod receptacle 107.

Before initiating the shot-making mode, a user may open the door 110 and fill the alcohol reservoir 108 with an alcoholic beverage or other consumable liquid. The user may additionally or alternatively load a consumable cartridge (also referred to herein as pod) 112 into the pod receptacle 107. Loading of the consumable pod 112 may comprise inserting the pod 112 into the pod receptacle 107, and then adjusting an injection needle to penetrate the pod 112. The pod receptacle 107 may be configured (e.g., sized and/or shaped) to receive one or more pods. In some examples, the pod 112 and pod receptacle 107 may include mating features adapted to interface with one another to physically secure the pod 112 and pod receptacle 107. After inserting the pod 112 into the pod receptacle 107, the user may then adjust the position of an injection needle 114 to an engaged position, which may comprise puncturing the pod 112 with the injection needle 114. Thus, the user may push the needle 114 through a wall of the pod 112 (e.g., top wall of the pod 112), such that the needle 114 extends into the interior of the pod 112. The engaged position of the needle 114 therefore, may be a position where the needle 114 extends into the interior of the pod 112.

The consumable pod 112 may be a container containing dry ingredients such as gelatin powder. In one example, the pod 112 may be a rigid container. In another example, the pod 112 may have a shape such as rectangular, square, or cylindrical. Additionally, the pod 112 may be single use (e.g., only used for one batch of shots).

In examples where more than one alcohol reservoir 108 is included in the device 100, each of the alcohol reservoirs may contain a different type of alcohol. In other examples, the alcohol reservoir 108 may contain non-alcoholic liquids such as fruit juice, energy drinks, and soft drink. Further, solid items such as vitamins, supplements, and fruit may be deposited into the alcohol reservoir 108. The alcohol reservoir 108 may be covered by the door 110 and may be sealed at all openings or ports such that the alcohol within the reservoirs may not be contaminated. In one example, the alcohol reservoir 108 may comprise a rectangular cross-section and may be made of a material able to contact food products such as food grade plastic.

Before or after loading the consumable pod 112 and/or filling the alcohol reservoir 108, a user may be prompted via the user interface 104 to identify the cartridge type and/or alcohol type of the pod 112 and alcohol, respectively, in the device 100. The cartridge type may include one or more of a manufacturer, flavor, size, product identification number, serial number, etc., of the pod 112. Similarly, the alcohol type may include one or more of a liquor type, brand, manufacturer, product identification number, etc., of the alcohol in the alcohol reservoir 108.

Thus, a request may be presented to the user on the user interface 104 for the user to identify the cartridge type and/or alcohol type. In one example, the device 100 may include a product identification barcode scanner 115 for identifying the consumable cartridge and/or alcohol types. The scanner 115 may be one of a laser, LED, pen-type, RFID, etc., type scanner. The scanner 115 may be positioned on an interior surface of a wall (e.g., front wall) of the device 100. In this way, a user may hold the pod 112 and/or alcohol bottle near the scanner 115, exterior to the housing 102, and the scanner 115 may identify the cartridge and/or alcohol type based on a barcode or other identifying label of the pod 112 and/or alcohol bottle. Each pod 112 may therefore include an electronic indicator, identifier tag, or other electronic label (e.g., microchip) readable by the scanner 115. Consumable data contained within the electronic identifier tag may then be transferred to the controller 106 from the scanner 115. In one example, consumable data may include one or more of a number of shots to be made from the consumable pod 112, a flavor of contents (e.g., dry ingredients) within the pod 112, an expiration date of the contents within the consumable pod 112, a manufacturing data of the pod 112, and/or a manufacturer of the consumable pod 112.

In another example, the user may select the cartridge type and/or alcohol type from a list of consumable cartridges and/or alcohol types, presented to the user via the user interface 104. For example, a catalog or library of consumable cartridges and/or alcohols may be stored in memory of the controller 106. The user may search the catalog based on a manufacturer, liquor type, etc., via the user interface 104. Further, the user may search a most recent list of alcohols and/or cartridges used in the device 100.

Further, based on the type of cartridge and/or alcohol identified by the user or scanner 115, the controller 106 may look up product information for the pod 112 and/or alcohol, specific to the cartridge and/or alcohol type. Thus, the controller 106 may store product information for each type of pod 112 and/or alcohol in non-transitory memory, such as in a look-up table. The product information for the pod 112 and/or alcohol may therefore be accessed from the look-up table based on the identified cartridge and/or alcohol type. The cartridge product information may include the manufacturer, cartridge size, flavor, gelatin power amount, etc., of the pod 112. Similarly, the alcohol product information may include the manufacturer, liquor type, alcohol concentration, flavor, etc., of the alcohol.

After the pod 112 has been loaded, and one or more consumables have been inserted into the alcohol reservoir 108, the user may initiate the shot-making process via one or more buttons or touch screens included on the device 100, such as via user interface 104. For example, a ready-to-eat shot-making mode or a quick-prep shot-making mode may be selected to initiate the shot-making process. In other examples, the controller 106 may initiate the shot-making process in response to an indication that the pod 112 has been loaded into the pod receptacle 107, one or more consumables have been inserted into the alcohol reservoir 108, and the door 110 is closed. The device 100 may include various sensors for detecting current operating conditions of the alcohol reservoir 108, door 110, and pod 112. For example, the device 100 may include a flow meter or fluid level sensor for determining an amount of alcohol in the alcohol reservoir. Further, a position sensor may be included within the door 110 for estimating a current position of the door 110.

The shot-making process may comprise a first mixing phase where the gelatin powder in the pod 112 is mixed with hot water, a second mixing phase where alcohol and/or additional water is added to the mixture, a first chilling phase where the mixture is cooled to a first threshold temperature, a dispensing phase, where the mixture is dispensed into one or more serving cups, and a second chilling phase where the dispensed mixture is cooled and hardened.

To begin the shot-making process, water from a hot water tank 116 may be introduced into the pod 112. Thus, the shot-making process may begin with the first mixing phase, where water is added to the pod 112 and mixed with the dry gelatin powder contained within the pod 112. The hot water tank 116 may include a heater 118 for heating water included in the tank 116. Tank 116 may receive water from a water source via a water inlet port 117 which may be integrated into the housing 102 for receiving water from a secondary source. In one example, the secondary water source may be a larger water reservoir external to the device 100. In another example, the secondary water source may be tap water. Water may be supplied to the hot water tank 116 from the water inlet port 117 via a first water line 119. In some examples, a first valve 120 may be positioned in the first water line 119 for regulating an amount of water supplied to the hot water tank 116. First water line 119 may therefore be coupled on a first end to the water inlet port 117 and on an opposite second end to the hot water tank 116.

In the description herein valves may in some examples be passive valves such as wax thermostatic valves that adjust position and flow there-through in response to changes in operating conditions. However, in other examples, one or more of the valves in the device 100 may be electrically actable valves, where the position of the valves may be adjusted by an actuator of the valve based on signals received from the controller 106. In this way, the controller 106 may send signals to the actuator of the valve to adjust the position of the valve. The actuator may be mechanically coupled to the valve. In this way, electrical signals (e.g., voltage and/or current) received from the controller 106 may be converted into mechanical movement of the valves.

Valves may be binary valves that may be adjusted between open first positions and closed second positions. In other examples, one or more of the valves may be continuously variable vales and may be adjusted to the open first position, closed second position, and any position therebetween. In the closed second position, substantially no fluid may flow through the valves, and an amount of fluid flowing through the valves may increase as the valve deflects towards a more open position, away from the closed second position, where an opening formed by the valve may increase as the valve is adjusted towards a more open position. In yet further examples, the valves may be three-way valves.

Returning to the description of the hot water tank 116, the heater 118 may heat water in the water tank 116 to a threshold or desired temperature. Specifically, the controller 106 may be in electrical communication with the heater 118, and may adjust operation of the heater 118 (e.g., controller 106 may adjust a voltage and/or current supplied to the heater 118) to heat the water in the water tank 116 to the desired temperature. The desired temperature may be a temperature that causes dry ingredients in the pod 112 to dissolve. In some examples, the desired temperature may be approximately 212° F. However, in other examples, the desired temperature may be a range of temperatures between 150° F. and 212° F. In yet further examples, the controller may adjust and/or set the desired hot water temperature based on the cartridge and/or alcohol type. The temperature of the water in the tank 116 may be estimated based on outputs from a thermocouple or suitable temperature sensor coupled to the tank 116.

The hot water tank 116 may include a fluid level sensor for estimating an amount of water in the tank 116. The controller 106 may regulate an amount of water flowing to tank 116 by adjusting of the valve 120 based on the estimated amount of water in the tank 116. Thus, the controller 106 may regulate water flow into the tank 116 to maintain a desired amount of water in the hot water tank 116.

When the water in the hot water tank reaches the desired temperature and the shot-making process is initiated, the controller may adjust a second valve 122 coupled in a second water line 121 between the hot water tank 116 and the pod 112 towards a more open position. Thus, water from the hot water tank 116 may flow through the second water line 121 in response to opening of the second valve 122. Second water line 121 may fluidically couple the hot water tank 116 and pod 112. Specifically, the second water line 121 may be coupled one a first end to the hot water tank 116, and on an opposite second end to the injection needle 114, for delivering water from the tank 116 to the injection needle 114. A first flow meter 124 may be positioned in the water line 121 for limiting an amount of hot water supplied to the pod 112. The first flow meter 124 may track the amount of water passing through the second water line 121 and into the pod 112, and may cause the valve 122 to close once the required volume of water has been metered to the pod 112. The amount of hot water supplied to the pod 112 may be adjusted (e.g., by the controller 106) based on the cartridge type. For example, more hot water may be supplied for larger cartridges 112 containing more gelatin power. The amount of hot water supplied to the tank 116 may be adjusted by manipulating the position of the valve 122, and/or by regulating an amount of time the valve 122 is held open.

The injection needle 114 receives hot water from the tank 116, and directs the hot water into the pod 112. Thus, the gelatin powder included in the pod 112 mixes with the hot water and dissolves. The water and gelatin mixture may be referred to herein as a first liquid gelatin mixture. To increase the commingling of the water and gelatin powder, a mixing motor 126 may be physically coupled to the pod receptacle 107. The pod receptacle 107 may be rotated and/or oscillated by the motor 126. In one example the motor 126 may be a stepper motor. The motor 126 may be turned on for a duration (e.g., by the controller 106) to mix the water and gelatin powder. In some examples, the duration may be a preset value or range of values, and in other examples, the duration may be determined by the controller 106 based on the cartridge and/or alcohol type.

In some examples, the motor 126 may be turned on once the temperature of the water in the water tank 116 reaches the desired temperature. Additionally or alternatively, the motor 126 may be turned on in response to a determination that a pod 112 has been loaded in the pod receptacle 107. In yet further examples, the motor 126 may be turned on once the valve 122 is opened and water from the water tank 116 is flowing into the pod 112. The motor 126 may rotate the pod receptacle 107 according to a pre-determined agitation profile to mix contents of the pod 112 with the heated liquid (e.g. water) received from the hot water tank 116. Mixing may occur for duration until all the fluid and dry ingredients are fully dissolved. In alternate embodiments, the pod may also be configured to receive solid consumables such as fruit, supplements, and vitamins. As such the solid consumables may be liquefied in the pod 112 through the mixing process and mixed with the dry and fluid ingredients in the pod 112.

In some examples, water from the water inlet port 117 may be directly routed to the pod 112 without passing through the hot water tank 116 via a third water line 127. Third water line 127 may be fluidically coupled to the first water line 119 and the injection needle 114 for delivering cooler water from the water inlet port 117 to the pod 112. Thus, the water flowing through third water line 127 may be at a lower temperature than both the water in the water tank 116, and the water flowing from the tank 116 to the pod 112 via the second water line 121. A second flow meter 128 may be positioned within the third water line 127 for limiting an amount of water flowing to the injection needle 114 and pod 112. Flow meter 128 may be the same and/or similar to flow meter 124 described above.

Once the first liquid gelatin mixture is mixed (e.g., the gelatin powder is dissolved in the water), the gelatin mixture may be pumped out of the pod 112 through the needle 114, via a first pump 130 towards a mixing chamber 132 to begin the second mixing phase. The pump 130 may be coupled in a first liquid gelatin mixture line 134. The first liquid gelatin mixture line 134 may be coupled on a first end to the needle 114, and on an opposite second end to the mixing chamber 132. In one example the first pump 130 may be a peristaltic pump. The first liquid gelatin mixture mixes with a secondary liquid in the mixing chamber 132, where the secondary liquid may comprise one or more of alcohol and/or water. Thus a desired amount of the secondary liquid may be mixed with the first liquid gelatin mixture in the mixing chamber 132.

Alcohol from the alcohol reservoir 108 may be pumped to the mixing chamber 132 via an alcohol line 135. Specifically, the alcohol line 135 may be coupled to the alcohol reservoir 108 on a first end and to the mixing chamber 132 on an opposite second end for flowing alcohol from the reservoir 108 to the mixing chamber 132. The alcohol line 135 includes a valve 136, a flow meter 138, and a second alcohol pump 140. The valve 136 may be positioned proximate to a bottom face of the alcohol reservoir 108, for example, the valve 136 may be coupled to the bottom face of the alcohol reservoir 108. Controller 106 may adjust the position of the valve 136 by adjusting a current and/or voltage supplied to an actuator of the valve 136. Alcohol may be supplied to the mixing chamber 132 by opening the valve 136 and powering on the pump 140. Second alcohol pump 140 may in one example be a peristaltic pump. Pump 140, therefore pumps alcohol from the alcohol reservoir 108 to the mixing chamber 132, to mix with the first liquid gelatin mixture. Flow meter 138 may be the same or similar to flow meter 124 described above.

Further, flow meter 138 may be used to track alcohol consumption. Thus, the flow meter 138 may be used to estimate an amount of alcohol in the alcohol reservoir 108, based on an amount of alcohol exiting the alcohol reservoir 108 via the flow meter 138. In this way, the controller 106 may monitor an amount of alcohol in the alcohol reservoir 108, based on alcohol flow rates through the flow meter 138. When the alcohol volume in the alcohol reservoir 108 decreases below a threshold, the controller 106 may generate a notification to a user to refill the alcohol reservoir 108 and may present the notification to the user on the user interface 104. In this way, a user may be alerted when alcohol levels in the alcohol reservoir 108 are low, and additional alcohol needs to be added to the alcohol reservoir 108.

Alcohol from the alcohol reservoir 108 may be delivered to the mixing chamber 132 before, during and/or after the first liquid gelatin mixture is delivered to the mixing chamber 132 via line 134. The timing and amount of alcohol delivered to the mixing chamber 132 may be adjusted by one or more of manipulating the position of the valve 136, adjusting an amount of time the valve 136 is held open, adjusting a speed of the pump 140, and adjusting an amount of time the pump 140 is turned on. Thus, the valve 136 is adjusted and the pump 140 is turned on to deliver a desired amount of alcohol to the mixing chamber 132.

In some examples, the desired amount of alcohol may be a pre-set amount, or may be in a pre-set range of values. In other examples, the desired amount of alcohol may be adjusted based on a number of shots to be made. In yet further examples, the desired amount of alcohol may be determined and/or adjusted based on the type of cartridge and/or type of alcohol. The desired amount of alcohol may further be adjusted based on an amount of powder and/or dry ingredient in the pod 112 as determined based on the cartridge product information, and/or a size of the pod 112. In still further examples, the desired amount of alcohol to be supplied to the mixing chamber 132 may be adjusted based on a desired alcohol content of the shots. For example, a user may input and/or select a desired alcohol concentration for the shots via the user interface 104. The controller 106 may determine a desired amount of alcohol required to achieve the desired alcohol concentration based on the alcohol concentration of the alcohol in the alcohol reservoir 108, and an estimated volume of the first liquid gelatin mixture. Thus, the alcohol concentration of the shots may be user-adjustable.

The mixing chamber 132, therefore receives the first liquid gelatin mixture from the pod 112, and in some examples may additionally receive alcohol from the alcohol reservoir 108. As such, the first liquid gelatin mixture and the alcohol mix in the mixing chamber 132 to form a second liquid gelatin mixture. The mixing chamber 132 includes a mixing element 142 to increase commingling of the first liquid gelatin mixture and the alcohol. In some example the mixing element 142 may be a passive mechanical device that mixes the alcohol and the first liquid gelatin mixture as they enter the mixing chamber 132. However, in other examples, the mixing element 142 may an actively controlled device, and may be coupled to an actuator 143. The actuator 143 may be controlled based on signals received from the controller 106, for rotating and/or adjusting the mixing element 142. The actuator 143 may powered on until the alcohol and first liquid gelatin mixture are mixed and form a second liquid gelatin mixture. Actuator 143 may also be referred to herein as motor 143.

In other examples, cold water from the water inlet port 117 may be mixed with the first liquid gelatin mixture in the mixing chamber 132. Thus, colder water from the water inlet port 117 may be directly routed to the mixing chamber 132 without passing through the hot water tank 116. As such, the mixing chamber 132 may be fluidically coupled to the water inlet port 117 via a water line such as line 127. Thus, water flowing into the mixing chamber 132 from the inlet port 117 may be at a lower temperature than first liquid gelatin mixture. Additionally or alternatively, hot water from the hot water tank 116 may be routed to the mixing chamber 132 to mix with the first liquid gelatin mixture. Thus, the mixing chamber 132 may be fluidically coupled to the hot water tank 116 via a water line 133. A valve 167 positioned in the water line 133 may regulate an amount of water flowing from the hot water tank 116 to the mixing chamber 132. The water line 133 may additionally include a flow meter 169. Flow meter 169 may be the same or similar to flow meter 124 described above.

Water from one or more of the hot water tank 116 and/or inlet port 117 may be delivered to the mixing chamber 132 before, during and/or after the first liquid gelatin mixture is delivered to the mixing chamber 132 via line 134. The timing and amount of water delivered to the mixing chamber 132 may be adjusted to deliver a desired amount of water. Further, the relative amount of water delivered to the mixing chamber 132 from the hot water tank 116 and inlet port 117 may be adjusted to achieve a desired temperature of water.

The desired amount of water may be a pre-set amount, or may be in a pre-set range of values. In other examples, the desired amount of water to be added to the mixing chamber 132 may be adjusted based on a number of shots to be made. In yet further examples, the desired amount of water may be determined and/or adjusted based on the type of cartridge and/or type of alcohol. The desired amount of water may further be adjusted based on an amount of powder and/or dry ingredient in the pod 112 as determined based on the cartridge product information, and/or a size of the pod 112. In still further examples, the desired amount of water to be supplied to the mixing chamber 132 may be adjusted based on a desired alcohol content of the shots.

Further, the desired amount of water may be adjusted based on a volume of alcohol delivered to the mixing chamber 132 from the alcohol reservoir 108. In some examples, substantially no alcohol may be delivered from the alcohol reservoir 108 to the mixing chamber 132. Thus, in some examples, a user may desire to make non-alcoholic shots, and as such, alcohol may not be added to the first liquid gelatin mixture. Thus, in some examples, only water may be added to the first liquid gelatin mixture in the mixing chamber 132 to form the second liquid gelatin mixture. Thus, in some examples, the second liquid gelatin mixture may not include alcohol.

The amount of water provided to the mixing chamber 132 may therefore be adjusted based on an amount of alcohol provided to the mixing chamber 132. Together, the alcohol volume and water volume provided to the mixing chamber 132 may be adjusted to achieve a desired liquid volume. Thus, a desired amount of secondary liquid, which may be a combination of one or more of alcohol and water, is added to the first liquid mixture in the mixing chamber 132. The desired amount of secondary liquid to be added to the first liquid mixture in the mixing chamber 132 to form the second liquid gelatin mixture may be approximately 25 fluid ounces. However, the desired amount may be greater or less than 25 fluid ounces depending on a desired number of shots to be made, size of the shots, etc. An amount of water to be added to the mixing chamber 132 may depend on the amount of alcohol added to the mixing chamber 132, and thus may vary from 10-25 fluid ounces. However, in other examples less than 10 fluid ounces of water may be added to the mixing chamber 132. In some examples, substantially no water may be added to the mixing chamber 132. In yet further examples, more than 25 fluid ounces of water may be added to the mixing chamber 132.

Thus, during the second mixing phase, alcohol from the alcohol reservoir 108 and/or water from one or more of the hot water tank 116 and water inlet port 117 may be mixed with the first liquid gelatin mixture in the mixing chamber 132. In some examples, the first liquid gelatin mixture and the alcohol may be held in the mixing chamber 132 for duration. After the duration, and/or once the first liquid gelatin mixture and the alcohol are mixed, the second liquid gelatin mixture is pumped out of the mixing chamber 132 towards a chilling block 144 of a first chilling module 147 to begin the first chilling phase. For example, the second liquid gelatin mixture is pumped out of the mixing chamber 132 towards the chilling block 144 of a first chilling module 147 to begin the chilling phase when the device is operating in the ready-to-eat shot-making mode. In other examples, such as a quick-prep shot-making mode, however, the second liquid gelatin mixture may be may not pass through the chilling block 144 and may instead bypass the entire or a portion (or stage) of the chilling block 144. In this way, the heated liquid mixture may not be chilled by the chilling block 144, or chilled to a lesser degree than in the quick-prep shot-making mode, and instead be dispensed at a higher temperature than during the ready-to-eat shot-making mode. In other examples, operating the device in the quick-prep shot-making mode may still include routing the second liquid gelatin mixture through the chilling block 144, but operating the chilling block 144 so that a temperature of the second liquid gelatin mixture after flowing the second liquid gelatin mixture through the chilling block 144 is greater than a temperature of the second liquid gelatin mixture after flowing the second liquid gelatin mixture through the chilling block 144 in a ready-to-eat shot-making mode. Further still, in another example, operating the device in the quick-prep shot-making mode may include cooling the second liquid gelatin mixture via the chilling block 144 to a same or substantially the same temperature in the quick-prep shot-making mode as a temperature that the second liquid mixture is cooled to via the chilling block 144 in the ready-to-eat shot-making mode. However, in such examples where the second liquid gelatin mixture may be cooled to a same or substantially the same temperature via the chilling block 144 during both the ready-to-eat shot-making mode and the quick-prep shot-making mode, the second liquid gelatin may be prevented from further decreasing in temperature that may cause setting of the second liquid gelatin in the quick-prep shot-making mode, whereas in the ready-to-eat shot-making mode a temperature of the second liquid gelatin may be further decreased to cause setting of the second liquid gelatin.

In at least one example, the first gelatin mixture and/or alcohol may continually be circulated between the mixing chamber 132 and the chilling block 144. Thus, the first chilling phase may comprise flowing the second liquid gelatin mixture through the chilling block 144 of the first chilling module 147 to cool the gelatin mixture. The second liquid gelatin mixture may be pumped through a second liquid gelatin mixture line 145 by a third pump 146 coupled in the second liquid gelatin mixture line 145. The second liquid gelatin mixture line 145 may be coupled on a first end to the mixing chamber 132 and on an opposite second end to the chilling block 144 for flowing the second liquid gelatin mixture there-between. Pump 146 may be a peristaltic pump.

The chilling block 144 may be included as part of the first chilling module 147 that cools (e.g., remove heat from) the second liquid gelatin mixture via one or more first heat exchangers 149. The first chilling module 147 thus comprises the chilling block 144 and the one or more first heat exchangers 149. Further, in some examples, the first chilling module 147 may additionally include one or more first thermoelectric device 148. For example, the first thermoelectric device 148 may comprise Peltier chips. The thermoelectric device 148 may also be referred to herein as chilling device 148 and/or cooling device 148. The thermoelectric device 148 are thermoelectric converter elements that create a temperature differential between their electrodes when an electric current is supplied thereto. The thermoelectric device 148 may receive electric current from controller 106. Thus, a "hot side" and "cold side" may be developed within the devices 148 in response to the supplied electric current, with the "hot side" being at a higher temperature than the "cold side." The thermoelectric device 148 may be orientated and supplied with current such that their "cold sides" all face and/or physically contact a conduit or surface containing the second liquid gelatin mixture, and the "hot sides" face and/or physically contact one or more of the heat exchangers 149. Thus, the "cold sides" may be positioned more proximate a conduit or reservoir containing the second liquid gelatin mixture and the "hot sides" may be positioned more proximate one or more of the heat exchangers 149. As such, the thermoelectric device 148 may be positioned between one or more of the heat exchangers 149 and a conduit or reservoir containing the second liquid gelatin mixture.

As shown in the example of FIG. 1B, the heat exchangers 149 may be coupled to walls of the chilling block 144, on an exterior of the chilling block 144. Specifically, each of the heat exchangers 149 may be coupled to a different wall of the chilling block 144. For example, and as shown in greater detail below with reference to FIG. 16, a first heat exchanger may be coupled to a side wall of the chilling block 144, a second heat exchanger to a top wall of the chilling block 144, and a third heat exchanger to a back wall of the chilling block 144. Thus, in some example, the chilling module 147 may include exactly three heat exchangers 149. However, in other examples, more or less than three heat exchangers 149 may be included in the chilling module 147.

In examples where the thermoelectric devices 148 are included in the chilling module 147, the devices 148 may be included between the chilling block 144 and the heat exchangers 149. The thermoelectric device 148 may be coupled to walls of the chilling block 144 for removing heat from the second liquid gelatin mixture within the chilling block 144 via conduction. Thus, the thermoelectric device 148 may be in face-sharing and/or physical contact with the exterior surfaces of the walls of the chilling block 144. Specifically, the "cold sides" of the thermoelectric device 148 be facing and/or in physical contact with the walls of the chilling block 144. Further, the "hot sides" may face away from the chilling block 144 and towards one or more liquid heat exchangers 149. Specifically, the "hot sides" of the thermoelectric device 148 may be in physical contact with one or more of the heat exchangers 149. The "cold sides" of the thermoelectric device 148 draw heat from the chilling block 144, and thus cool the second liquid gelatin mixture contained within the chilling block 144.

Further, in some examples, each of the heat exchangers 149 may be coupled directly to a thermoelectric device 148, and may integrally form a heat exchange assembly 161. The heat exchange assembly 161 may therefore comprise one of the heat exchangers 149 and a thermoelectric device 148. In some examples, the heat exchange assembly 161 may be constructed from a thermally conductive material such as aluminum.

However, in other examples, it should be appreciated that one or more of the heat exchangers 149 and/or the thermoelectric device 148 may be included within the chilling block 144. Specifically, the chilling block 144 may include one or more conduits for carrying the second liquid gelatin mixture. The one or more conduits may include a plurality of turns to increase the length of the fluid path through the chilling block 144. As such, the surface area of the conduits may be increased, and the amount of heat transfer (e.g., cooling) between the second liquid gelatin mixture and the heat exchangers 149 may be increased. The heat exchangers 149 may be included on one or more sides of the conduits to increase heat transfer there-between. Further, the thermoelectric device 148 may be positioned between the heat exchangers 149 and the conduits carrying the liquid gelatin mixture.

Coolant from a coolant tank 150 may circulate through the liquid heat exchangers 149 and absorb heat from the "hot sides" of the thermoelectric device 148. In other examples, where the thermoelectric devices 148 are not included in the chilling module 147, the heat exchangers 149 absorb heat directly from the second liquid gelatin mixture in the chilling block 144. In this way, by circulating coolant through the heat exchangers 149, the temperature of the thermoelectric device 148 may be kept below the temperature of the second liquid gelatin mixture in the chilling block 144. Further, the second liquid gelatin mixture may be cooled to a lower temperature than would be obtained if the heat exchangers 149 were not included. Coolant may be supplied to the heat exchangers 149 via one or more first coolant supply lines 151. As the coolant flows through the heat exchangers 149 it may be warmed. Thus, after flowing through the heat exchangers 149, the coolant may be directed through a coolant return line 153 to a radiator 152 to be cooled.

The radiator 152 may be an air cooled radiator, where heat from the coolant may be transferred to ambient air. Specifically, one or more radiator fans 154 may be included to blow air through the radiator 152, increasing heat transfer from the coolant in the radiator to the ambient air flowing therethrough. Thus, the temperature of the coolant may be reduced by the air blown from the radiator fans 154. Radiator fans 154 may be powered via respective actuators 155. The actuators 155 may be electric motors and may receive electrical power from the controller 106. The controller 106 may therefore adjust an amount of cooling of the coolant by adjusting operation of the fans 154 via the actuators 155. Thus, the actuators 155 may be physically coupled to the radiator fans 154 for rotating the radiator fans based on electrical signals received from the controller 106.

Coolant may be pumped through the coolant lines 151 and 153 via a pump 156. The pump 156 may an electric pump. In some examples, the pump may be a centrifugal pump. Although the pump 156 is shown in the example of FIG. 1B to be coupled between the radiator 152 and the coolant tank 150, it should be appreciated that in other examples, the pump 156 may be positioned in an alternate position in either of the coolant lines 151 and 153. For example, the pump 156 may be positioned in the coolant line 151 between the coolant tank 150 and the heat exchangers 149. In other examples, the pump 156 may be positioned between the heat exchangers 149 and the radiator 152. After flowing through the radiator 152 and being cooled, coolant may return to the coolant tank 150.

It should be appreciated that although a thermoelectric cooling system is shown in the example of FIG. 1B, other refrigeration or cooling systems may be used to cool the second liquid gelatin mixture, in other embodiments. For example, a refrigeration system including a compressor and a condenser may be utilized to cool coolant, and circulate the cold coolant through the heat exchangers 149 to absorb heat directly from the second liquid gelatin mixture without the use of the thermoelectric device 148. Thus, vapor-absorption and/or vapor compression refrigeration cycles may be utilized to cool the second liquid gelatin mixture. Further, the heat exchangers 149 may be configured as one or more of liquid to liquid, liquid to air, air to liquid, and air to air heat exchangers. Thus, the coolant flowing through the heat exchangers 149 may be in the form of liquid or vapor. The heat exchangers 149 may further comprise one or more of a shell and tube heat exchanger, plate heat exchanger, regenerative heat exchanger, adiabatic wheel heat exchanger, etc.

From the chilling block 144, the second liquid gelatin mixture may return to the mixing chamber 132 after having been cooled by the chilling block 144 of the chilling module 147. In some examples, the second liquid gelatin mixture may be continually pumped between the mixing chamber 132 and the chilling block 144 by the pump 146 for a duration or until the second liquid gelatin mixture has reached a first threshold temperature. Thus, the chilling module 147 may cool the second liquid gelatin mixture to a first threshold temperature.

In other examples, the second liquid gelatin mixture may be pumped to chilling block 144, and may remain in the chilling block 144 for a duration or until it has reached the threshold temperature. Thus, the pump 146 may be turned on to pump the second liquid gelatin mixture from the mixing chamber 132 to the chilling block 144. Then the pump 146 may be turned off once the second liquid gelatin mixture is contained within the chilling block 144. Then after the duration and/or when the second liquid gelatin mixture has reached the first threshold temperature, the second liquid gelatin mixture may be pumped back to the mixing chamber 132 from the chilling block 144. Thus, the pump 146 may be turned back on to pump the second liquid gelatin mixture from the chilling block 144 back to the mixing chamber 132.

The first threshold temperature that the second liquid gelatin mixture may be cooled to by the chilling module 147 to may be approximately 40° F. However, in other examples, the first threshold temperature may be a range of temperatures between 30° F. and 50° F. The mixing chamber 132 and/or chilling block 144 may comprise a temperature sensor for estimating the temperature of the second liquid gelatin mixture included therein. Thus, the controller 106 may control operation of the pump 146 to continue pumping coolant between the mixing chamber 132 and chilling block 144 to cool the second liquid gelatin mixture based on signals received from the temperature sensor, until the second liquid gelatin mixture reaches the threshold temperature.

The second liquid gelatin mixture may be pumped back to the mixing chamber 132 via the pump 146. In some examples, the second liquid gelatin mixture may return to the mixing chamber 132 via a third gelatin mixture line 157. The third gelatin mixture line 157 may be coupled on a first end to the chilling block 144 and on an opposite second end to the mixing chamber 132. Further, the second liquid gelatin mixture may remain in the mixing chamber 132 until it is desired to dispense the mixture. In some examples, the first chilling phase may stop, and thus the second liquid gelatin mixture may stop being pumped between the mixing chamber 132 and chilling block 144, after duration, and after the duration the mixture may remain in the mixing chamber 132 until it is desired to dispense the mixture. However, in other examples, the first chilling phase may terminate and the second liquid gelatin mixture may stop being pumped between the mixing chamber 132 and chilling block 144 once the second liquid gelatin mixture has cooled to the first threshold temperature, and may remain in the mixing chamber 132 after it has reached the first threshold temperature until it is desired to dispense the mixture. In yet further examples, the second liquid gelatin mixture may continue to be pumped between the mixing chamber 132 and chilling block 144 until it is desired to dispense the mixture. For example it may be desired to dispense the mixture after the mixture has circulated through the chilling 144 for duration. Thus, the second liquid gelatin mixture may continue to be pumped between the mixing chamber 132 and chilling block 144 for a duration, and then once the duration expires, it may be desired to dispense the mixture, and as such, the pump 146 may continue to operate until all of the gelatin mixture has been dispensed from the mixing chamber 132 and chilling block 144. In another example it may be desired to dispense the mixture after the mixture has reached the first threshold temperature. Thus, the second liquid gelatin mixture may continue to be pumped between the mixing chamber 132 and chilling block 144 until the mixture reaches the first threshold temperature, and then once the mixture is cooled to the first threshold temperature, it may be desired to dispense the mixture, and as such, the pump 146 may continue to operate until all of the gelatin mixture has been dispensed from the mixing chamber 132 and chilling block 144. Thus, when the first chilling phase is complete, the dispensing of the shots may begin.

To dispense the second liquid gelatin mixture, a pump 159 may be turned on. The pump 159 may be a peristaltic pump.

Controller 106 may turn on the pump 159 when it is desired to dispense the mixture, such as when the second liquid gelatin mixture has reached the threshold temperature, and/or after duration of pumping the second liquid gelatin mixture through the cooling module. Pump 159 may be positioned in a dispensing line 158 between the mixing chamber 132 and one or more dispensing heads 160. The dispensing line 158 may be coupled on a first end to the mixing chamber 132 and on an opposite second end to one or more dispensing heads 160. In some examples, the dispensing heads 160 may be fluidically coupled to the mixing chamber 132 via a common fluid connection. However, in other examples, each of the dispensing heads 160 may include discrete fluid connections to the line 158. In such examples, an amount of fluid flowing to each of the dispensing heads 160 may be regulated via one or more valves (not shown in FIG. 1B). Thus, the pump 159, pumps the second liquid gelatin mixture from the mixing chamber 132, through the dispensing line 158 to each of the dispensing heads 160.

In some examples, approximately 20 dispensing heads 160 may be included in the device 100. However, in other examples, more or less than 20 dispensing heads 160 may be included. The dispensing heads 160 may be included in a dispensing manifold 180 positioned vertically above a plurality of cups 164. Thus, the dispensing heads 160 may be configured to dispense the second liquid gelatin mixture into the cups 164. Cups 164 may also be referred to herein as fluid vessels 164. In some examples, the dispensing heads 160 may be slots included within a moveable sheet 162 of the dispensing manifold 180, and as such, the dispensing heads 160 may also be referred to herein as dispensing slots 160.

In some examples, the dispensing heads 160 may remain in a relatively fixed position while the mixture is being dispensed into the cups 164. Thus, the dispensing heads 160 may only move when switching between the cleaning mode and the dispensing mode. In such examples, the number of cups 164 may be approximately the same as the number of dispensing heads 160. Thus, the device may include approximately 20 cups. However, in other examples, more or fewer than 20 cups 164 may be included in the device 100. Further, the dispensing manifold 180 may include holes on a bottom wall for dispensing the gelatin mixture into the cups 164. Thus, the gelatin mixture may drop into the cups 164 from the dispensing heads 160 via the holes in the dispensing manifold 180.

However, in other examples, the dispensing heads 160 may be translated via a motor 166 to which the dispensing heads 160 are physically coupled. The motor 166 may translate the dispensing heads 160 horizontally. The controller 106 may adjust the position of the dispensing heads 160 via actuation of the motor 166. As such, the controller 106 may translate the dispensing heads 160 to a desired position. The dispensing heads 160 may for example extend along a length of the manifold 180 along the lateral axis 198.

The cups 164 may be arranged in columns extending along a width of a tray 168 in which the cups 164 are held, in a direction of the lateral axis 198, and rows extending along the length of the tray 168, in a direction of the horizontal axis 196 (e.g., in an array). Thus, each of the dispensing heads 160 may be aligned over each cup in a row or column of cups in the tray 168. After filling a row or column, the dispensing heads 160 may stop dispensing the gelatin mixture, and may be moved horizontally by the motor 166, until they are vertically positioned over the next row or column of cups 164. Once over an unfilled row or column or cups 164, the dispensing heads 160 may resume dispensing the gelatin mixture. The motor 166 may continue to translate the dispensing heads 160 in this manner until all of the cups 164 are filled with the gelatin mixture. In some examples, the amount of gelatin dispensed into the cups 164 may be varied and may not be uniform. The amount of gelatin mixture dispensed by the dispensing heads 160 may be controlled by the pump 159 based on electrical power provided to the pump 159 by the controller 106.

It should also be appreciated that in some examples, pump 146 and pump 159 may pump the second liquid gelatin mixture between the mixing chamber 132 and the chilling block 144. A valve, such as a three-way valve, may then be adjusted to direct the gelatin mixture towards the dispensing heads 160. Thus, the valve may be adjusted to flow fluid from the mixing chamber 132 or chilling block 144 to the dispensing heads 160 when it is desired to dispense the mixture. Thus, both of the pumps 146 and 159 may provide a motive force to pump the second liquid gelatin mixture between the mixing chamber 132 and the chilling block 144 to cool the mixture, and between the mixing chamber 132 and the dispensing heads 160 when dispensing the mixture. Thus, in some examples, both of the pumps 146 and 159 may remain on during the first chilling of the mixture by flowing the mixture between the mixing chamber 132 and chilling block 144, and the dispensing of the mixture.

Tray 168 holds the cups 164 and restricts relative movement of the cups 164. In some examples, the cups 164 may be removably coupled to the tray 168. However, in other examples, the cups 164 may be permanently secured to the tray 168. The tray 168 may be held in a retainer 170. Together, the tray 168, cups 164, and retainer 170 may comprise a drawer 172. The drawer 172 including the tray 168, retainer, 170, and cups 164 may be removably coupled to the device 100. Specifically, the drawer 172 may be accessed via a door, and may slide in and out of the housing 102.

Figure 2:
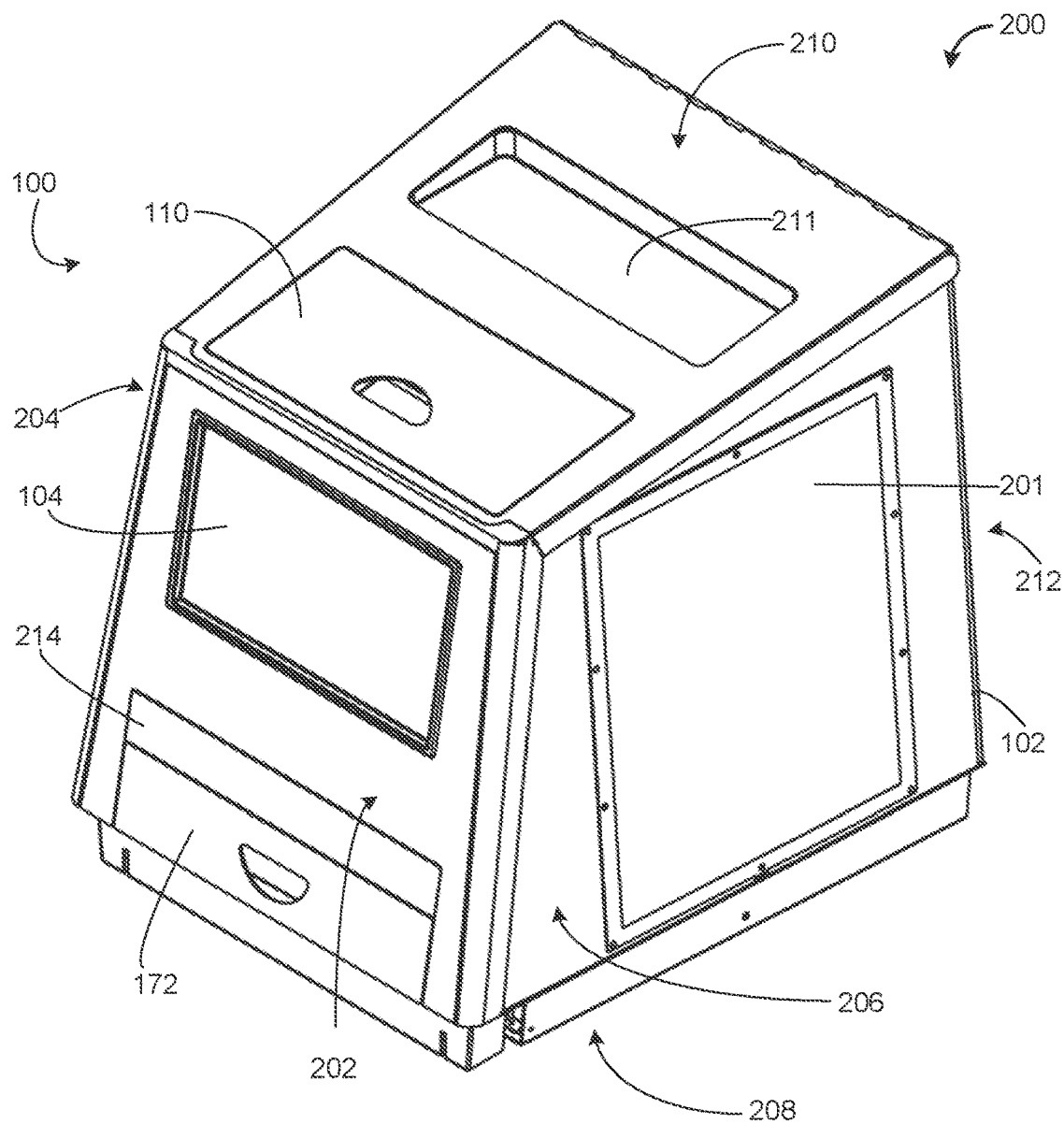
FIG. 2 shows a first front exterior perspective view a device used to prepare a gelatin-based product, such as the device shown in FIG. 1B, in accordance with one or more embodiments of the present disclosure.
Figure 2:
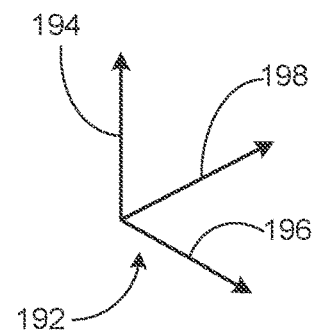

Retainer 170 may be coupled to a drawer mount 174 that may be built into the housing 102. Further, retainer 170 may be slidable into and out of the device 100 when a door (not shown in FIG. 1B) is opened. Specifically, retainer 170 may slide along a groove in the drawer mount 174. The door may be a door (e.g., door 214 shown in FIG. 2 positioned in the front face of the housing 102, in front of the tray 168, as shown in FIG. 2. For example, a user may open the door and then slide the drawer 172 including the retainer 170 and tray 168, out from the inside of the device 100, thereby revealing the tray 168 to the user. The user may then load cups 164 into the tray 168, and load the tray 168 on the retainer 170. The retainer 170 may include a number of slots for receiving the cups 164. Thus, the slots may be sized similarly to the cups such that one cup fits within each slot. After loading the required number of cups, the user may move the drawer 172 back inside of the device 100 and underneath the dispensing heads 160 of the dispensing manifold 180, and close the door. The user may also load the cups 164 with fruit, vitamins, supplements, or other consumable products to be mixed with the second liquid gelatin mixture from the dispensing line 158.

As described above, the cups 164 may be sized to fit within slots of the tray 168. In one example, the cups and corresponding tray slots may have an oval cross-section with. The diameters of the cross-sections of the cups 164 may increase towards an opening of the cups 164. The diameter of the cross-section of the cups 164 proximate the opening of the cups 164 may be slightly larger than the diameters of the slots in the tray 168. Thus, the cups 164 may extend partially through the slots in the tray 168, such that the cups 164 may still be supported by the tray 168 at their tops. The recesses in the retainer 170 may be sized accordingly to receive the portion of the cups 164 extending through the tray 168. In alternate embodiments, the cups and corresponding slots may have a different cross-section (e.g., circular or square) with a different size. For example, the cross-section of the cups may be circular.

In examples where the device may be operated in the quick-prep shot-making mode, a cycle for the quick-prep shot-making mode may be complete after the second gelatin mixture has been dispensed into the cups 164. For example, in embodiments where the device may be operated in the quick-prep shot-making mode, following dispensing the second gelatin mixture into the cups 164, the quick-prep shot-making cycle may be complete, and the device may enable access to the cups 164 for removal. The cups 164 containing the quick-prep shot-making mode gelatin-based product (which is in a liquid state) may then be removed from the device 100 and chilled in an external cooling chamber to solidify the gelatin-based product. Once the second liquid gelatin mixture has been dispensed into the cups 164 when operating in a ready-to-eat shot-making mode, however, a temperature of the mixture may be measured via a temperature sensor such as temperature sensor 173. The temperature of the mixture as estimated based on outputs from the temperature sensor 173 may be used by the controller 106 to set a countdown timer for a second shot chilling phase, also referred to herein as shot hardening phase. In another example, the countdown timer for the second shot chilling phase may have a pre-set duration that is not based on temperature, and as such temperature sensor 173 may not be included. Thus, the ready-to-eat shot-making mode may have an overall longer cycle time compared to the quick-prep shot-making mode, as the ready-to-eat shot-making mode may require more cooling time to harden the gelatin-based product. In particular, the quick-prep shot-making mode may not require the second shot chilling phase to harden the gelatin-based products, whereas the ready-to-eat shot-making mode may require the second shot chilling phase to harden the gelatin-based products. Therefore, a cycle time for operating the device in the ready-to-eat shot-making mode may be greater than a cycle time for operating the device in the quick-prep shot-making mode, where a cycle time may include a time from initiating the production of a gelatin-based product to removal of a gelatin-based product from the device is enabled.

During the second chilling phase, the second liquid gelatin mixture in the cups 164 may be cooled via a second chilling module 175 to harden (e.g., solidify) the mixture. As described above, the second chilling phase may run for a duration and/or until the mixture in the cups 164 has reached a second threshold temperature, the second threshold temperature being less than the first threshold temperature. The second threshold temperature may represent a temperature at which the shots are hardened. Thus, the second chilling phase may end when the shots are hardened and ready for consumption. Once the second chilling phase ends, the shot-making phase may be complete.

As shown in the example of FIG. 1B, the chilling module 175 may be positioned below the drawer 172. Specifically, the chilling module 175 may be physically coupled to a bottom surface of the retainer 170, in some examples. However, in other examples, the chilling module 175 may be physically coupled to a stationary surface below the drawer 172 that is not coupled to the drawer 172. Thus, the chilling module 175 may remain stationary when the drawer 172 slides into and out of the device housing 102. The second chilling module 175 may the same and/or similar to the first chilling module 149 described above. As such, the second chilling module 175 may comprise one or more heat exchangers 177, which may be the same or similar to heat exchangers 149 described above. Further, the second chilling module 175 may comprise one or more thermoelectric devices 176 which may be the same or similar to thermoelectric device 148 described above.

The "cold side" of the thermoelectric devices 176 may be positioned such that it faces and/or physically contact the bottom surface of the drawer 172. As such, the "warm side" may be positioned such that it faces away from the bottom surface of the drawer 172, and towards the heat exchangers 177. Thus, the thermoelectric devices 176 may be positioned between the drawer 172 and the heat exchangers 177.

The heat exchangers 177 of the second chilling module 174 may receive coolant from the coolant tank 150 via a coolant inlet line 178. After flowing through the one or more heat exchangers 177, coolant may be routed to the radiator 152 via a coolant outlet line 179. In some examples, pump 156 may pump coolant through the heat exchangers of the first chilling module 147 and the second chilling module 175. Thus, the pump 156 may circulate coolant between the coolant tank 150, radiator 152, and both the first and second chilling modules 149 and 175. However, in other examples, a second coolant pump may be included to pump coolant through the coolant lines 178 and 179, and the second chilling module 175. Thus, in some examples, each of the chilling modules 147 and 175 may include their own pump for circulating coolant between the chilling modules and the coolant tank 150 and radiator 152.

In this way, the second chilling module 175 may be used to accelerate the speed of gelling (e.g., setting) the gelatin-based shots. In one example, the shots may be gelled (e.g., cured and solidified) within 10 minutes. In other examples, the chilling module 175 may gel the shots in a time less than or greater than 10 minutes. Further, since the chilling module 175 may be a water bath chiller, the fluid dispensed within the cups 164 may remain above a freezing point temperature, thereby preventing freezing of the shots. In another embodiment, the chilling module 175 may not be included in the device 100. For example, a remote chiller module, similar to the chilling module 175 may be located exterior to the device 100 and not within the device 100.

Once the second chilling phase is complete, and the shots are hardened and ready for consumption, the shot-making process ends. The user interface 104 may include a progress bar indicating the time remaining in the chilling and/or shot-making process. The user interface 104 may also include a light or another type of indicator that indicates when the shots are complete and ready for consumption. Thus, the user may be notified when the shot-making process is completed, and the shots are ready for consumption. A user may remove the shots 164 from the device housing 102 by sliding out the drawer 172.

In some examples, the device 100 may run in the cleaning mode after the shot-making mode ends. However, in other examples, the cleaning mode may be initiated by the user via selections presented on the user interface 104. During the cleaning mode, water or another cleaning fluid may be purged through one or more of the lines 134, 145, 157, and 159, through which the first and second liquid gelatin mixtures flowed through during the shot-making mode. Further, the water or cleaning fluid may be routed through one or more of the pod receptacle 107, mixing chamber 132, chilling block 144, and dispensing heads 160. By running water through the various lines, reservoirs, and components of the device 100 through which the liquid gelatin mixtures flowed during the shot-making mode, residual gelatin mixture may be removed from the device 100. Thus, an amount of gelatin mixture remaining in the lines and components of the device 100 between separate shot-making modes may be reduced by flowing water through the lines and components of the device 100.

Thus, during the cleaning mode, fluid flow through the device 100 may be similar to that during the shot-making mode. For example, water from one or more of the hot water tank 116 and/or inlet port 117 may be directed through the line 121 and into the pod 112. Further, pump 130 may be turned on, and fluid from the pod 112 may be routed to the mixing chamber 132. Pump 146 may be turned on, and fluid in the mixing chamber 132 may be circulated between the mixing chamber 132 and the chilling block 144. Further, pump 159 may be turned on, and fluid from one or more of the mixing chamber 132 and chilling block 144 may be routed towards the dispensing heads 160.

However, during the cleaning mode, a motor 182 may adjust the position of the dispensing heads 160 to move them from the dispensing first position to a second position. The dispensing heads 160 may be in the dispensing first position during the shot-making process, where in the dispensing first position, the dispensing heads 160 may be aligned over holes in the bottom of the manifold 180, such that fluid from the dispensing heads 160 passes into the cups 164. Thus, the dispensing heads 160 may be in fluidic communication with the cups 164 in the first position. However, in the second position, the dispensing heads 160 may be translated relative to the manifold 180, such that they are not aligned over the holes in the manifold. As such, in the second position, the dispensing heads 160 may not be in fluidic communication with the cups 164.

In the second position of the dispensing heads 160, fluid entering the dispensing heads 160 may be directed to a drain tank 184 that collects waste fluid from the device 100. Thus, the dispensing heads may be fluidically coupled to the drain tank 184 in the second position. In this way, the dispensing heads 160 may be selectively fluidically coupled to either the cups 164 or drain tank 184 by moving the dispensing heads 160 between the first and second positions. The drain tank 184 may hold drained fluid and dispense the waste fluid to drain port 188. The drain port 188 may be in fluidic communication with an external fluid drain for draining fluid from the device 100. The drain tank 184 may additionally be fluidly coupled to the mixing chamber 132 via a drain line 185 and may receive fluid from the mixing chamber 132 during the cleaning mode. Specifically, a valve 186 positioned in the drain line 185 may regulate an amount of fluid drained from the mixing chamber 132 to the drain tank 184. For example, the valve 186 may be closed during the shot-making mode, and opened during the cleaning mode. In some examples, the drain tank 184 may be removably coupled to the housing 102. In this way, a user may remove the drain tank 184, to empty and/or clean the tank 184.

In some examples, the motor 182 may be physically coupled to the sheet 162 of the manifold 180 for moving the sheet 162 and dispensing heads 160 between the first and second positions. For example, the motor 182 may actuate a cam to translate rotational motion of the motor 182 into linear displacement of the sheet 162 and dispensing heads 160. However, in other examples, a valve, such as a three-way valve, positioned between the dispensing heads 160, drain tank 184, and cups 164 may be adjusted to regulate flow from the dispensing heads 160 to either the cups 164 or the drain tank 184 instead of the motor 182.

As explained above, the controller 106 may include wireless connectivity and/or a LAN connection. As such, the controller 106 may communicate with one or more external devices, such as remote server 105 through the wireless connection and/or the LAN connection. Thus, the controller 106 may utilize cloud computing to both store and retrieve digital information such as user inputs and preferences, advertisements, alcohol and pod information, etc. As an example, the remote server 105 may monitor the functioning of the device 100 through the wireless connection. Specifically, the remote server 105 may track a number of gelatin-based shots and flavors of the gelatin-based shots produced each day by the device 100. Further, the wireless connection may transfer health and functionality data from the controller 106 of the device 100 such as if there are any errors in the device 100 and whether or not the device is working properly. For example, if an error or some sort of degradation is indicated, the controller 106 of the device 100 may notify the remote computer. The device 100 may then be serviced in order to repair any degraded components of the device 100.

The controller 106 may also send and receive a variety of signals to and from various components of the device 100. For example, the controller 106 may receive signals from inputs via the user interface 104 (e.g., alcohol selection, shot type confirmation, start/stop signals, etc.). Specifically, the controller 106 may prompt the user to select a type of alcohol and/or type of pod before imitating the shot-making process. A user may select an alcohol type and/or pod type from a list presented to the user via the user interface 104. However, if the alcohol type and/or pod type is not included in the list presented to the user, the user may scan the alcohol bottle and/or pod via the scanner 115.

Further, the controller 106 may receive signals from various countdown timers, from the heater 118, from one or more temperature sensors (e.g., the temperature sensor 173), from various flow meters, etc. The controller 106 may send signals to components of the device 100 such as one or more valves or valve actuators (e.g., valve 167, valve 122, etc.), one or more pumps (e.g., pump 140, pump 146, pump 156, etc.), the one or more motors (e.g., motor 166, motor 182, motor 143, etc.)

The user interface 104 may include additional buttons or controls for selecting shot-making parameters such as the desired number of shots and desired type of alcohol, type of pod, desired alcohol concentration, etc. Additional indicators may be present on the user interface 104 such as a "shots spoiled" indication when the shots are no longer safe for consumption. Further, various warning indications may be included on the user interface 104 to indicate degradation of system components or low levels of one or more of the fluid reservoirs (e.g., the water or alcohol reservoirs). In some embodiments, the user interface 104 may display fluid levels of each of the water and alcohol reservoirs.

The device 100 may be sized to easily fit on the counter of a bar or restaurant, for example, without taking up a large amount of space. For example, in some embodiments the device 100 has a width of approximately 14 inches, a depth of approximately 18 inches, and a height of less than approximately 20 inches, although other sizes are possible. The user interface 104 may be approximately seven inches measured along a diagonal of the face of the user interface 104. In other examples, the user interface may have a diagonal measurement less than or greater than seven inches.

Additional sensors to those discussed above may be present in the device 100. For example, the hot water tank 116 and alcohol reservoir 108 may each include a fluid level sensor for determining the fluid level of the respective reservoir. Further, additional temperature and/or pressure sensors may be included to maintain the fluids at required temperatures. FIGS. 2-17 show the device 100 and its components in further detail. A description of a process for preparing the gelatin-based shots is provided below with reference to FIGS. 18A-20.

Turning now to FIGS. 2-17, they show schematics of the device 100 showing the relative sizes and positions of the components within the device. More specifically, the perspective views of the device 100 shown in FIGS. 2-6B and 6E-17 may be three-dimensional axonometric projections of the device 100, showing the device 100 as viewed from a skew direction in order to reveal more than one side of the device 100. As such, components of the device 100 already introduced and described above with reference to FIG. 1B may not be reintroduced or described again in the description of FIGS. 2-17. FIGS. 2-17 are drawn to approximately to scale.

As such, FIGS. 2-17 show the relative positioning of various components of the shot-making device 100. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space therebetween and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Focusing now on FIG. 2, it shows a first exterior front axonometric perspective view 200 of the device 100 shown above in FIG. 1B. The device housing 102 comprises six substantially flat, planar walls, defining the exterior of the device 100. Specifically, the device housing 102 comprises a front wall 202 opposite a back wall 212, a first side wall 206 opposite a second side wall 204, and a bottom wall 208 opposite a top wall 210. In view 200, only the top wall 210, second side wall 206, and front wall 202 are visible. However, FIGS. 3-17 described below provide other views of the device 100, showing the sides of the device 100 not shown in FIG. 2.

The user interface 104 may be positioned on the front wall 202 of the housing 102. Further, the drawer 172 may be positioned on the front wall 202, and may be flush with the front wall 202. A user may pull the drawer 172, to slide the drawer 172 in and out of the device housing 102 to access the tray 168 (not shown in FIG. 2) containing the cups 164 (not shown in FIG. 2). Front wall 202 may further include a first door 214. The first door 214 may be opened to access the dispensing manifold 180 (not shown in FIG. 2). The first door 214 and drawer 172 may be positioned below the user interface 104 on the front wall 202.

A first side display 201 may be on the first side wall 206 of the housing. The side display 201 may display images of various alcohols and/or various advertisements loaded onto the controller 106 (not shown in FIG. 2) of the device 100. Additionally, the side display 501 may display a variety of advertisements stored remotely via a wireless connection and/or through cloud computing. In some examples, the first side display 201 may be configured to display a single static image. However, in other examples, the first side display 201 may be a display screen such as LCD, plasma, LED, etc., that may be configured to change the image it displays based on signals received from the controller 106 or remote device.

Door 110 may be positioned on the top wall 210 of the device 100 more proximate the front wall 202 than the back wall 212. Door 110 may open and close, and may be flush with the top wall 210 of the housing 102 when closed. In other examples, the door 110 may be recessed from the top wall 210 when closed. The door 110 is shown in the example of FIG. 2, to be closed. However, the door 110 may be opened to access the pod receptacle 107 (not shown in FIG. 2) and the alcohol reservoir 108 (not shown in FIG. 2). As such, the alcohol reservoir 108 may be removably coupled to the device 100. The reservoir 108 may have a complementary fluid coupling (e.g., valves or valve interfaces).

Further, the top wall 210 may include a recess 211 for holding various bottles containing alcohol or other fluids. The recess 211 may be positioned behind door 110 closer to the back wall 212 than to the front wall 202.

Figure 3:
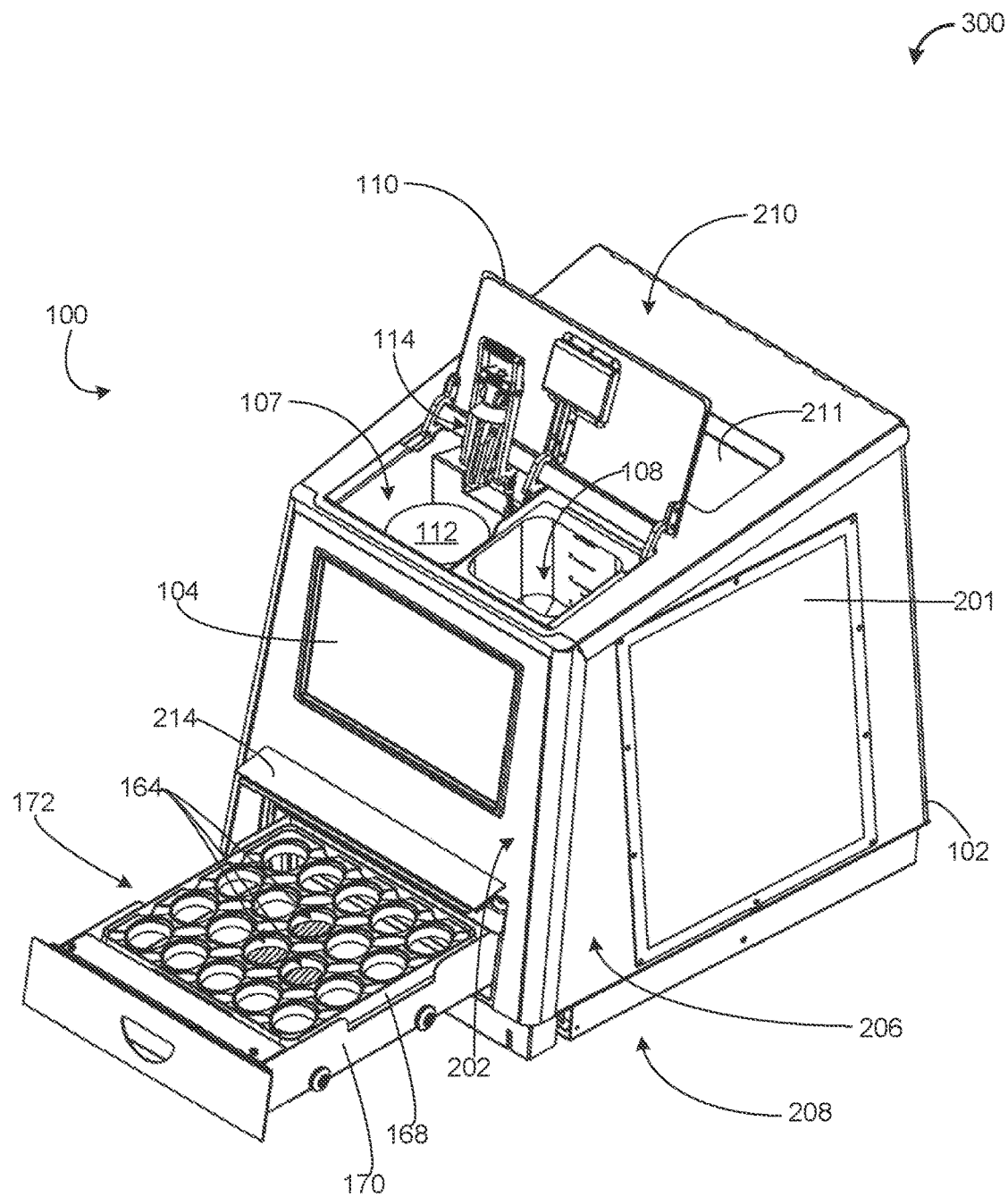
FIG. 3 shows a second front exterior perspective view of the device of FIG. 2 where an access door and drawer of the device are open, in accordance with one or more embodiments of the present disclosure.
Figure 3:
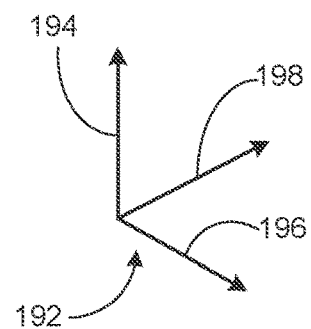

FIG. 3 shows a second exterior front axonometric perspective view 300 of the device 100 shown above in FIG. 1B where the drawer 172 is shown removed from the device 100, and the door 110 is shown in an open position exposing the pod receptacle 107 and alcohol reservoir 108. Alcohol reservoir 108 and pod receptacle 107 may be positioned directly beneath door 110. Further, the alcohol reservoir 108 and pod receptacle 107 may extend from the top wall 210 into the interior of the device 100. Alcohol reservoir 108 may be positioned more proximate to the first side wall 206 than the pod receptacle 107. The pod receptacle 107 may be positioned directly beneath the injection needle 114. In the example of FIG. 3, the receptacle 107 is shown loaded with a consumable pod 112. The injection needle 114 may be physically coupled to a bottom surface of the door 110. Specifically, the injection needle 114 may be pivotably coupled to the door 110, such that the needle 114 may pivot relative to the door 110. The needle 114 is shown in FIG. 3 in a disengaged position, where the needle 114 does not extend through the pod 112. Thus, the needle 114 faces the bottom of the pod receptacle 107 and the consumable pod 112. The pod 112 is removably coupled to the receptacle 107, and may be inserted and removed by a user.

The drawer has been slid out from the housing 102 in the example of FIG. 3, exposing the tray 168, retainer 170, and cups 164 of the drawer 172. A user may remove the tray 168 from the retainer 170, and may remove the cups 164 from the tray 168. As shown in the example of FIG. 3, the retainer 170 may include surface features for sliding relative to the housing 102. Further the example in FIG. 3 is only a portion of the slots in the tray 168 are filled with cups. It should be appreciated that in other examples, the tray 168 may be filled with more or less cups than as shown in FIG. 3. In some examples the tray 168 may include no cups. However, in other examples, a user may completely fill all the slots in the tray 168 with cups. The cups 164 are closed on the bottom and sides, and open only on the top surface that faces upwards towards the manifold 180 (not shown in FIG. 3). Thus, liquid dispensed into the cups 164 from above the cups 164 is retained within the cups 164.

Figure 4:
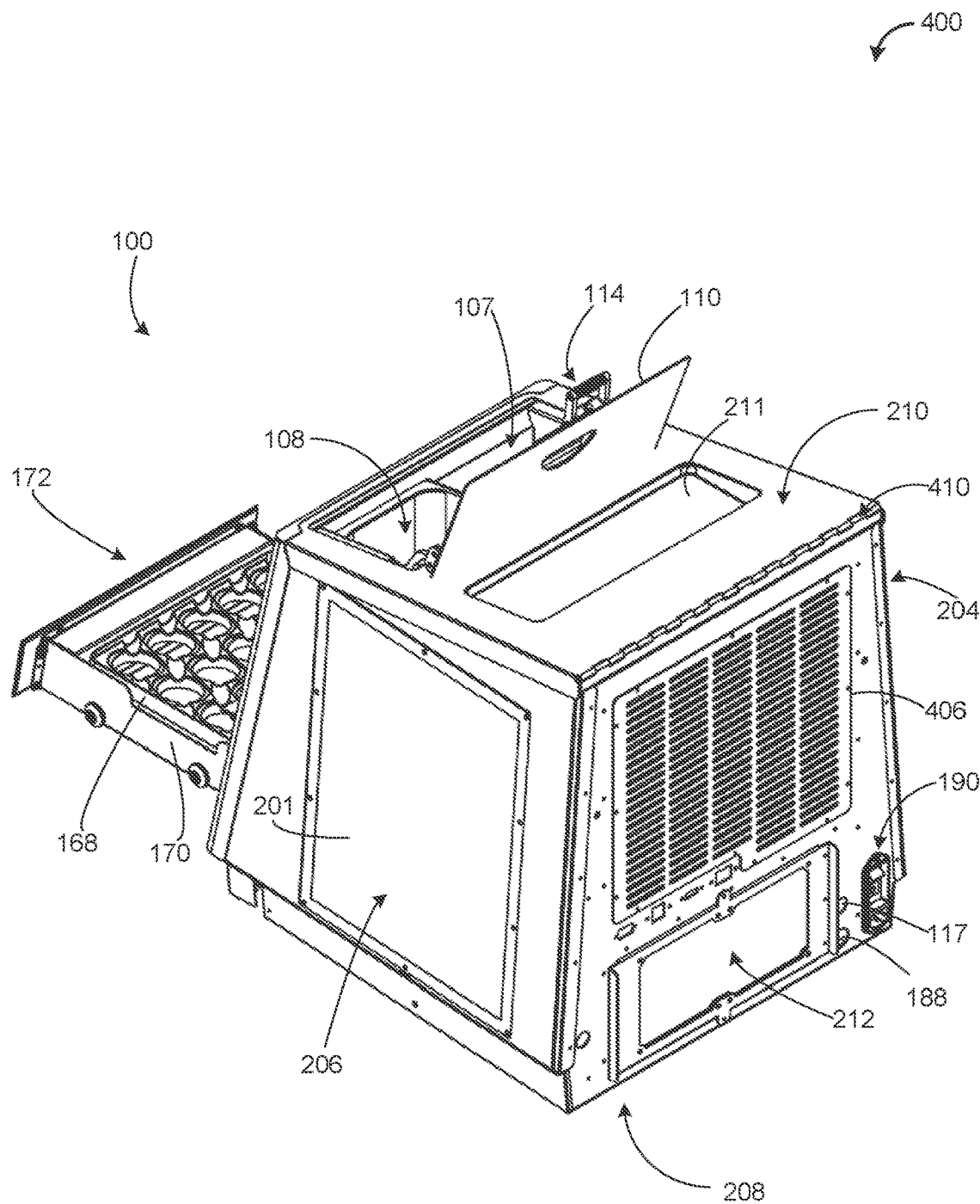
FIG. 4 shows a back exterior perspective view of the device of FIG. 2 where doors and drawers of the device are open, in accordance with one or more embodiments of the present disclosure.
Figure 4:
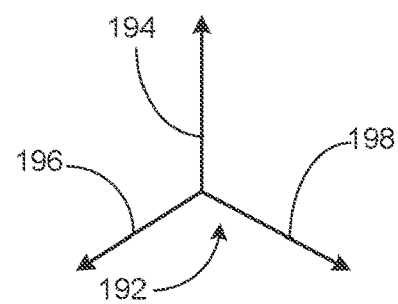

Turning now to FIG. 4, it shows a first exterior back axonometric perspective view 400 of the device 100. A plurality of air inlets 406 may be included on the back wall 212 of the housing 102 to allow air to flow between the external environment and the interior of the device 100 (e.g., for cooling purposes). Specifically, the air inlets 406 may provide ventilation for a power system and control system of the device 100. The power adapter 190 and water inlet port 117 may be coupled to back wall 212 of the housing 102 proximate the bottom wall 208 of the housing 102, below the air inlets 406. The power adapter 190 may be positioned closer to the second side wall 204 than to the first side wall 206. The water inlet port 117 may be positioned closer to the first side wall 206 than the power adapter 190. Further, the drain port 188 may be positioned directly beneath the water inlet port 117.

Figure 5:
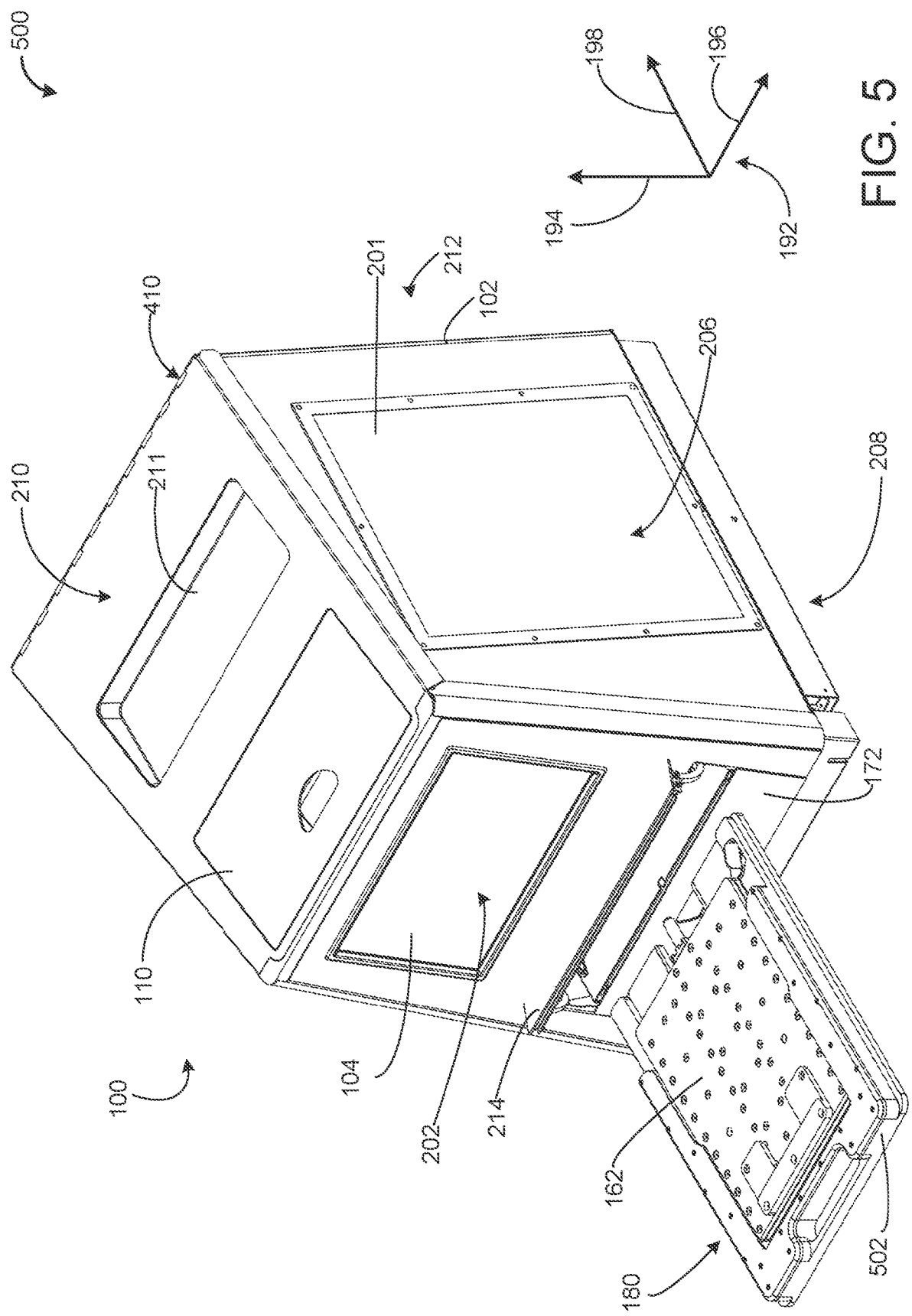
FIG. 5 shows a third front exterior perspective view of the device of FIG. 2 where a dispensing manifold of the device is removed, in accordance with one or more embodiments of the present disclosure.

FIG. 5 shows a third exterior front axonometric perspective view 500 of the device 100 shown above in FIG. 1B where the door 214 is open and the dispensing manifold 180 has been removed from the housing 102. The dispensing manifold 180 may include the sheet 162 which includes the dispensing heads 160 (not shown in FIG. 5), on a top of the manifold 180. Further, the manifold 180 may include a retainer 502 which hold the sheet 162 and dispensing heads 160.

Further, the top wall 210 may include a hinge 410 along a back edge of the housing 102 where the top wall 210 and back wall 212 interface with one another. The hinge 410 may permit the top wall 210 to pivot relative to the other walls of the housing 102. Thus, the top wall 210 may be opened to allow a user to access interior components of the device 100.

Figure 6B:
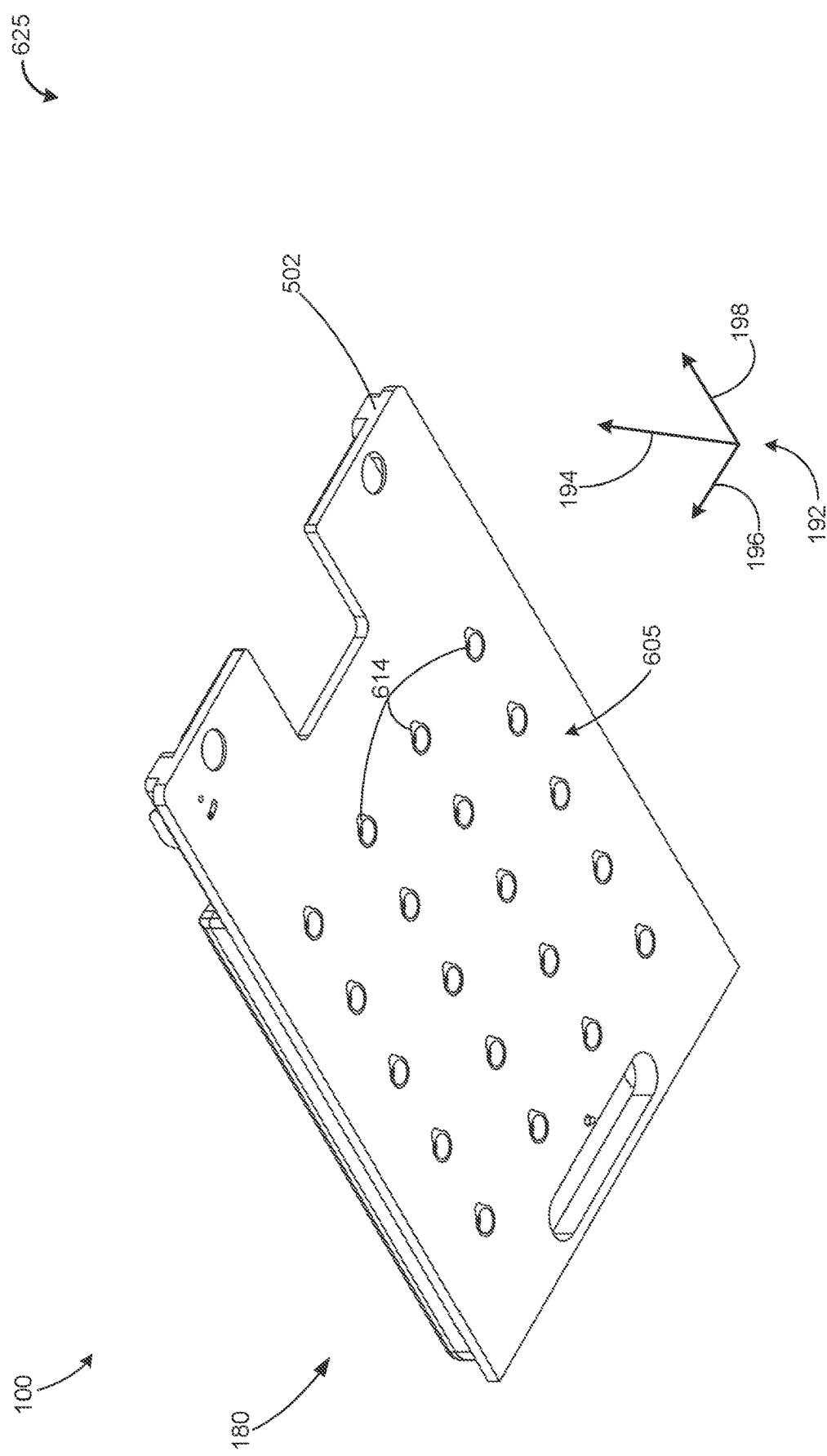
FIG. 6B shows a bottom view of the dispensing manifold shown in FIG. 5, in accordance with one or more embodiments of the present disclosure.

Turning now to FIGS. 6A-6E, they show more detailed views of the dispensing manifold 180. Focusing on FIG. 6A, it shows an exploded view 600 of the dispensing manifold 180 of the device 100. Specifically, FIG. 6A, shows a top 603 of the manifold 180. FIG. 6B below shows the bottom 605 of the manifold 180. The dispensing manifold 180 comprises the retainer 502 and the movable sheet 162. The movable sheet 162 comprises a plurality of apertures 606 for receiving and retaining the dispensing heads 160. Further, a top panel 610 may be physically secured to the retainer 502 via one or more screws. One or more springs 612, may be included for biasing the movable sheet 162 and dispensing heads 160 towards the second position, where the dispensing heads 160 are not in fluidic communication with the cups 164 (not shown in FIG. 6A). However, in other examples, the springs 612 may bias the dispensing heads 160 towards the first position where the dispensing heads 160 are in fluidic communication with the cups 164.

Continuing to FIG. 6B, it shows a bottom view 625 of the manifold 180. Specifically a plurality of holes 614 may be included on the bottom 605 of the manifold 180, in the retainer 502. Thus, when the dispensing heads 160 are in the first position, they may be aligned with the holes 614 in the retainer 502, such that fluid from the dispensing heads 160 passes through the holes 614 and into the cups 164 (not shown in FIG. 6B).

Figure 6C:
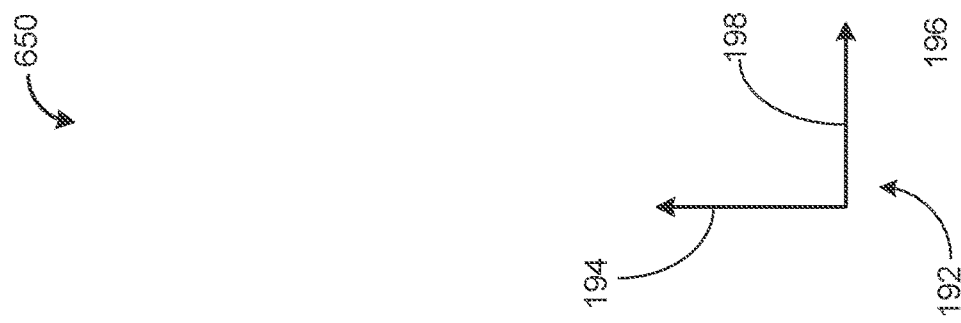
FIG. 6C shows a first cross-sectional view of the dispensing manifold shown in FIG. 5, in a dispensing position, in accordance with one or more embodiments of the present disclosure.
Figure 6C:
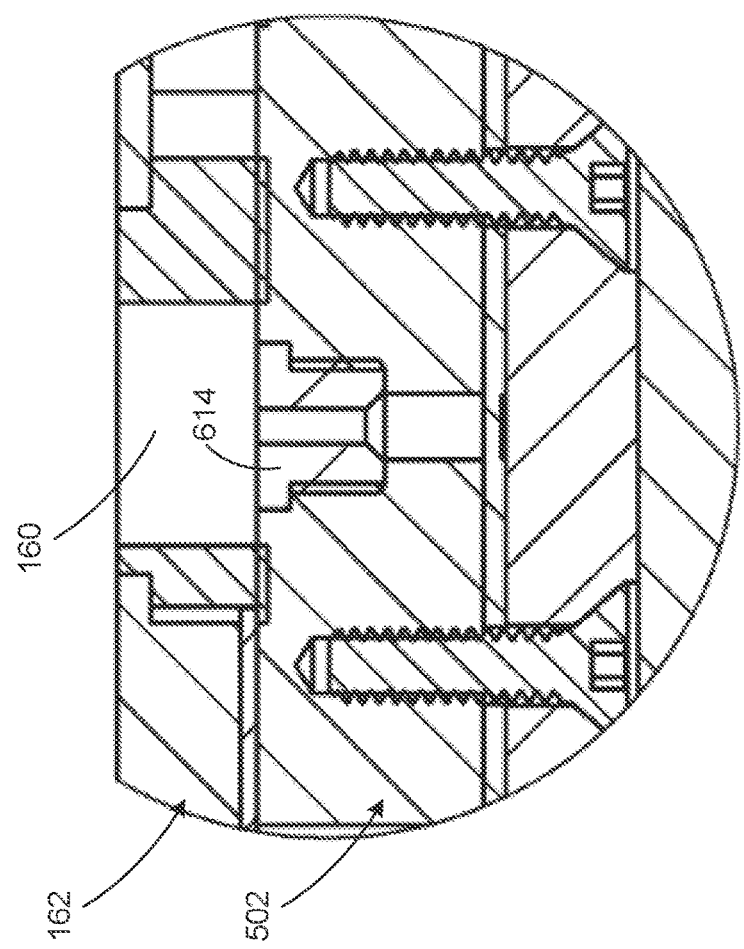

FIG. 6C, shows a first cross-sectional view 650 of the manifold 180 in the first position where the dispensing heads 160 are aligned with the holes 614 in the retainer 502. Thus, as shown in the example of FIG. 6C, the gelatin mixture may flow into the dispensing heads 160, through the holes 614 of the retainer 502, and into the cups 164.

Figure 6D:
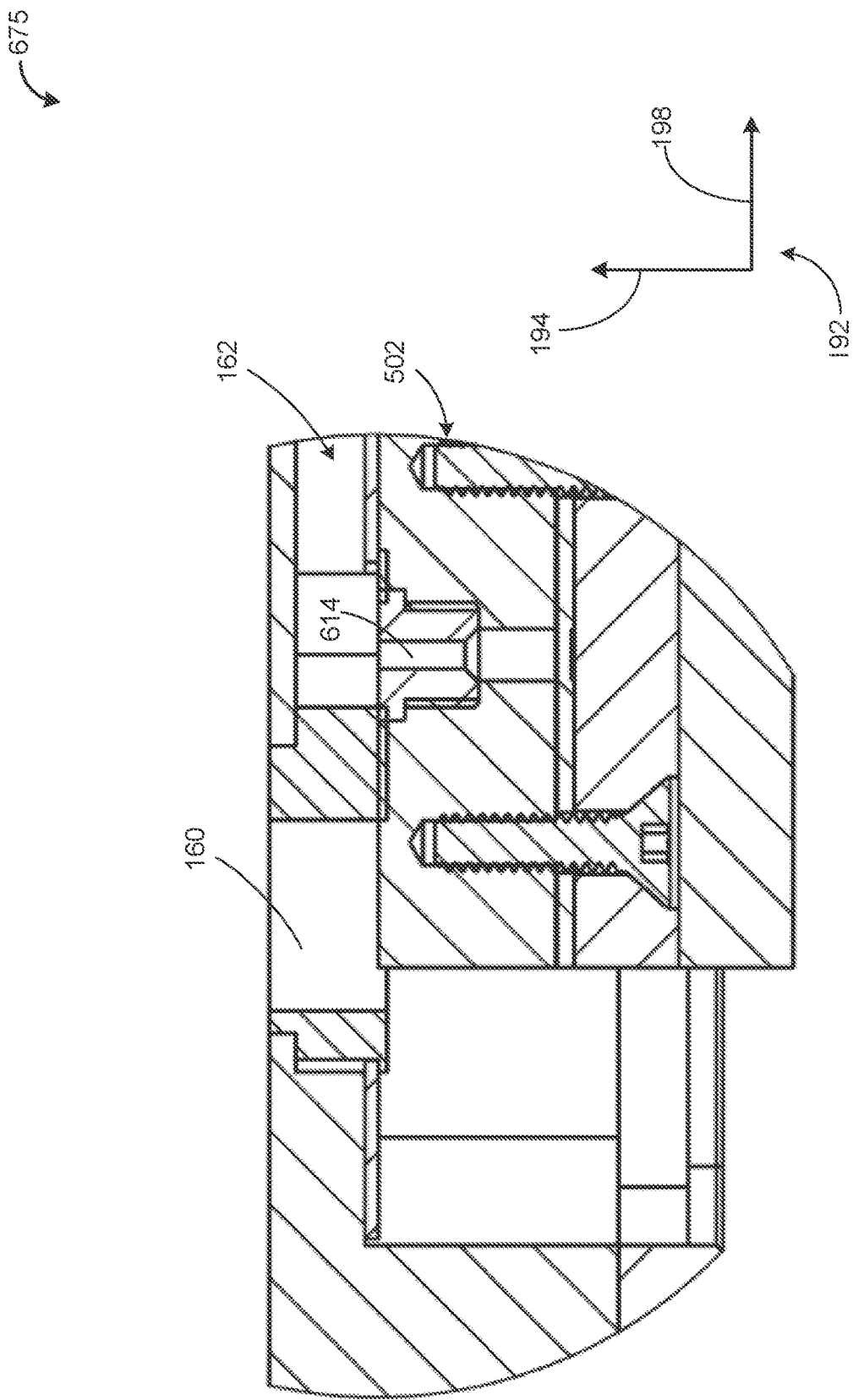
FIG. 6D shows a second cross-sectional view of the dispensing manifold shown in FIG. 5, in a cleaning position, in accordance with one or more embodiments of the present disclosure.

In FIG. 6D, a second cross-sectional view 675 of the manifold 180 in the second position, where the dispensing heads 160 are not aligned with the holes 614 in the retainer 502, and thus are not in fluidic communication with the cups 164. As shown in FIG. 6D, the sheet 162 and dispensing heads 160 included therein have moved horizontally with respect to the retainer 502 relative to their position shown above in FIG. 6C. Thus, the sheet 162 including the dispensing heads 160 may move relative to the retainer 502 of the dispensing manifold 180 between the first and second positions. In the second position, where the dispensing heads 160 are not aligned with the holes 614 of the retainer 502, fluid entering the dispensing heads 160 may be directed to the drain tank 184 (not shown in FIG. 6D).

Figure 6E:
FIG. 6E shows a more detailed front perspective view of the dispensing manifold shown in FIG. 5, in accordance with one or more embodiments of the present disclosure.
Figure 6E:
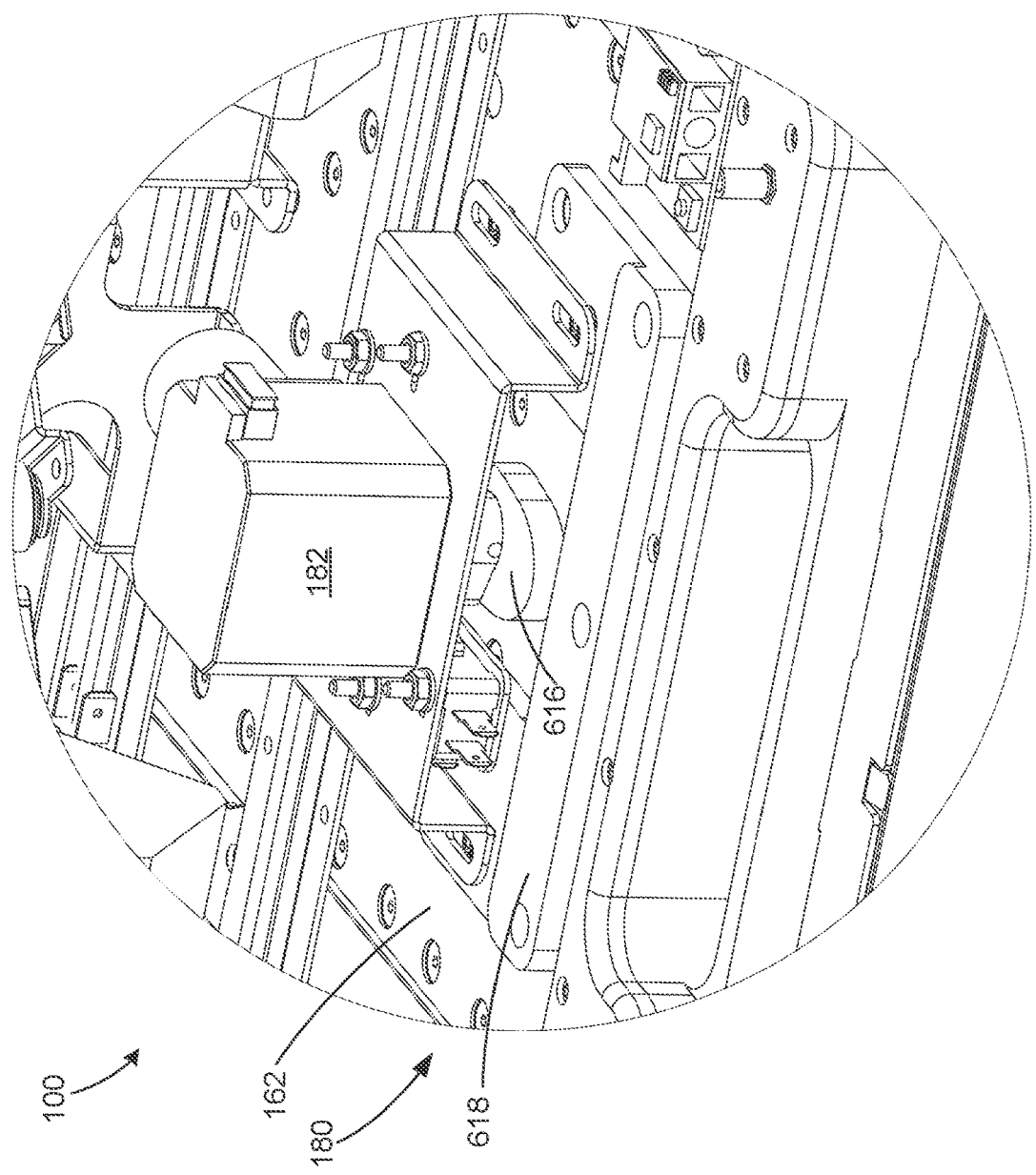

FIG. 6E shows a front axonometric perspective view 690 of the dispensing manifold 180 included within the device 100. Motor 182 is shown positioned above the manifold 180. The motor 182 adjusts the sheet 162 between the first and second positions via actuation of a cam 616. The cam 616 physically contacts a lip 618 coupled to the sheet 162. Thus, the lip 618 may be coupled to the sheet 162 and may be raised from the surface of the sheet 162 for interfacing with the cam 616. The motor 182 spins the cam 616, and as the cam 616 rotate it displaces the lip 618 and therefore the sheet 162 horizontally relative to the manifold 180. Thus, the cam 616 converts rotational motion of the motor 182 into linear motion of the sheet 162.

Figure 7:
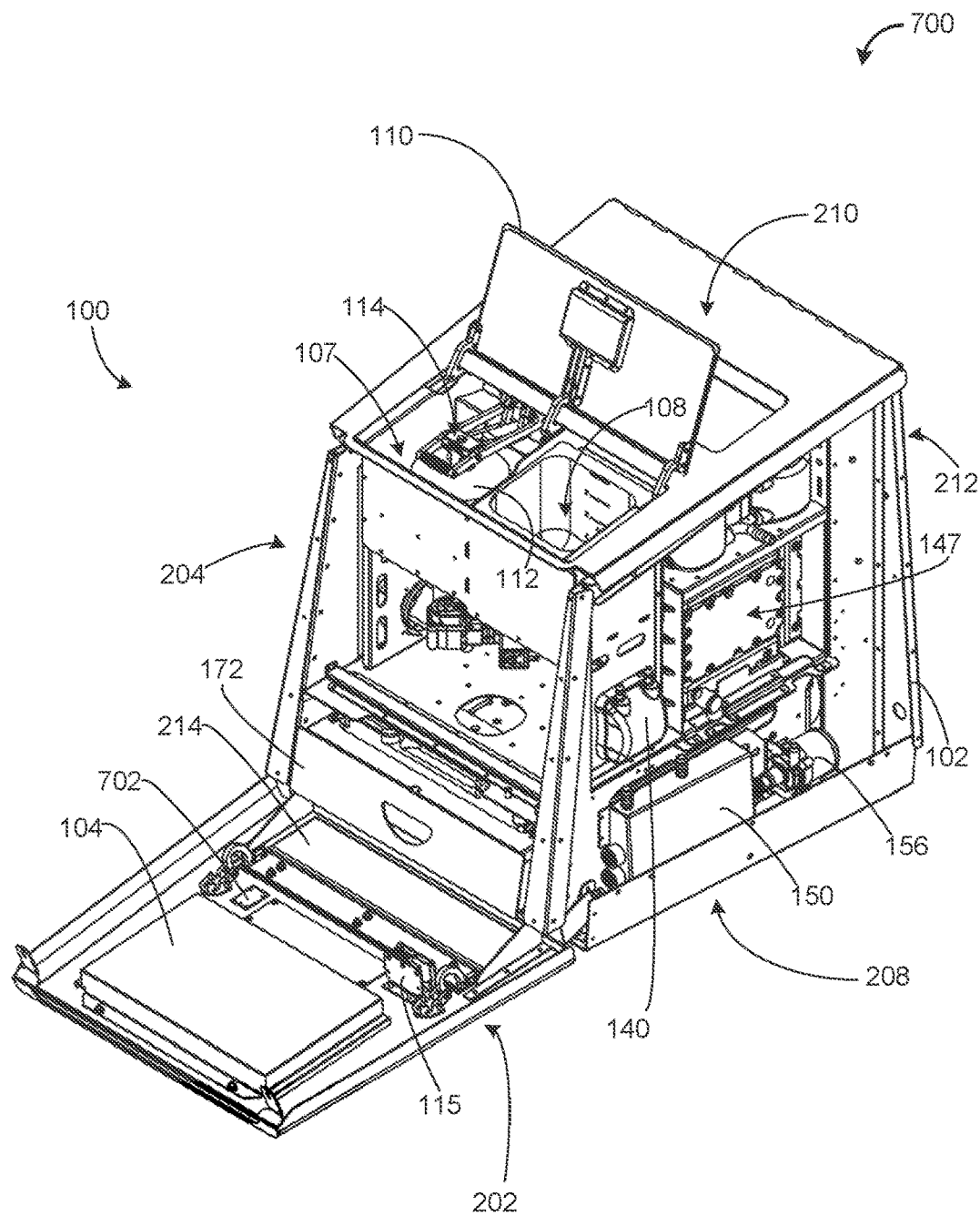
FIG. 7 shows a first front interior perspective view of the device of FIG. 2, in accordance with one or more embodiments of the present disclosure.
Figure 7:
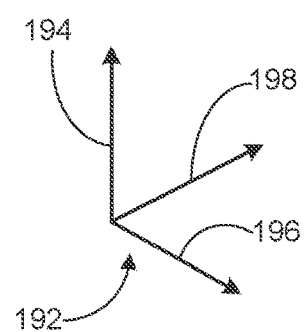

FIG. 7 shows a first front axonometric perspective view 700 of the device 100, where the first side wall 206 has been removed, and the front wall 202 has been pivoted to an open position, exposing interior components of the device 100. On the interior surface of the front wall 202, the scanner 115 is shown positioned between the user interface 104 and the door 214. Specifically, the scanner 115 may be positioned more proximate the first side wall 206 (not shown in FIG. 7) than the second side wall 204. Further, a touch-sensitive button 702 may be included on the front wall 202 between the user interface 104 and the door 214. The button 702 may be positioned more proximate the second side wall 204 than the first side wall 206 (not shown in FIG. 7). The touch-sensitive button 702 may enable a user to adjust operation of the device 100. For example, the touch sensitive button 702 may be a power button configured to turn the device 100 on and off.

FIG. 7 further shows the needle 114 in the engaged position, where the needle 114 has punctured the pod 112, and extends into an interior of the pod 112. The first chilling module 147, coolant tank 150, alcohol pump 140 and coolant pump 156 are all shown positioned proximate the first side wall 206, immediately interior to the side wall 206. Thus, with the side wall 206 removed as shown in FIG. 7, the coolant pump 156, alcohol pump 140, coolant tank 150, and first chilling module 147 are exposed. The coolant tank may be positioned proximate the bottom wall 208, nearer the front wall 202, than the back wall 212. The pump 156 may be positioned behind the coolant tank 150 more proximate the back wall 212 than the pump 156. The alcohol pump 140 may be positioned above the coolant tank 150. Further, the chilling module 147 may be positioned above one or more of the coolant tank 150 and pump 156, behind the alcohol pump 140, more proximate the back wall 212 than the front wall 202.

Figure 9:
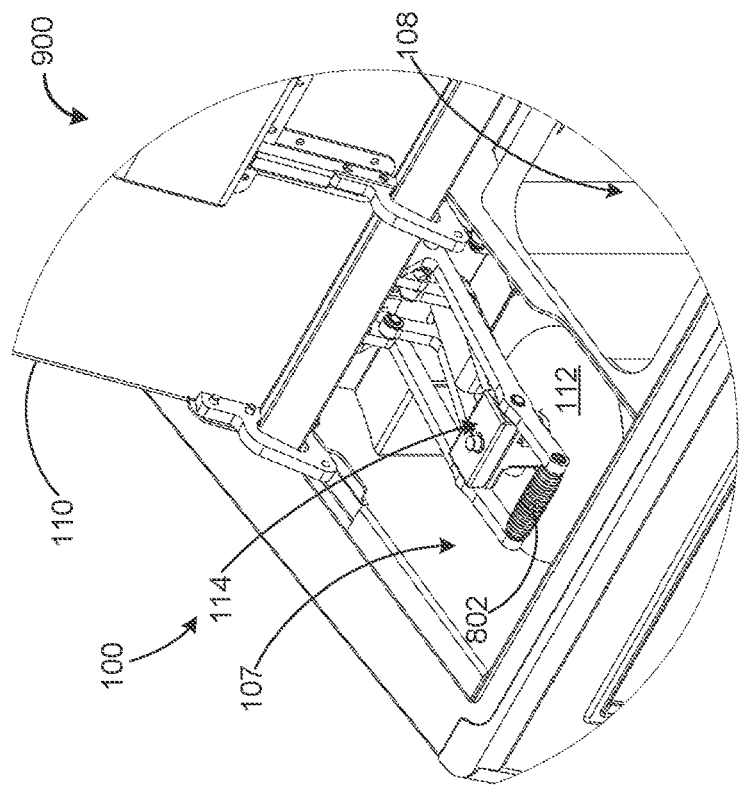
FIG. 9 shows a second top perspective view of the pod receptacle shown in FIG. 8, with the injection needle in an engaged position, in accordance with one or more embodiments of the present disclosure.
Figure 8:
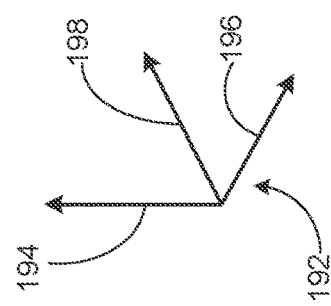
FIG. 8 shows a first top perspective view of a pod receptacle, included in the device shown in FIG. 2 and configured to receive a consumable cartridge, with an injection needle in a disengaged position, in accordance with one or more embodiments of the present disclosure.
Figure 8:
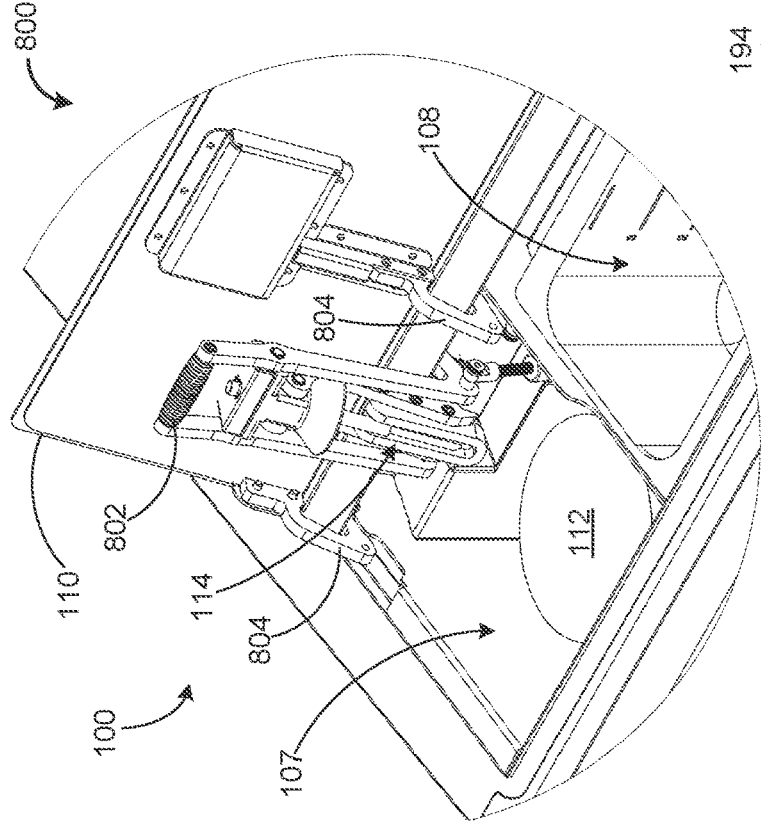

FIGS. 8 and 9 show the door 110 open, with the injection needle 114 in the disengaged and engaged positions, respectively. FIG. 8 shows a first top axonometric perspective view 800 of the device 100, where the door 110 is open and the needle 114 is in the disengaged position. In the disengaged position, the needle 114 does not physically contact nor extend through the pod 112. The position of the needle 114 may be adjusted via a handgrip 802. Thus a user may hold the handgrip 802, and exert a downward force to move the needle 114 to the engaged position shown in FIG. 9. Further, one or more hinges 804 are shown, coupling the door 110 to the device 100. Thus, the door 110 may pivot relative to the device 100 via the hinges 804.

FIG. 9 shows a second top axonometric perspective view 900 of the device 100, where the door 110 is open and the needle 114 is in the engaged position. In the engaged position, the needle 114 extends through the pod 112. Thus, FIG. 9 shows an example where a user has punctured the pod 112 with the needle 114 and adjusted the needle 114 to the engaged position. In the engaged position, the needle 114 is in fluidic communication with the interior of the pod 112.

Figure 10:
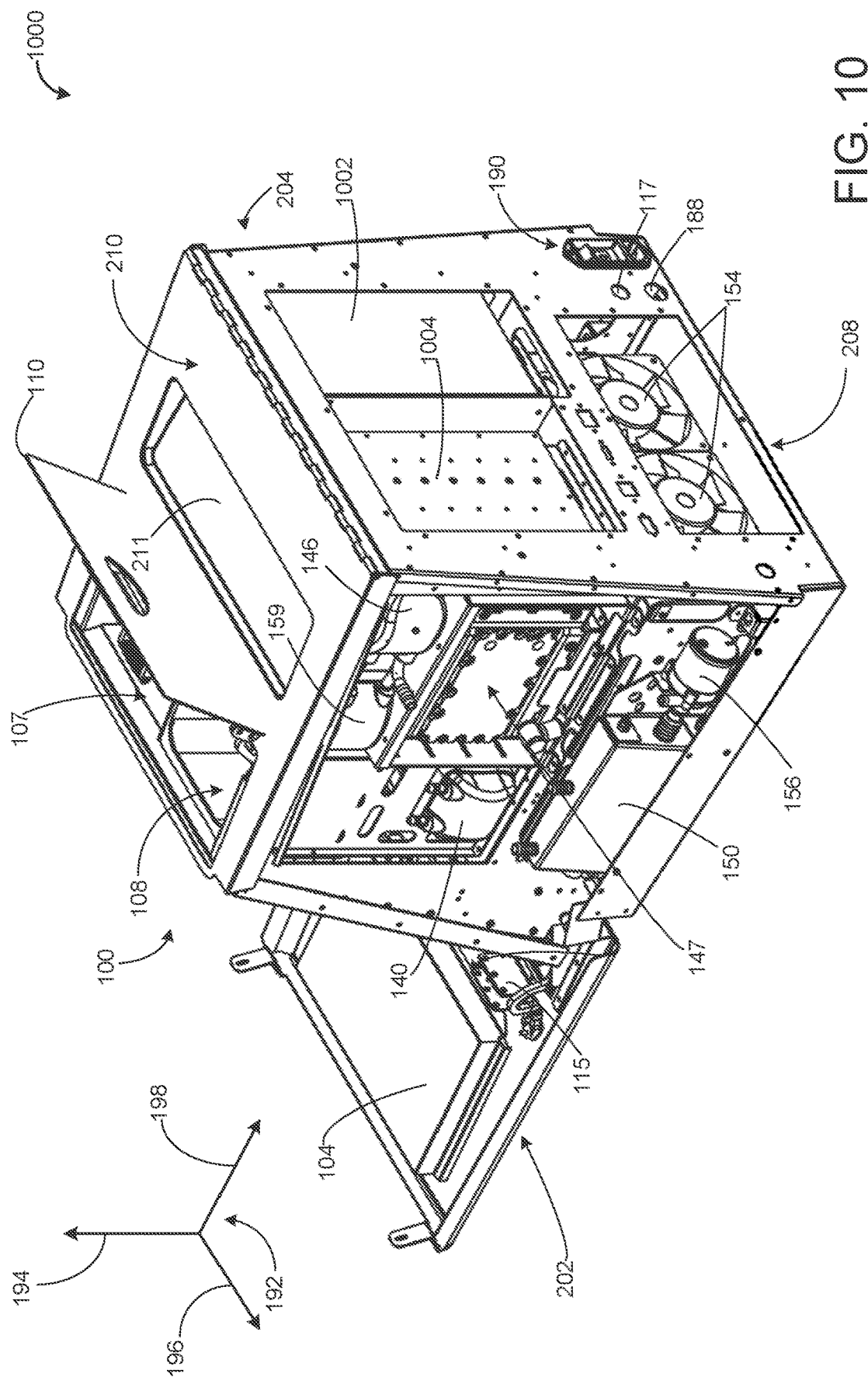
FIG. 10 shows a first back interior perspective view of the device of FIG. 2, exposing a coolant tank and chilling module of the device, in accordance with one or more embodiments of the present disclosure.

FIG. 10 shows a first back axonometric perspective view 1000 of the device 100, where the first side wall 206 and back wall 212 have been removed, and the front wall 202 has been pivoted to an open position, exposing interior components of the device 100. Pumps 159 and 146 are shown positioned directly above the first cooling module 147. Thus the pumps 159 and 146 may be positioned more proximate the back wall 212 (not shown in FIG. 10) than the front wall 202 and more proximate the first side wall 206 (not shown in FIG. 10) than the second side wall 204.

Fans 154 are positioned proximate the bottom wall 208 of the device 100, more proximate the back wall 212 (not shown in FIG. 10) than the front wall 202. Thus the fans 154 may be positioned near the pump 156, more proximate the second side wall 204 than the pump 156. Further, fans 154 may be positioned between the pump 156 and the water inlet port 117 drain port 188, and power adapter 190.

A power supply system 1002 and control circuit board 1004 may be positioned above the fans 154, directly interior to and facing the air inlets 406 shown above in FIG. 4. The control circuit board 1004 may include one or more of a motherboard, driver board, or other printed circuit board. Further, the control circuit board 1004 may include the controller 106 described above with reference to FIG. 1. The power supply system 1002 may distribute power supplied via the power adapter 190 to various components of the device 100. The control circuit board 1004 and power supply system 1002 may be positioned adjacent to one another, where the circuit board 1004 is positioned more proximate the first side wall 206 (not shown in FIG. 10) than the supply system 1002.

Figure 11:
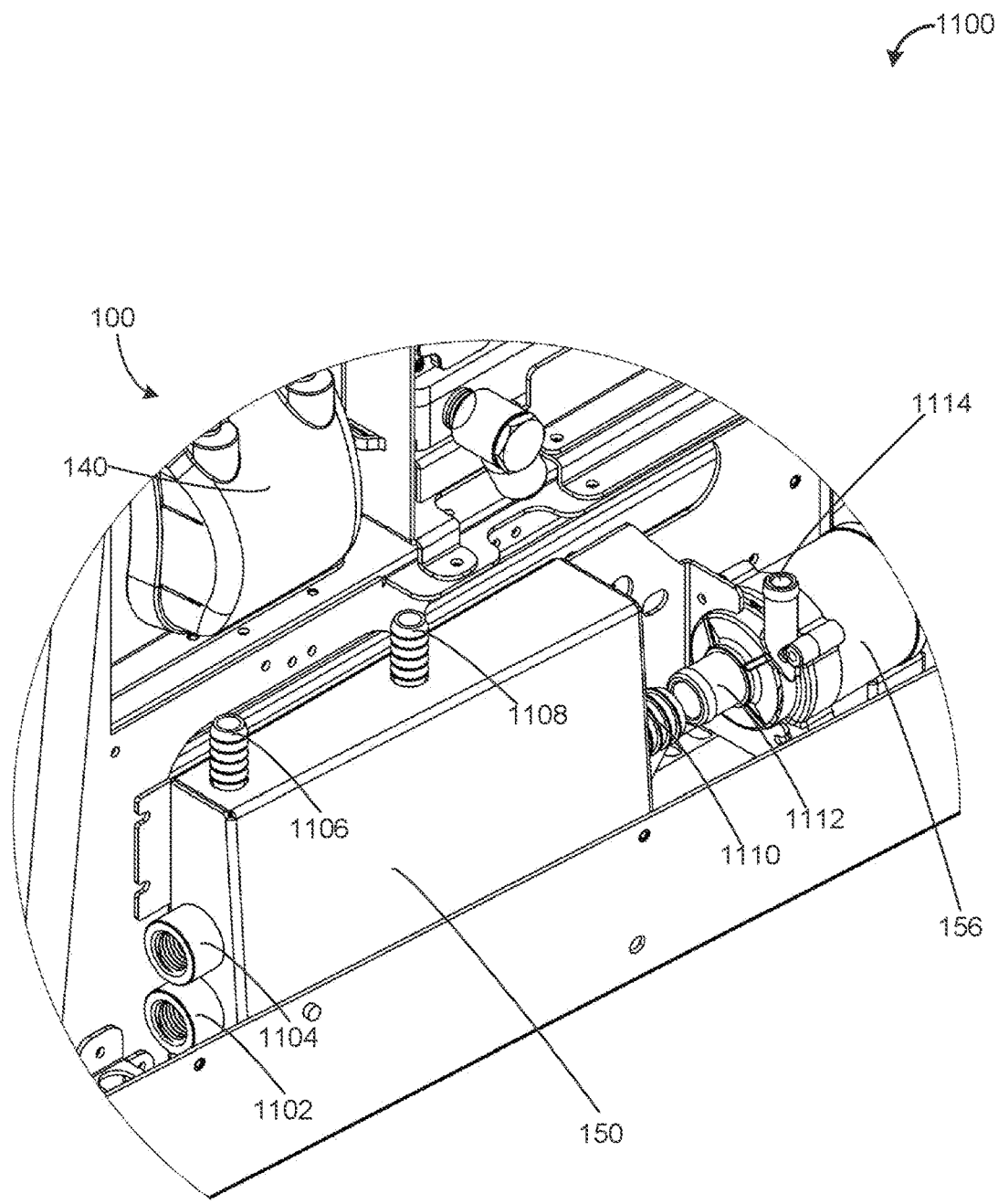
FIG. 11 shows a more detailed view of the coolant tank shown in FIG. 10, in accordance with one or more embodiments of the present disclosure.
Figure 11:
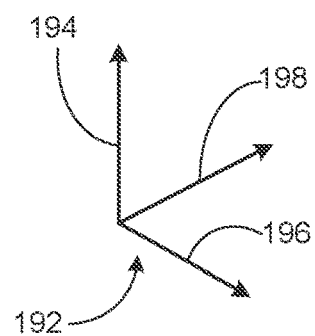

FIG. 11 shows a more detailed perspective view 1100 of the coolant tank 150 of the device 100. The coolant tank 150 may include a coolant fill inlet 1102 and/or a thermocouple 1104 positioned on a front side of the coolant tank 150 that faces the front wall 202 (not shown in FIG. 11) of the device 100. The thermocouple 1104 may be configured to estimate a temperature of the coolant in the coolant tank 150. Further, the fill inlet 1102 may be configured to receive coolant. Thus, a user may fill the coolant tank 150 with coolant via the fill inlet 1102. A vent line 1106 and coolant return line 1108 may be included on a top side of the coolant tank 150. The vent line 1106 may vent vapor from within the coolant tank 150 to exterior of the tank 150. Further, the coolant return line 1108 may receive coolant from one or more of the heat exchangers (e.g., heat exchangers 149 described above with reference to FIG. 1B) and/or a radiator (e.g., radiator 152 described above with reference to FIG. 1B). Coolant from the coolant tank 150 may then exit the coolant tank 150 via a coolant exit line 1110 positioned on a back side of the coolant tank 150 between the coolant tank 150 and the coolant pump 156. Thus, the coolant pump 156 may receive coolant from the coolant tank 150. Specifically, the coolant pump 156 may include a coolant inlet 1112 for receiving coolant from the coolant tank 150, and a coolant outlet 1114 for pumping coolant towards the heat exchangers and/or radiator.

Figure 12:
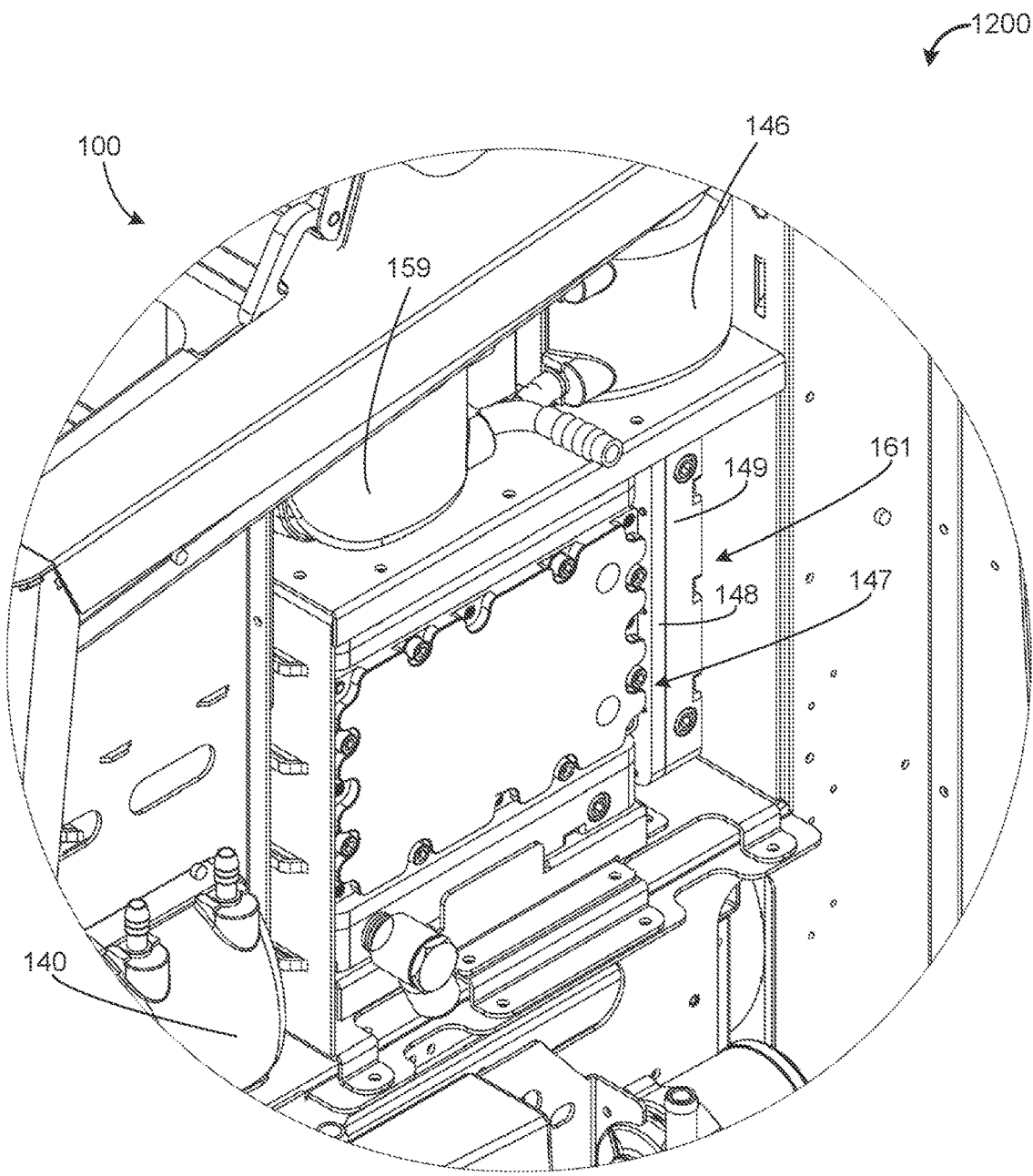
FIG. 12 shows a side perspective view of the chilling module shown in FIG. 10, in accordance with one or more embodiments of the present disclosure.
Figure 12:
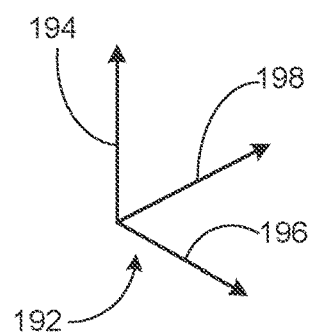

FIG. 12 shows a more detailed perspective view 1200 of the chilling module 147. A heat exchange assembly 161 of the chilling module 147 is shown coupled to a back wall of the chilling model 147. The thermoelectric device 148 are shown positioned interior to the heat exchangers 149. The pump 159 and 146 are shown positioned directly above the chilling module 147.

Figure 13:
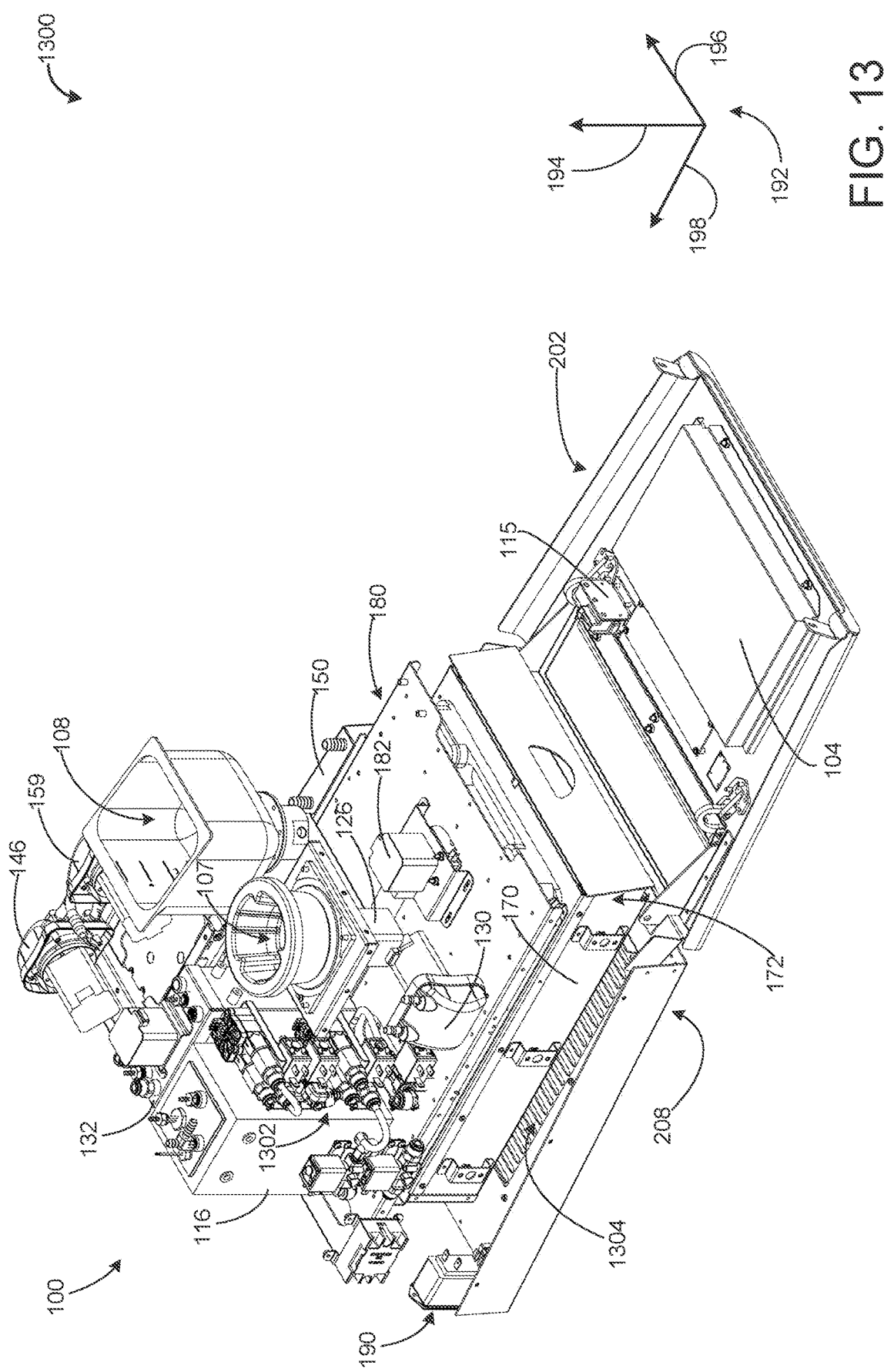
FIG. 13 shows a second front interior perspective view of the device of FIG. 2, in accordance with one or more embodiments of the present disclosure.

FIG. 13 shows a second front axonometric perspective view 1300 of the device 100, where the top wall 210, first side wall 206, back wall 212, and second side wall 204 have been removed, and the front wall 202 has been pivoted to an open position, exposing interior components of the device 100. Hot water tank 116 and mixing chamber 132 are shown positioned more proximate the back wall 212 (not shown in FIG. 13) than the front wall 202. The hot water tank 116 is positioned more proximate the second side wall 204 (not shown in FIG. 13) than the first side wall 206 (not shown in FIG. 13).

One or more valves 1302 are positioned in front of the hot water tank 116 more proximate the front wall 202 than the hot water tank 116. The valves 1302 may include flow meters, such as flow meters 128, 124, 169, and 138 described above with reference to FIG. 1B. The valves 1302 may additionally or alternatively comprise various electrically actuable valves such as valves 122 167, 120, and 136 described above with reference to FIG. 1B. The valves 1302 may therefore control the flow of fluid through the device 100.

Motor 182 is shown positioned above the manifold 180 more proximate the front wall 202 than the back wall 212 (not shown in FIG. 13). The motor 182 may further be positioned below the alcohol reservoir 108 and pod receptacle 107. The bottom wall 208 includes a plurality or array of vents 1304. The vents 1304 may provide a path for ambient air to flow through the device 100 to increase heat transfer between the internal device components and ambient air, thus increasing cooling of the device 100. Motor 126 may be positioned below the pod receptacle 107. The pod receptacle 107 may be rotatable in two directions by the motor 126 along its center axis which extends along the vertical axis 194.

Figure 14:
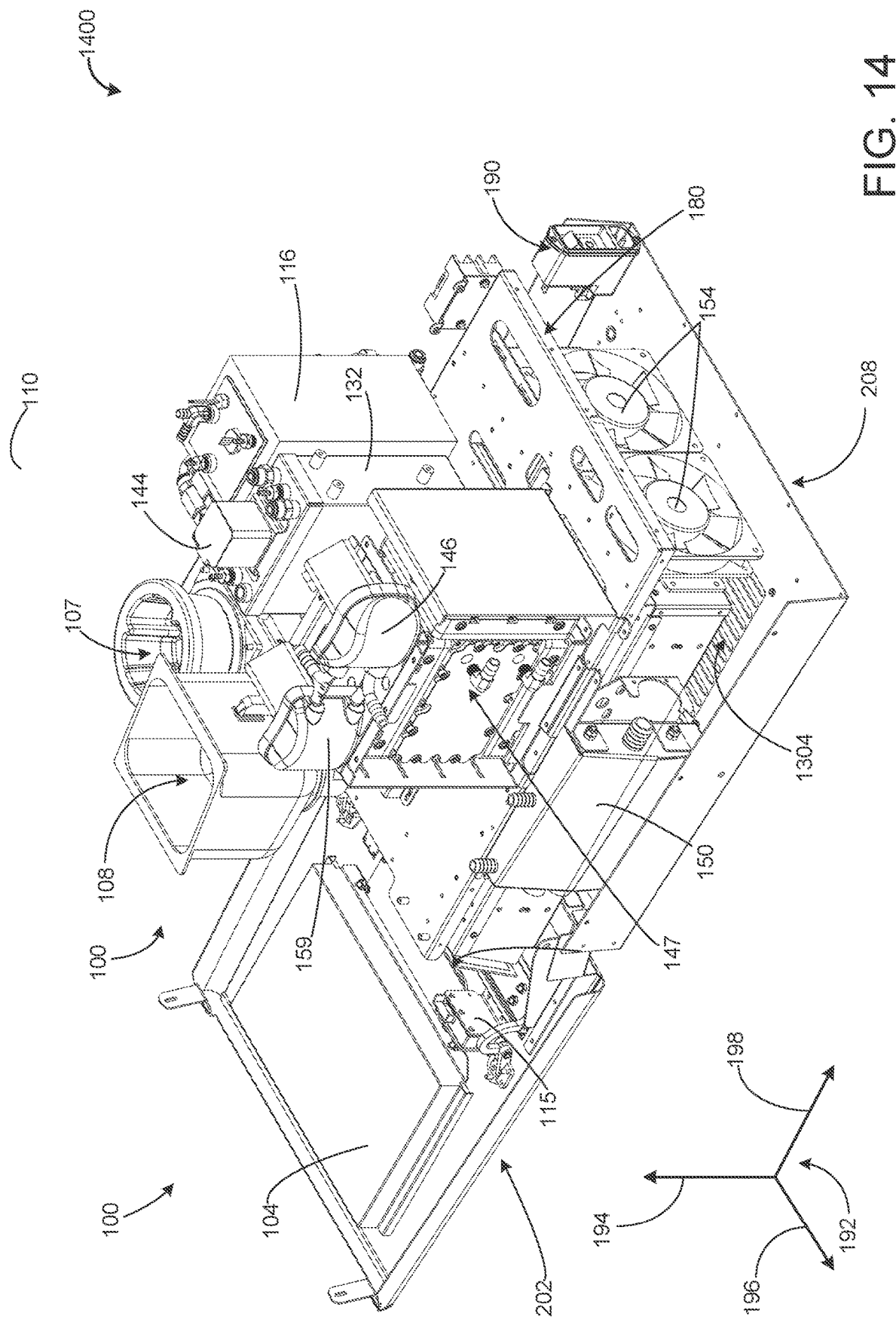
FIG. 14 shows a second back interior perspective view of the device of FIG. 2 in accordance with one or more embodiments of the present disclosure.

FIG. 14 shows a second back axonometric perspective view 1400 of the device 100, where the top wall 210, first side wall 206, back wall 212, and second side wall 204 have been removed, and the front wall 202 has been pivoted to an open position, exposing interior components of the device 100.

Mixing chamber 132 is shown positioned between the chilling module 147 and the hot water tank 116. Positioning the hot water tank 116, mixing chamber 132, and chilling module in this configuration increases the compactness and efficiency of the device 100. Thus, by positioning the hot water tank 116 on the opposite side of the mixing chamber 132 relative to the chilling module 147, heat transfer from the tank 116 to the chilling module may be reduced, and thus the efficiency of the chilling module 147 and the hot water tank 116 may be increased. Specifically, cooling of the hot water tank 116 may be reduced, and warming of the chilling module 147 may be reduced.

Further, the length of fluid lines, and thus the distance fluid flows in the device may be reduced by positioning the mixing chamber between 132 between the hot water tank 116 and the chilling module 149. Fluid from the pod 107 may be directed back towards the mixing chamber 132, and hot water from the hot water tank 116 may be directed laterally towards the mixing chamber 132. From the mixing chamber 132 the gelatin mixture may flow through the chilling module 149. Motor 143 is shown positioned above the mixing chamber 132, and may be coupled to a mixing device (e.g., mixing element 142 shown in FIG. 1B) within the mixing chamber 132, for mixing the gelatin mixture contained therein.

Figure 15:
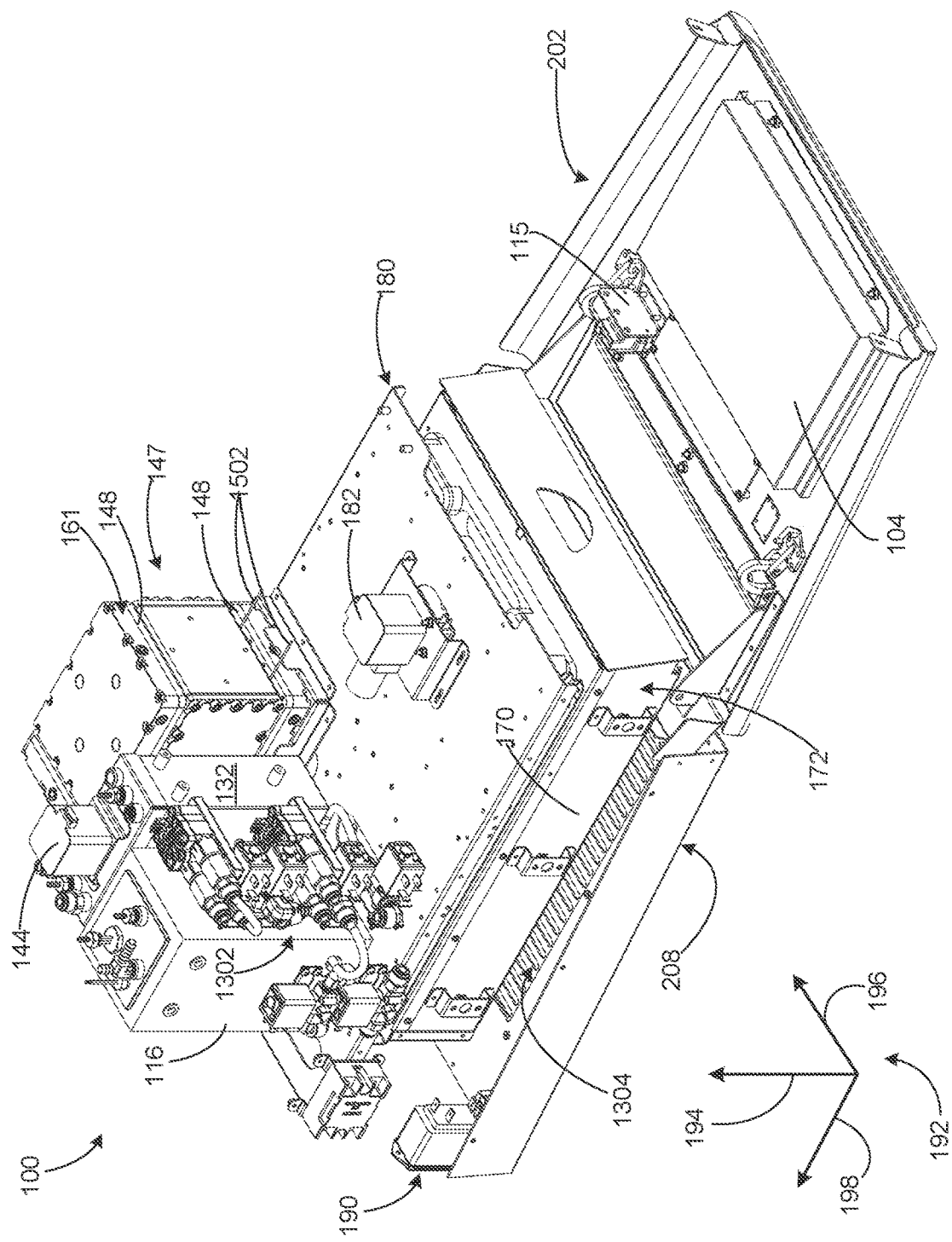
FIG. 15 shows a third front interior perspective view of the device of FIG. 2, exposing the chilling module, a mixing chamber, and a hot water tank of the device, in accordance with one or more embodiments of the present disclosure.

FIG. 15 shows a third front axonometric perspective view 1500 of the device 100, where the top wall 210, first side wall 206, back wall 212, and second side wall 204 have been removed, and the front wall 202 has been pivoted to an open position, exposing interior components of the device 100. Chilling module 147 is shown with a heat exchange assembly 161 positioned on a top of the module 147. One or more electrical wires 1502 are shown. The electrical wires 1502 may be coupled to the thermoelectric device 148, and may provide electrical power thereto from a power supply (e.g., power supply system 1002 shown in FIG. 10).

Figure 16:
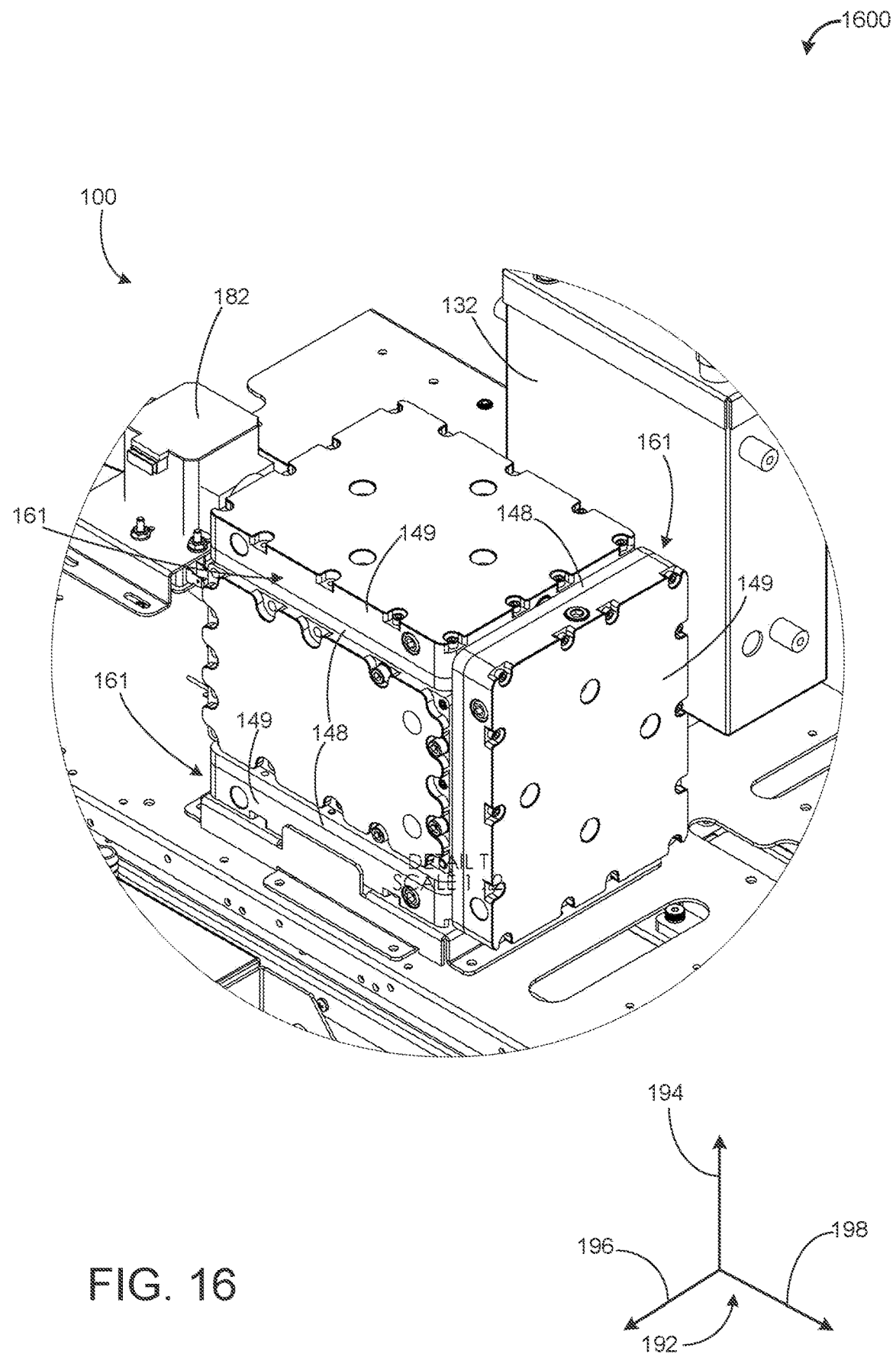
FIG. 16 shows a top perspective view of the chilling module shown in FIG. 10, in accordance with one or more embodiments of the present disclosure.

FIG. 16 shows a more detailed back axonometric perspective view 1600 of the chilling module 147 including at least one heat exchange assembly 161. In the example shown in FIG. 16, the chilling module 147 includes exactly three heat exchange assemblies, each of the heat exchange assemblies including the heat exchangers 149 and thermoelectric device 148. One heat exchange assembly 161 is positioned on a top of the chilling module 147, another heat exchange assembly 161 is positioned at a back of the chilling module 147, and another is positioned on a bottom of the heat exchange assembly 161 opposite the assembly positioned at the top.

Figure 17:
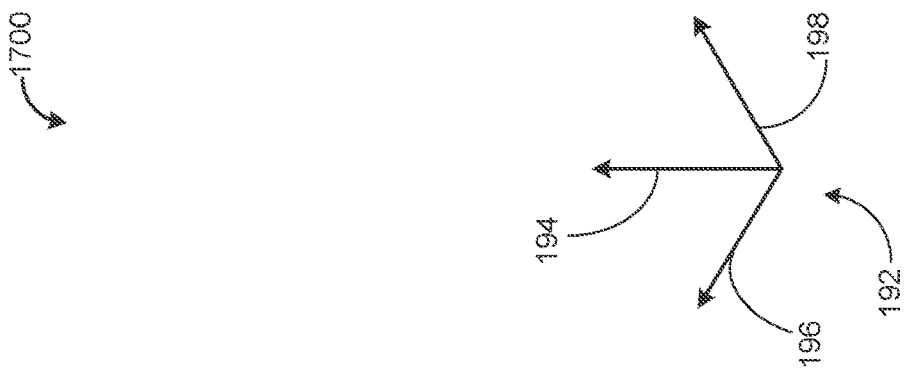
FIG. 17 shows a bottom perspective view of the drawer shown in FIG. 3, in accordance with one or more embodiments of the present disclosure.
Figure 17:
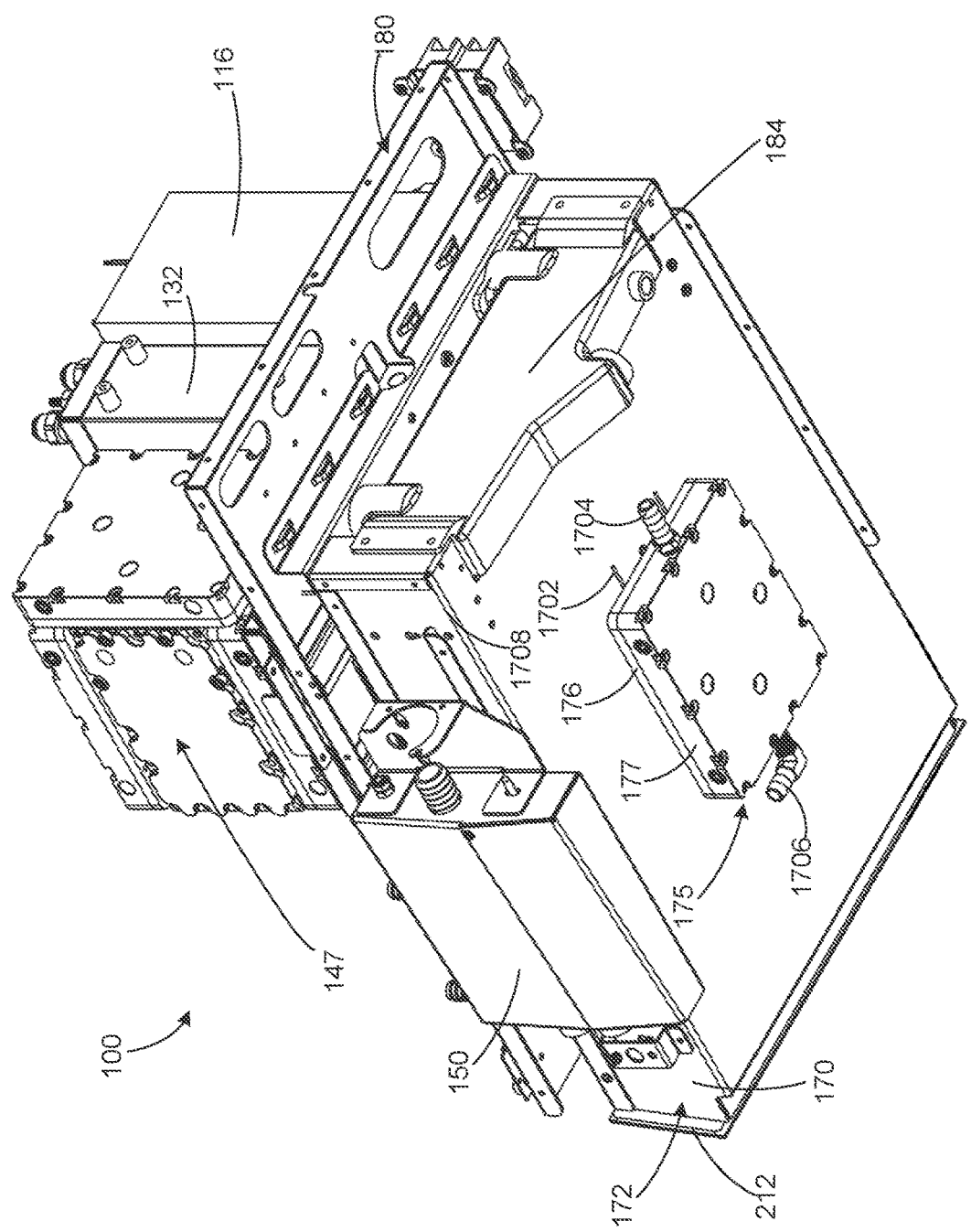

FIG. 17 shows a bottom axonometric perspective view 1700 of the device 100, where the walls 210, 208, 206, 212, 204, and 202 have been removed, and exposing interior components of the device 100. The second chilling module 175 is shown positioned below the drawer 172 and retainer 170. Specifically, the second chilling module 175 may be physically coupled to a plate 1708. Plate 1708 may not be coupled to drawer 172, and thus may not move with the drawer 172 when the drawer slides laterally in and out of the device 100.

The second chilling module 172 includes a coolant inlet 1704 and a coolant outlet 1706 for circulating coolant through the heat exchangers 177. One or more wires 1702 are electrically coupled to the thermoelectric devices 176 for delivering electrical power thereto from the power supply. The drain tank 184 is shown positioned more proximate the bottom wall 208 (not shown in FIG. 17) than the top wall 210 (not shown in FIG. 17). Further, the drain tank 184 is positioned more proximate the back wall 212 (not shown in FIG. 17) than the front wall 202 (not shown in FIG. 17). Thus, the drain tank 184 is positioned below manifold 180, adjacent to the drawer 172, and below the chilling module 147, mixing chamber 132 and hot water tank 116, towards the back of the device, behind the drawer 172.

The drain tank 184 may include an internal cavity, and may be removably coupled the device 100. Thus a user may remove the drain tank 184 from the device 100. The internal cavity of the drain tank 184 may be adapted to hold one or more fluids purged from the device 100. Content from the drain tank 184 may be expelled from the device 100 via the drain port 188 shown in FIG. 4.

Figure 18A:
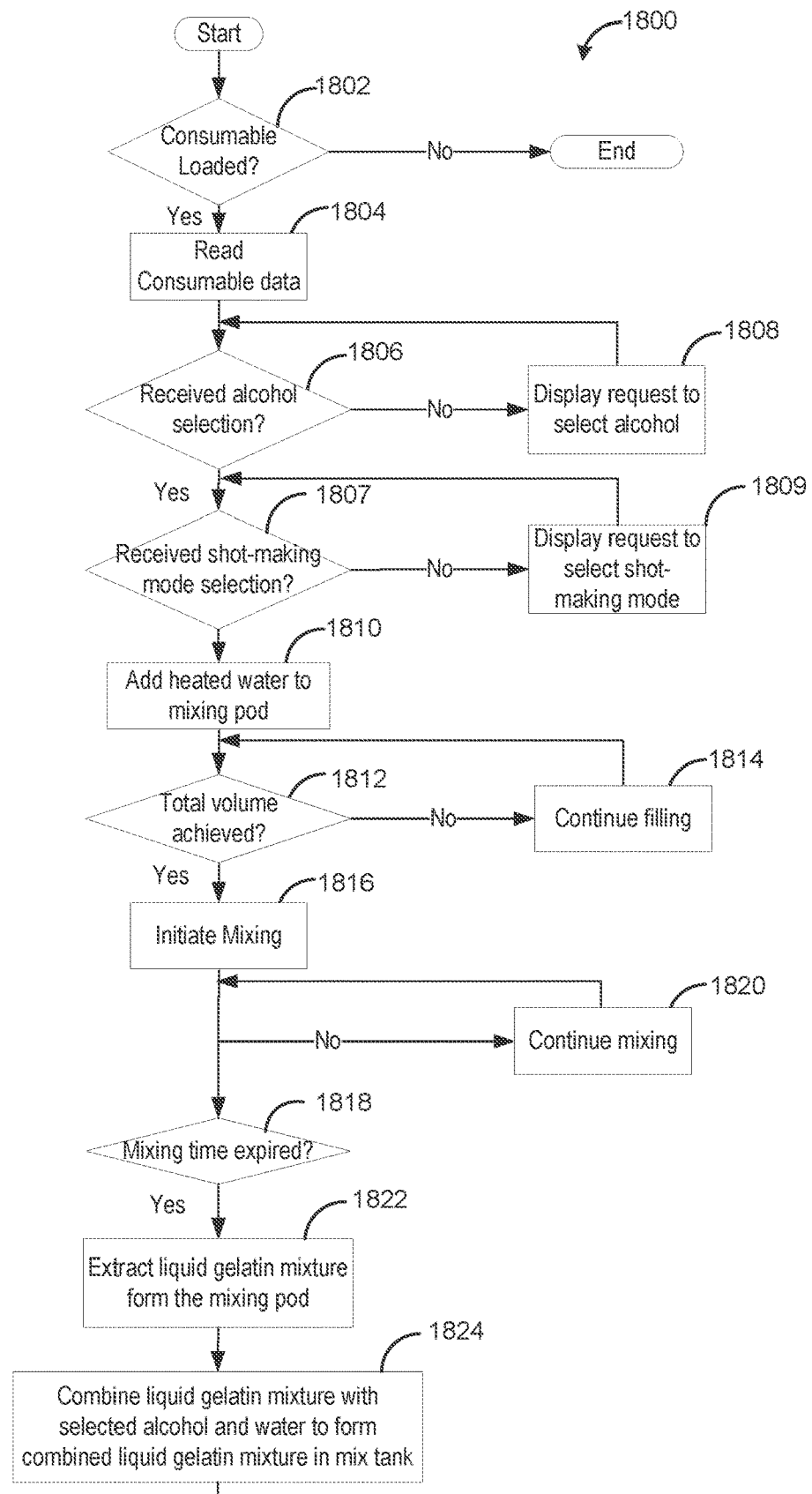
FIG. 18A shows a flow chart of a first portion of an example method for preparing a gelatin-based shot in accordance with one or more embodiments of the present disclosure.
Figure 18B:
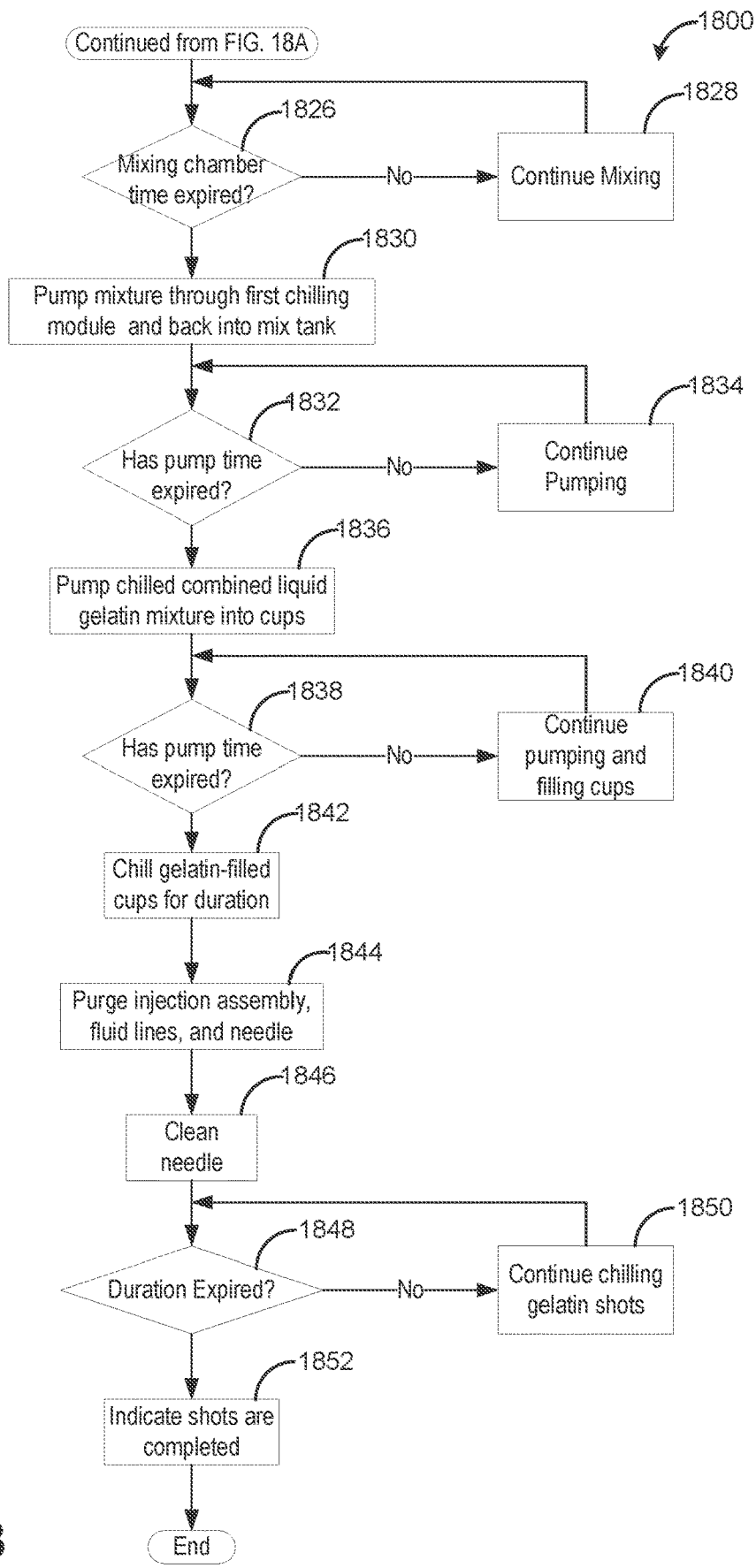
FIG. 18B shows a flow chart of a second portion of the example method introduced in FIG. 18A for preparing a gelatin-based shot, in accordance with one or more embodiments of the present disclosure.

Turning to FIGS. 18A-18B, a method 1800 is shown for preparing gelatin-based shots. Specifically, method 1800 shows a method for preparing a gelatin-based product (e.g., shots) using a device, such as device 100 shown in FIG. 1B and FIGS. 2-17. As described above, the gelatin based product may be a formed gelatin product including alcohol and referred to herein as a "shot". Further, as described above, the gelatin based product may be produced in a ready-to-eat shot-making mode or via a quick-prep shot-making mode. The ready-to-eat shot-making mode of operation may produce gelatin-based products that are solidified, whereas the quick-prep shot-making mode may produce gelatin-based products that are still in a liquid state and that require additional cooling to set the quick-prep gelatin based products. In other examples, the gelatin based product may not include alcohol. The gelatin-based shot may be formed in a cup or alternative container positioned within the shot-making device, as described above. In one example, instructions for executing method 1800 may be stored on a memory of a controller, such as controller 106 shown in FIG. 1B. As such, the controller may execute method 1800 in order to operate the device 100 and prepare the gelatin-based shots.

Method 1800 begins at 1802 by determining if a consumable (e.g., consumable cartridge or pod, such as pod 112 shown in FIG. 1B) has been loaded into the device. As discussed above, the consumable cartridge (e.g., pod) may include an indicator, identifier tag, or other electronic label (e.g., microchip) readable by the controller via a scanner mounted within the device (such as scanner 115 shown in FIG. 1B). Upon scanning a specific pod at the device, the controller may determine that the pod is coupled to the device. For example, upon scanning the pod and then inserting a pod into a pod receptacle (e.g., pod receptacle 107 shown in FIGS. 1B, 3, and 7-9) the controller may receive a signal that the consumable pod has been loaded into the device. In an alternate example, the controller may determine that the consumable pod has been loaded into the device after receiving a signal from a user interface (e.g., user interface 104 shown in FIGS. 1B-3) indicating that a user has loaded the consumable pod into the device. For example, the signal may include a selection of a recently used consumable pod, a selection from a list of available consumable pods, and/or a manual input of the consumable pod to be loaded into the device. The signal may additionally or alternatively include a selection from the user interface confirming that the consumable pod has been loaded into the device.

If the consumable pod is loaded, the method continues on to 1804 to read the consumable data. The method at 1804 may include analyzing the data read from the identifier tag on a side, bottom, or top of the pod upon scanning the pod. The identifier tag may include information such as the volume of the consumable pod (and how many shots may be made from the pod), the contents of the pod (e.g., flavor), date of manufacture, use by date, and/or the manufacturer. In another example, the identifier tag may provide a way of authenticating the type and manufacturer of the consumable pod. In another example, the method at 1804 may include analyzing data stored within a memory of the controller for the selected pod.

At 1806, the method includes determining if the controller has received an alcohol selection from a user via the user interface of the device. If the alcohol selection has not been received, the method may display a request via the user interface display of the device to select an alcohol at 1808. In one example, the device may display a list of available alcohol selections and/or the current type of alcohol loaded into the device.

At 1807, the method optionally includes determining if the controller has received shot-making mode selection. For example, the method may include determining if a ready-to-eat shot-making mode or if a quick-prep shot-making mode has been selected. However, in some examples where the device may not enable multiple production modes and may only enable a single production mode, the method may not require receiving a mode selection and may instead automatically operate in the single production mode of the device. For example, in examples where the device may only operate in a single production mode, the single production mode may be a ready-to-eat shot-making mode. Alternatively, in examples where the device may only operate in a single production mode, the single production mode may be a quick-prep shot-making mode. Thus, in examples where the device may only operate in one shot-making mode, steps 1807 and 1809 may be omitted from the method.

In examples where the device may operate in multiple shot-making modes, if a shot-making mode has not been received at step 1807, then a request to select a shot-making mode may be displayed at 1809.

If a shot-making mode has been received at step 1807, then the method may proceed to step 1810 to begin producing the gelatin-based products. Specifically, once the controller receives the shot-making mode selection (e.g., via a user input through the user interface), the method continues on to 1810 to add heated water to the loaded consumable pod. The pod may form a first mixing chamber of the device. Specifically, the method at 1810 may include flowing a first volume of water at an upper threshold temperature into the mixing chamber formed by the pod. As one example, the upper threshold temperature may be a temperature that is warm enough to dissolve dry ingredients within the pod. The heated water may be delivered to the pod via a needle (e.g., needle 114 shown in FIGS. 1B, 3, 4, 8, and 9) inserted through a top of the pod and into an interior of the pod.

At 1812, the method includes determining if a total, or threshold, volume has been achieved. For example, for each selected (or loaded) consumable pod and/or alcohol, there may be a stored recipe for making the shots stored within a memory of the device controller. The stored recipe may include an amount of water (heated water and/or a combination of heated water and cooler water) for filling the pod and dissolving the dry ingredients. A flow meter attached to a fluid line coupled to the needle may measure an amount of water injected into the pod. As such, the controller may monitor the volume of water injected into the pod via the flow meter. If the threshold volume for the current pod has not been reached, the method continues to 1814 to continue filling the pod with the heated water and/or fill the pod with additional cooler water. Otherwise, if the controller determines that the total (or target) fluid volume within the pod has been reached, the method continues on to 1816 to imitate mixing of the heated water and the gelatin-based product disposed within the pod. In one example, the mixing at 1816 includes rotating the pod to mix the heated water with the gelatin-based product disposed inside the pod to form a liquid gelatin mixture. Rotating the pod may include rotating the pod according to a pre-determined agitation profile for duration. For example, the controller may rotate the pod receptacle which holds the pod via a stepper motor directly coupled to the pod receptacle. In one example, the rotating may include rotating the pod receptacle back and forth at a rotation angle less than 360 degrees, without continuously and repeatedly rotating the pod receptacle by 360 degrees. Further, as described above, a pod may include internal fins positioned along internal sides of the pod to facilitate the mixing and dissolving of the pod dry ingredients with the heated water.

At 1818, the method includes determining if the mixing timer has expired. In one example, the controller may rotate the pod receptacle to mix the contents of the mixing chamber (e.g., pod) for a per-determined amount of time. The pre-determined amount of time may be a total duration for the agitation profile. If the mixing timer has not expired, thereby indicating that mixing is not complete, the method continues on to 1820 to continue mixing (e.g., by continuing to rotate the mixing chamber). Once the mixing timer expires, the method continues on to 1822 to extract the mixed liquid gelatin mixture from the pod. In one embodiment, the method at 1822 may include extracting the liquid gelatin mixture from the consumable pod via the needle inserted into the top of the cartridge. The method then continues on to 1824 to combine the liquid gelatin mixture with the selected alcohol and additional water to form a combined liquid gelatin mixture. For example, the method at 1824 may include flowing (e.g., pump-assisted flow) each of the liquid gelatin mixture from the pod, a pre-determined amount of the alcohol from an alcohol reservoir positioned within the device, and a pre-determined amount of water from a water source, to a mixing chamber (e.g., such as mixing chamber 132 shown in FIGS. 1B and 14-17) positioned within the device. Thus, the three fluids are combined together within an interior of the mixing chamber. The method at 1824 further includes mixing the liquid gelatin mixture from the pod, the water, and the alcohol together within the mixing chamber. As one example, the mixing may include actuating a mixing element (such as mixing element 142 shown in FIG. 1B via a motor) disposed within an interior of the mixing chamber for a duration to mix and combine the fluids within the mixing chamber to form a mixed liquid gelatin mixture. In another example, the mixing may include flowing the three fluids sent the mixing chamber around one or more stationary tubes or mixing elements positioned within the mixing chamber in order to combine the fluids to form the mixed liquid gelatin mixture.

The method then continues to 1826 (as shown in FIG. 18B) to determine if the duration or the mixing chamber time (for mixing the liquid gelatin mixture from the pod, the water, and the alcohol) has expired. As one example, the mixing chamber time may be a pre-set value stored within the memory of the controller. As another example, the mixing chamber time may be selected by the user and/or based on the selected consumable pod (e.g., the contents of the consumable pod) and type of alcohol). In this way, mixing times may be adjusted for different types of alcohol. If the mixing chamber time has not expired, the method continues to 1828 to continue mixing the fluids within the mixing chamber (e.g., via circulating fluid through the mixing chamber or continuously actuating the mixing element).

However, if the controller determines that the mixing chamber time (or duration for mixing) has expired, the method continues to 1830 to pump (e.g., flow via a pump) the combined (e.g., mixed) liquid gelatin mixture through a first chilling module. It is noted that in examples, where the method may be operating in a quick-prep shot making mode that the mixture may bypass the all or a portion of the first chilling module and then be pumped to the gelatin mixture cups. However, in examples of the method that may include pumping the mixture through the first chilling module and back into the mix tank, where the first chilling module may include the first chilling module 147 shown in FIG. 1B, and the method at 1830 may include recirculating the mixing liquid gelatin mixture through a chilling block (e.g., chilling block 144 shown in FIG. 1B) of the first chilling module for a duration, or set pump time, using a first pump. The recirculating may include pumping the mixture through the chilling block and back into the mixing chamber continuously for the duration. At 1832, the method includes determining if the set pump time of the first pump (or duration) has expired. If the pump time has not expired, the method continues to 1834 to continue recirculating the mixture and continue pumping with the first pump. The set pump time may be a shorter pump time for examples where the method may be operating in a quick-prep shot-making mode compared to a ready-to-eat shot-making mode in order to maintain a temperature of the gelatin mixture greater for the quick-prep shot-making mode compared to a temperature of the gelatin mixture for the ready-to-eat shot-making mode. Thus, an overall cycle time for operating in the quick-prep shot-making mode may be less than an overall cycle time for a ready-to-eat shot-making mode.

Alternatively at 1832, if the first pump time has expired, the method continues to 1836 to pump the chilled liquid gelatin mixture to a dispensing manifold (e.g., dispensing manifold 180 shown in FIGS. 1B, 5, and 6A-E) and into a plurality of cups via the dispensing manifold. As described above, the plurality of cups may be positioned within a tray, the tray removably coupled to a slideable drawer of the device (e.g., tray 168 and drawer 172 shown in FIGS. 1B and 3). As explained above in reference to FIGS. 1B, 5, and 6A-E, the dispensing manifold may include one or more dispensing heads or apertures arranged therein. The dispensing heads or apertures may be aligned over a tope of the plurality of cups and the liquid gelatin mixture may be flowed (e.g., pumped) into the cups for a fill duration or pump time.

At 1838, the method includes determining if the fill duration of pump time for filling the cups has expired. The fill duration may be based on a size of each cup and/or a number of cups within the cup tray. If the pump time has not expired at 1838, the method continues to 1840 to continue pumping the liquid gelatin mixture into the cups and continue filling the cups. Following expiration of the pump time at step 1838, if the method is operating in the quick-prep shot-making mode, then the quick-prep shot-making cycle may be complete. Following completion of the quick-prep shot-making cycle, the cups containing the liquid gelatin mixture may be removed and chilled via an external cooling chamber, for example. Upon completion of the quick-prep shot-making cycle at step 1838, an indication may be provided in at least one example that the cups containing the liquid gelatin-based mixture are ready for removal. The indicating may include displaying a visual indicating on the display screen (e.g., user interface 104 from FIG. 1B) of the device and/or emitting an audible signal indicating the shots are complete and ready for chilling via an external device.

However, if the pump time has expired at 1838 and the method is operating in the ready-to-eat shot-making mode, the method continues to 1842 to chill the plurality of gelatin-filled cups for duration. Chilling may include transferring heat from the cups and cup tray via a second chilling module (e.g., chilling module 175 shown in FIGS. 1B and 17) disposed vertically below the drawer in order to solidify the liquid gelatin mixture contained in the cups.

After the duration for chilling has expired, the method continues to 1844 to purge all fluid from the injection assembly (e.g., dispensing manifold), fluid lines, and/or needle (e.g., needle of the pod receptacle) of the device and into a drain tank (e.g., drain tank 184 shown in FIGS. 1B and 17) of the device. The method then continues to 1846 to clean the needle of the pod receptacle.

At 1848, the method includes determining if the second chilling duration has expired (e.g., determining if a chilling timer has expired). If the chilling timer has not expired, the method continues to 1850 to continue chilling the shots via the second chilling module. Once the chilling duration is complete, the method proceeds to 1852 to indicate that the gelatin-based shots in the cups are complete. The indicating may include displaying a visual indicating on the display screen (e.g., user interface 104 from FIG. 1B) of the device and/or emitting an audible signal indicating the shots are complete and ready for consumption.

Figure 19:
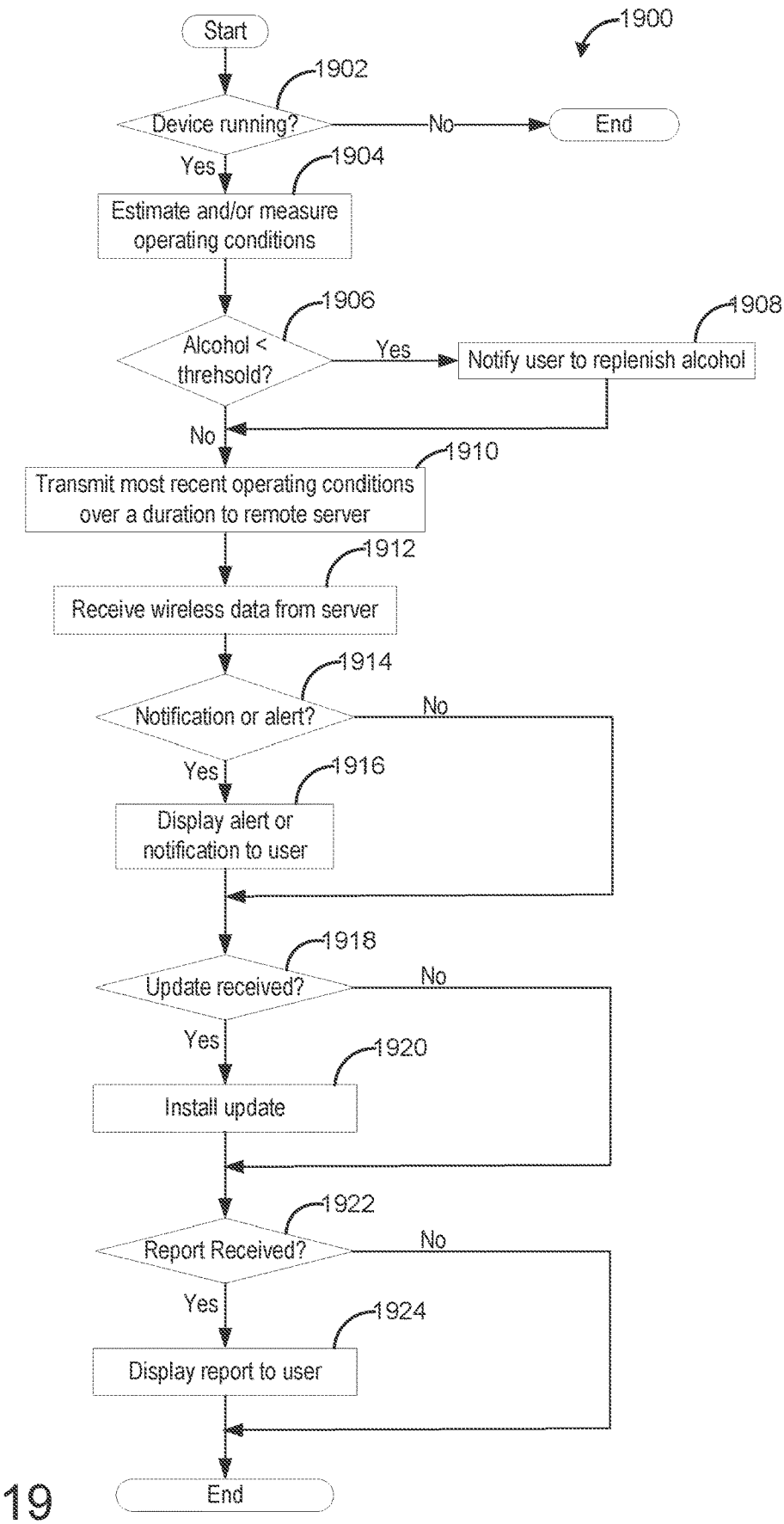
FIG. 19 shows a flow chart of an example method for tracking usage of a device for preparing gelatin-based shots, such as the device shown in FIG. 1B, in accordance with one or more embodiments of the present disclosure.

FIG. 19 shows a method 1900 for tracking usage of the device for preparing gelatin-based shots (e.g., device 100 shown in FIG. 1B and FIGS. 2-17 and described above in the description of method 1800). Instructions for executing method 1900 may be stored on the memory of the controller (e.g., controller 106 shown in FIG. 1B). As such, the controller may execute method 1900 in order to operate the device 100 and track device usage.

Method 1900 begins at 1902 by determining whether the device is currently running (e.g., powered on and/or currently running a shot-making routine, such as the routine described above with reference to FIGS. 18A-B). If the device is not running, the method ends. Otherwise, if the device is running, the method continues to 1904 to estimate and/or measure engine operating conditions of the device. Operating conditions may include a power-on time of the device, various temperatures received from temperature sensors of the device, various flow rates received from one or more flow meters of the device, positions of device components, and/or liquid levels of one or more liquid reservoirs of the device. Operating conditions may additionally or alternatively include usage data of the device, such as a number of shot-making cycles run, a number of cleaning cycles run, pod usage (e.g., number and types of pods used), an amount and type of each alcohol used, an amount of water used by the device, a number of gelatin-based shots made per day or over a duration, etc.

At 1906, the method includes determining whether the amount of alcohol within the alcohol reservoir (e.g., alcohol reservoir 108 shown in FIGS. 1B and 3) is less than a threshold amount or level. As one example, the threshold may be a non-zero threshold that is less than an amount required to make a batch of shots. If the amount or level of alcohol within the alcohol reservoir is less than the threshold, the method continues to 1908 to notify a user to replenish (e.g., fill) the alcohol reservoir. In one example, the notification may include a visual indication delivered via the user interface of the device. In another example, the notification may additionally or alternatively include an audible signal and/or a light indicator on the device.

Alternatively at 1906, if the alcohol level is not below the threshold, the method continues to 1910 to transmit the most recent device operating conditions (which may include the device usage data) to a remote server. As explained above, the remote server may be a remote computer or server, separate from the device, that is in wireless communication with the device. The remote server may monitor the functioning and usage of the device through the wireless connection. The remote server may receive and analyze the sent data and may track usage data of the device, as explained above. The remote server may also monitor health and/or functionality data sent via the controller of the device.

At 1912, the method includes receiving wireless data from the server. The data received at the controller from the server may include a notification or alert to replace or repair one or more components of the device, a notification or alert to clean one or more components of the device, a notification or alert request to order one or more fluids or pods for the device, etc. At 1914, the method includes determining whether the controller has received a notification or alert, as described above, from the server. If no notification or alert has been received the method continues to 1918. However, if one or more notifications or alerts are received, the method first continues to 1916 to display the notification or alert to the user via the user interface of the device. The method then continues to 1918 to determine if an update has been received at the controller from the remote server. If an update, or a request to update the device, is received, the method continues to 1920 to install the received update. The update may include an update to instructions for operating the device or an update to one or more parameters for operating the device, stored within the memory of the controller.

At 1922, the method includes determining whether a report has been received at the controller from the remote server. The report may include one or more of an activity or usage report generated by the server based on the operating conditions and/or usage data sent to the server from the device. For example, the report may include details to the duration of use of the device, a number of batches of shots (or total shots) prepared by the device over a duration (e.g., per day, week, month, etc.), an amount of each type of alcohol used, a number of each type (e.g., flavor and/or size) of pod used by the device, etc. If the report is received at 1922, the method continues to 1924 to display the report to the user (e.g., via the interface). In this way, a user may track the usage of the device and may make informed decisions on ordering components, pods, and/or fluids for use with the device. This may increase an ease of use and efficiency of use for an owner of the device.

Figure 20:
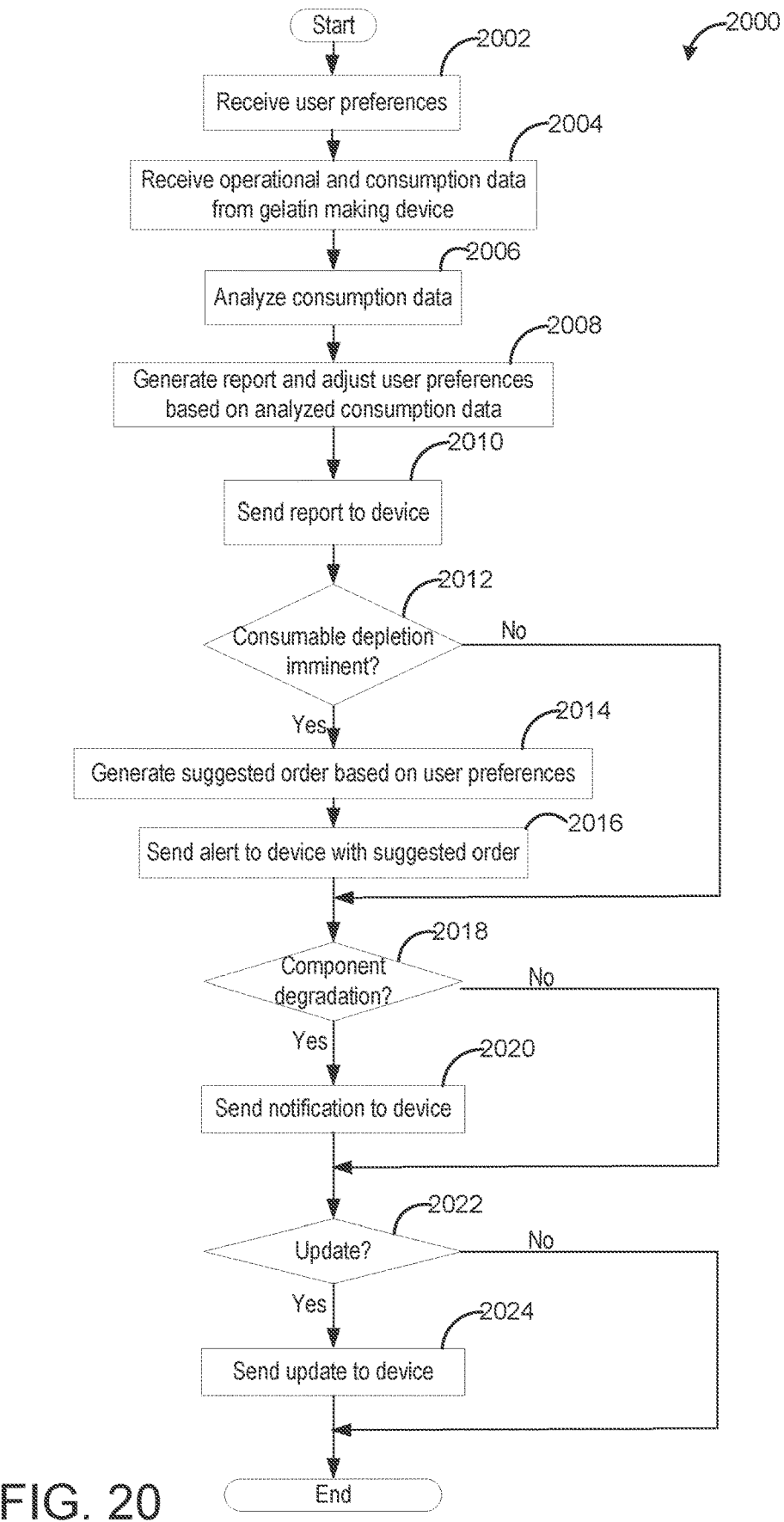
FIG. 20 shows a flow chart of an example method for analyzing usage data of a device, such as device shown in FIG. 1B, in accordance with one or more embodiments of the present disclosure.

Turning to FIG. 20, a method 2000 is shown for analyzing usage data of a device, such as device 100 described above. Method 2000 may be executed by a processor of a remote server device (e.g., such as a remote computer, as introduced above in the description of FIG. 19) in electronic communication with the shot-making device. Method 200 begins at 2002 where the remote server receives one or more user preferences. The server may receive the user preferences directly from a user or from the shot-making device via the user interface of the device. The user preferences may include a desired alcohol type, a desired final percentage alcohol of the shots, a desired pod flavor, etc. At 2004, the server received operational and consumption data (e.g., usage data), such as the operational and usage data described above with reference to FIG. 19, for the gelatin shot making device. At 2006, the method includes analyzing the received consumption data (e.g., usage data). The method at 2008 includes generating a report based on the received data and adjusting user preferences based on the analyzed consumption data. As explained above, the report may include one or more of an activity or usage report generated by the server based on the operating conditions and/or usage data sent to the server from the device. For example, the report may include details to the duration of use of the device, a number of batches of shots (or total shots) prepared by the device over a duration (e.g., per day, week, month, etc.), an amount of each type of alcohol used, a number of each type (e.g., flavor and/or size) of pod used by the device, etc. The method then proceeds to 2010 to send the generated report (s) to the shot-making device.

At 2012, the method includes demining whether a consumable depletion is imminent. For example, based on the received usage data and stored inventory information (e.g., an amount of pods and/or alcohol available for use in the gelatin shot-making device), the server may determine whether an inventory of pods or alcohol (e.g., certain types of alcohol) are running low and need to be re-ordered. If consumable depletion of one or more of the consumables used in the device is imminent, the method continues to 2014 to generate a suggested order based on user preferences. At 2016, the method includes sending an alert (e.g., via sending an indication to the user interface or an audible alert) to the device with a suggested order.

At 2018, the method includes determining whether one or more of the components of the gelatin shot-making device are degraded. The server may determine degradation of one or more of the device components based on the received operation and/or usage data from the device. For example, the server may receive various temperature, pressure, and flow rate signals from the device that may indicate a level of component degradation. If component degradation is indicated, the method continues to 2020 to send a degradation notification to the device.

At 2022, the method includes determining whether an update to the device is available and/or whether the device has been updated since a last available update. If an update is available or needed, the method continues to 2024 to send an update to the device.

An automatic device for preparing a hardened liquid mixture is disclosed. The device may be configured to mix a powder, such as a gelatin powder, protein powder, etc., with one or more liquids, cool the resulting mixture, and serve the mixture into a plurality of serving cups. Thus, the device includes a mixing chamber for mixing the powder with one or more liquids, a cooling module for cooling and hardening the resulting mixture, and a dispensing system for serving the mixture in the serving cups. In some examples, as shown in FIG. 3, the device may include an array of shot cups for serving the hardened mixture. The device may additionally include any one or combination of the following: a first chilling module such as first chilling module 147 exemplarily shown in FIG. 16 for cooling the second liquid mixture prior to dispensing the second liquid mixture, and/or a second cooling module such as second chilling module 175 exemplarily shown in FIG. 17 for hardening the second liquid mixture after it has been dispensed into one or more serving cups, and/or a first mixing chamber such as pod receptacle 107 exemplarily shown in FIG. 13 for mixing the powder with heated water, and/or a hot water tank such as hot water tank 116 exemplarily shown in FIG. 15 for providing heated water to be mixed with the powder, and/or a consumable pod such as pod 112 exemplarily shown in FIG. 8 that contains the dry powder, and/or a second mixing chamber such as mixing chamber 132 exemplarily shown in FIG. 15 for mixing the mixed gelatin powder and water mixture with an alcoholic liquid, and/or a slideable drawer such as drawer 172 exemplarily shown in FIG. 3 containing a plurality of cups such as cups 164 exemplarily shown in FIG. 3 for receiving the mixture and serving the hardened mixture, and/or a dispensing manifold such as manifold 180 exemplarily shown in FIG. 6A for filing the cups, and/or a motor such as motor 182 exemplarily shown in FIG. 6E for adjusting the manifold between a dispensing mode where a liquid gelatin mixture is dispensed into the cups and a cleaning mode where the device is purged of residual gelatin mixture remaining after the dispensing mode, and/or a first pump such as pump 130 exemplarily shown in FIG. 13 for pumping the mixture from the first mixing chamber to the second mixing chamber, an alcohol reservoir such as alcohol reservoir 108 exemplarily shown in FIG. 13 for retaining an alcoholic liquid, a second pump such as pump 140 exemplarily shown in FIG. 7 for pumping the alcohol liquid from the alcohol reservoir to the second mixing chamber, a third pump such as pump 145 exemplarily shown in FIG. 14 for pumping the mixture between the second mixing chamber and the first chilling module, a fourth pump such as pump 159 exemplarily shown in FIG. 14 for pumping the mixture from the second mixing chamber to the dispensing system, and a controller such as controller 106 exemplarily shown in FIG. 1B for adjusting operations of the components of the device and communicating with an external server.

In one representation, a device for preparing a gelatin-based product may comprise a pod receptacle adapted to receive a removable consumable pod and including a door with a needle coupled to an interior surface of the door, a mixing chamber spaced away from the pod receptacle and fluidly coupled to the needle and a first liquid reservoir, a first chilling module fluidly coupled to the mixing chamber, a slideable drawer including a tray including a plurality of slots for receiving a plurality of fluid vessels, and a dispensing manifold fluidly coupled to the first chiller module and positioned vertically above the drawer. The above device may further comprise a second chilling module positioned below the drawer and may include a chilling device and a heat exchanger. In any one or more combinations of the above embodiments of the device, the first chilling module may include a chilling device and a heat exchanger, where the heat exchanger may be positioned on a first side of the chilling device and where the chilling device may be positioned between the heat exchanger and a liquid gelatin interface on a second side of the chilling device. In any one or more combinations of the embodiments of the above device, the chilling device may include a plurality of thermoelectric chips. In any of one or more combinations of the above embodiments of the device, the first chilling module may further include a first pump fluidly coupled with the mixing chamber and a second pump fluidly coupled with the dispensing manifold. Any one or more combinations of the above embodiments of the device may further comprise a hot water tank positioned on a side of the mixing chamber opposite the first chilling module. In any one or more combinations of the embodiments of the above device, the pod receptacle may be rotatable via a motor coupled to the pod receptacle. Any one or more combinations of the embodiments of the above device may further comprise a housing enclosing the pod receptacle, mixing chamber, first chilling module, drawer, and dispensing manifold within an interior of the housing. In any one or more combinations of the embodiments of the above device, the dispensing manifold may be removable from the device via a front access door positioned above the drawer. In any one or more combinations of the embodiments of the above device, the housing may include a user interface coupled to an exterior wall of housing.

In another representation, a device for preparing a gelatin-based product may comprise a pod receptacle adapted to receive a removable consumable pod, a first chilling module fluidly coupled to the pod receptacle, a slideable drawer including a tray including a plurality of slots for receiving a plurality of fluid vessels, a dispensing manifold fluidly coupled to the first chilling module and positioned vertically above the drawer, and a second chilling module directly coupled to a bottom exterior surface of the drawer. In one example the above device may further comprise a mixing chamber positioned between the first chilling device and a hot water tank. In any one or more combinations of the embodiments of the above device, the pod receptacle may include a door with a needle coupled to an interior surface of the door and wherein the pod receptacle may be rotatable via a motor coupled to the pod receptacle. Any one or more combinations of the embodiments of the above device may further comprise a motor coupled to the dispensing manifold for adjusting the dispensing manifold between a dispensing position where a gelatin mixture is dispensed into the fluid vessels from the manifold, and a cleaning position where a fluid mixture entering the manifold is drained to a drain tank.

In yet another representation, a method for preparing a gelatin-based product may comprise injecting heated water into a consumable pod pre-loaded into a pod receptacle of a device and mixing the injected heated water with gelatin contents of the consumable pod to form a first liquid gelatin mixture, transporting the first liquid gelatin mixture and a first liquid through a first chilling module to form a chilled second liquid gelatin mixture, transporting the chilled second liquid gelatin mixture to a dispensing manifold of the device, the dispensing manifold including one or more dispensing heads, injecting, via the dispensing manifold, the chilled second liquid gelatin mixture into a plurality of cups, and chilling the plurality of cups with a second chilling module to form a hardened gelatin mixture within each cup of the plurality of cups. In one example, the above method may further comprise, before transporting the first liquid gelatin mixture and the first liquid through the first chilling module, transporting the first liquid gelatin mixture and the first liquid into a mixing chamber and mixing to form a mixed second liquid gelatin mixture, and then transporting the second liquid gelatin mixture through the first chilling module. In any one or more combinations of the embodiments of the above method, transporting the second liquid gelatin mixture through the first chilling module may be performed via a first pump and wherein transporting the chilled second liquid gelatin mixture to the dispensing manifold may be performed via a second pump. Any one or more combinations of the embodiments of the above method may further comprise, prior to injecting the heated water into the consumable pod, puncturing a top surface of the consumable pod with a needle attached to a bottom side of a door of the pod receptacle and wherein the injecting heater water may include injecting heated water from a heated water tank of the device, through the needle, and into the consumable pod. In any one or more combinations of the embodiments of the above method, mixing the injected heated water with gelatin contents of the consumable pod may include actuating a motor coupled with the pod receptacle to agitate the pod receptacle about a central axis of the pod receptacle. Any one or more combinations of the embodiments of the above method may further comprise tracking an amount of the first liquid dispensed via the device over duration of use of the device and generating data including the amount of the first liquid dispensed over the duration of use of the device.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other device hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the device control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for preparing a gelatin-based product, comprising:
    operating a device in a shot-making mode, wherein operating the device in the shot-making mode includes:
        receiving a user input indicating a type of shot to be made;
        flowing a regulated amount of hot water from a hot water tank, through a needle, and into a mix pod containing a gelatin-based mixture to form a gelatin slurry, and
        evacuating the gelatin slurry from the mix pod, through a first chilling module, and into one or more cups via an array of dispensing heads; and
    operating the device in a cleaning mode, wherein operating the device in the cleaning mode includes:
        flowing hot water from the hot water tank, through the needle, and into the mix pod that was evacuated, and
        pumping the hot water out of the mix pod, and through the array of dispensing heads,
        wherein the device comprises the hot water tank, the needle, the first chilling module, and the array of dispensing heads.

2. The method of claim 1, wherein operating the device in the cleaning mode includes moving the array of dispensing heads from a first position to a second position.

3. The method of claim 2, wherein the array of dispensing heads is moved from the first position to the second position via a motor.

4. The method of claim 2, wherein the array of dispensing heads is in fluidic communication with the one or more cups in the first position, and wherein the array of dispensing heads is in fluidic communication with a drain tank in the second position.

5. The method of claim 3, wherein operating the device in the cleaning mode further includes flowing hot water through the first chilling module, the first chilling module positioned upstream of the one or more cups.

6. The method of claim 4, wherein the shot-making mode further includes chilling the one or more cups via a second chilling module that is separate from the first chilling module.

7. The method of claim 6, further comprising, prior to evacuating the gelatin slurry into the one or more cups, mixing a regulated amount of alcohol with the gelatin slurry.

8. The method of claim 4, further comprising operating the device on an aircraft.

* * * * *